(12) United States Patent
Satori

(10) Patent No.: US 7,755,848 B2
(45) Date of Patent: Jul. 13, 2010

(54) ZOOM LENS SYSTEM AND ELECTRONIC IMAGE PICKUP APPARATUS USING THE SAME

(75) Inventor: Tomoyuki Satori, Kawagoe (JP)

(73) Assignee: Olympus Imaging Corp., Tokyo (JP)

( * ) Notice: Subject to any disclaimer, the term of this patent is extended or adjusted under 35 U.S.C. 154(b) by 0 days.

(21) Appl. No.: 12/077,037

(22) Filed: Mar. 13, 2008

(65) Prior Publication Data

US 2008/0231969 A1    Sep. 25, 2008

(30) Foreign Application Priority Data

Mar. 15, 2007    (JP) .............................. 2007-066663

(51) Int. Cl.
*G02B 15/14* (2006.01)
(52) U.S. Cl. ...................................... 359/690; 359/687
(58) Field of Classification Search ................. 359/687, 359/690
See application file for complete search history.

(56) References Cited

U.S. PATENT DOCUMENTS

| | | | | |
|---|---|---|---|---|
| 6,052,235 | A * | 4/2000 | Ozaki ......................... | 359/686 |
| 7,151,638 | B2 | 12/2006 | Ohashi | |
| 2006/0262422 | A1* | 11/2006 | Ohashi ........................ | 359/687 |
| 2008/0100923 | A1* | 5/2008 | Morooka ..................... | 359/687 |
| 2009/0091841 | A1* | 4/2009 | Ohashi ........................ | 359/684 |

FOREIGN PATENT DOCUMENTS

| JP | 2005-242116 | 9/2005 |
|---|---|---|
| JP | 2005-326743 | 11/2005 |
| JP | 2006-078979 | 3/2006 |

* cited by examiner

*Primary Examiner*—William C Choi
(74) *Attorney, Agent, or Firm*—Kenyon & Kenyon LLP

(57) ABSTRACT

A zoom lens system includes a rear lens group having in order from an object side, a first lens unit G1 having a positive refracting power, a second lens unit G2 having a negative refracting power, and a third lens unit G3 having a positive refracting power, and an aperture stop S which is disposed between the second lens unit G2 and the third lens unit G3. At the time of zooming from a wide angle end to a telephoto end, when focused on an object at a longest distance, each of the first lens unit G1, the second lens unit G2, and the third lens unit G3 moves such that a distance between the first lens unit G1 and the second lens unit G2 is widened (increased), and a distance between the, second lens unit G2 and the third lens unit G3 is narrowed (decreased).

30 Claims, 22 Drawing Sheets

ZOOM LENS SYSTEM AND ELECTRONIC IMAGE PICKUP APPARATUS USING THE SAME

CROSS-REFERENCE TO RELATED APPLICATION

The present application is based upon and claims the benefit of priority from the prior Japanese Patent Application No. 2007-066663 filed on Mar. 15, 2007; the entire content of which are incorporated herein by reference

BACKGROUND OF THE INVENTION

1. Field of the Invention

The present invention relates to a zoom lens system. Moreover, the present invention relates to an electronic image pickup apparatus in which the zoom lens system is used.

2. Description of the Related Art

In recent years, replacing a silver-salt film camera, a digital camera in which, an object is photographed by using a solid image pickup element such as a CCD (Charge Coupled Device) and a CMOS (Complementary Metal Oxide Semiconductor) has become a mainstream. Furthermore, there are several categories of digital cameras in a wide range from a high-function type for professional use to a compact popular type.

A user of the popular type digital camera seeks to enjoy photography readily, anywhere at any time with a wide range of scenes. In light of this, a small size product particularly a slim digital camera which can be accommodated easily in a pocket of clothes or a bag, and carried conveniently has been preferred.

On the other hand, while a magnification ratio of about 3 for a digital camera of a compact type has been common, a camera of a magnification ratio higher than a magnification ratio of the conventional one has been sought. As a zoom lens system which is capable of maintaining easily a comparatively higher magnification ratio, a zoom lens system having in order from an object side, a first lens unit having a positive refracting power, a second lens unit having a negative refracting power, and a third lens unit having a positive refracting power has hitherto been known.

On the other hand, in a size of the camera, a size in a direction of thickness of a camera is determined mainly by a size of a lens barrel. Therefore, for achieving slimming of a camera, slimming of the lens barrel is effective.

Nowadays, a so-called collapsible barrel which is pushed out from an inside of a camera body when the camera is in use, and is accommodated inside the camera body while carrying the camera has been common. Therefore, a zoom lens system in which slimming of the lens barrel when collapsed has been sought.

In conventional technologies in Japanese Patent Application Laid-open Publication Nos. 2005-242116, 2005-326743, and 2006-78979, a zoom lens system in which a first lens unit includes two or three lenses, and an aberration correction and a reduction in size of a second lens unit is carried out by making a symmetrical power arrangement in the second lens unit, by arranging in order from the object side, a negative lens, a positive lens, and a negative lens, has been disclosed.

SUMMARY OF THE INVENTION

An object of the present invention is to provided a zoom lens system which is advantageous for securing a magnification ratio and making short an overall length at a telephoto end, and in which securing of optical performance is taken into consideration, and an electronic image pickup apparatus using the same.

According to one aspect, the zoom lens system according to the present invention includes in order from an object side thereof a first lens unit having a positive refracting power; a second lens unit having a negative refracting power; and a rear lens group having a positive refracting power which includes a third lens unit having a positive refracting power; and an aperture stop which is disposed between the second lens unit and the third lens unit, and at a time of zooming from a wide angle end to a telephoto end, when focused on an object at a longest distance, each of the first lens unit, the second lens unit, and the third lens unit moves such that a distance between the first lens unit and the second lens unit is increased and a distance between the second lens unit and the third lens unit is decreased, and the aperture stop is moves such that a distance of the aperture stop from the second lens unit is decreased, and the second lens unit includes in order from the object side, a first negative lens $L_{2n1}$, a positive lens $L_{2p}$, and a second negative lens $L_{2n2}$, and the total number of lenses in the second lens unit is three, and satisfies the following conditional expressions $$-0.28 < f_2/f_t < -0.07 \quad (1)$$

$$-0.38 < f_{2n2}/f_t < -0.14 \quad (2)$$

where, $f_2$ denotes a focal length of the second lens unit, $f_{2n2}$ denotes a focal length of the second negative lens $L_{2n2}$ in the second lens unit, and $f_t$ denotes a focal length of the entire zoom lens system, at the telephoto end.

Moreover, according to another aspect of the present invention, an electronic image pickup apparatus according to the present invention includes a zoom lens system described above, and an image pickup element which is disposed on an image side, and which converts an optical image formed by the zoom lens system, to an electric signal.

BRIEF DESCRIPTION OF THE DRAWINGS

FIG. 1A shows a state at a wide angle end, FIG. 1B shows an intermediate state, and FIG. 1C shows a state at a telephoto end;

FIG. 9A shows a state at the wide angle end, FIG. 9B shows an intermediate state, and FIG. 9C shows a state at a telephoto end;

DETAILED DESCRIPTION OF THE INVENTION

Figure 1A:
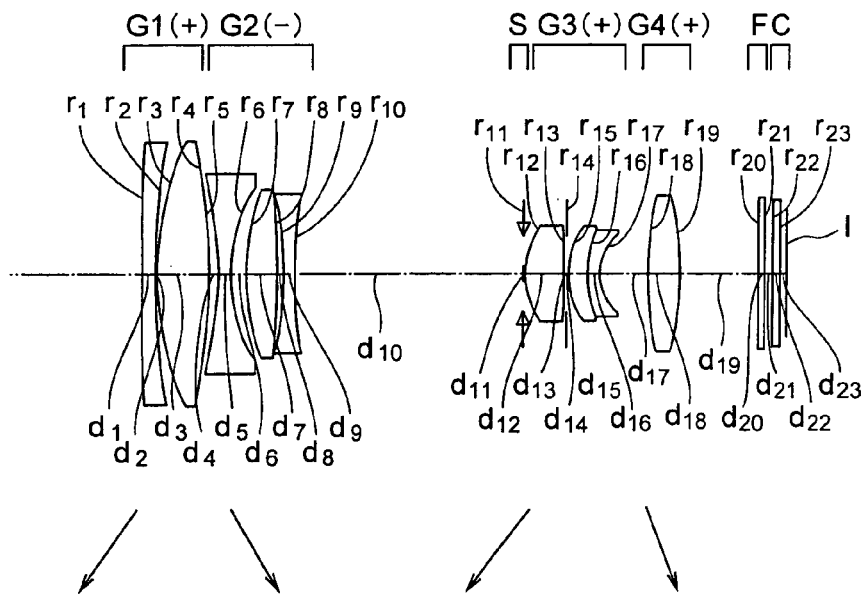
FIG. 1A, FIG. 1B, and FIG. 1C are cross-sectional views along an optical axis showing an optical arrangement at a time of infinite object point focusing according to a first embodiment of a zoom lens system of the present invention, where.

To solve the abovementioned issues, there is provided a zoom lens system according to the present invention which includes in order from an object side thereof a first lens unit having a positive refracting power;

a second lens unit having a negative refracting power; and a rear lens group having a positive refracting power which includes a third lens unit having a positive refracting power, and an aperture stop which is disposed between the second lens unit and the third lens unit, and at the time of zooming from a wide angle end to a telephoto end, when focused on an object at a longest distance, each of the first lens unit, the second lens unit, and the third lens unit moves such that a distance between the first lens unit and the second lens unit is increased and a distance between the second lens unit and the third lens unit is decreased, and the aperture stop moves such that a distance of the aperture stop from the second lens unit is decreased, and the second lens unit includes in order from the object side, a first negative lens $L_{2n1}$, a positive lens $L_{2p}$, and a second negative lens $L_{2n2}$, and the total number of lenses in the second lens unit is three, and satisfies the following conditional expressions $$-0.28 < f_2/f_t < -0.07 \quad (1)$$

$$-0.38 < f_{2n2}/f_t < -0.14 \quad (2)$$

where, $f_2$ denotes a focal length of the second lens unit, $f_{2n2}$ denotes a focal length of the second negative lens $L_{2n2}$ in the second lens unit, and $f_t$ denotes a focal length of the entire zoom lens system, at the telephoto end.

A reason for and an effect of adopting the above-mentioned arrangement in the zoom lens system will be described below. For making it advantageous for securing a high zooming ratio, an arrangement is made such that the zoom lens system of the present invention includes in order from the object side thereof, the first lens unit having a positive refracting power, the second lens unit having a negative refracting power, and the rear lens group which includes the third lens unit having a positive refracting power, and the magnification is carried out by changing the distance between the lens units as described above.

By making such arrangement, it becomes easy to impart effectively a load of magnification to the second lens unit and the third lens unit. Accordingly, it prevents an amount of movement of each lens unit from being substantial while suppressing a change in an aberration at the time of zooming, which leads to making compact the zoom lens system.

Moving each of the first lens unit, the second lens unit, and the third lens unit in such manner is advantageous for maintaining an optical performance even when the magnification becomes high.

The aperture stop is disposed and moved at the time of zooming (magnification) as it has been described above. Accordingly, a height of light rays of off-axis light beam at the wide angle end, and a height of light rays of off-axis rays at the telephoto end are balanced. Moreover, it becomes possible to control appropriately a position of an entrance pupil and a position of an exit pupil.

Accordingly, it becomes possible to correct a chromatic aberration of magnification and a distortion even while arranging compactly an outer diameter of the first lens unit and an outer diameter of a lens unit positioned closest to the image, in a balanced manner.

Making small the outer diameter of the first lens unit at the wide angle end leads to making compact of a size in a direction of thickness of the first lens unit. Moreover, it becomes possible to control to make small a change in the position of the exit pupil at the time of zooming. Therefore, it is possible to maintain in an appropriate range an angle of light beam which is incident on a CCD and a CMOS, and to prevent an occurrence of shading of brightness at a portion around a taking screen, and it is preferable in a case of using an electronic image pickup element.

Moreover, by structuring the second lens unit by three lenses which is fewer, it becomes easy to suppress a thickness of the zoom lens system when collapsed. It becomes easy to make small also a distance up to the entrance pupil from a surface closest to the object of the first lens unit at the wide angle end, and to carry out a reduction in size in a radial direction of the zoom lens system.

In the present invention, by disposing two negative lenses in the second lens unit, a negative refracting power of the second lens unit is distributed, and an aberration is made easily suppressible. Moreover, by arranging in an order of a negative lens, a positive lens, and a negative lens from the object side, the structure is let to be such that, a symmetry of the lens arrangement may be improved and the correction of aberration in the second lens unit may be favorable.

Further, for making it easy to shorten an overall length at the telephoto end while securing a magnification ratio, it is preferable to make an arrangement such that the power of the second lens unit satisfies the abovementioned conditional expression (1).

By securing moderate negative refracting power of the second lens unit by making an arrangement such that a lower limit value is not lower than a lower limit value in conditional expression (1), it becomes easy to bring closer to the rear lens group, a position of an image point which is created by a combined system of the first lens unit and the second lens unit, in other words, a position of an object point corresponding to the rear lens group. Accordingly, it becomes easy to secure the magnification ratio while suppressing an amount of movement of lens units in the rear lens group, which is advantageous for shortening the overall length of the zoom lens system at the telephoto end.

By suppressing the negative refracting power of the second lens unit to be moderate, by making an arrangement such that an upper limit value is not higher than an upper limit value in conditional expression (1), it becomes easy to secure a longitudinal magnification of the second lens unit. Accordingly, it becomes easy to secure a magnification load of the second lens unit, which is advantageous for securing brightness and shortening the overall length at the telephoto end. Moreover, it becomes easy to suppress a fluctuation in the aberration at the time of zooming, which is advantageous for securing the optical performance in a zoom range.

For securing moderate magnification of the rear lens group which is on a rear side of the second lens unit, principal points on the image side of the second lens unit may be positioned as much toward image side as possible, and the image point created by the combined system of the first lens unit and the second lens unit may be positioned as much toward the image side as possible. For this, a refracting power of the second negative lens $L_{2n2}$ closest to the object, in the second lens unit may be let to be as substantial as possible. Concretely, it is preferable to make an arrangement such that the abovementioned conditional expression (2) is satisfied.

By securing the negative refracting power of the second negative lens by making an arrangement such that a lower limit value is not lower than a lower limit value in conditional expression (2), it is possible to position the principal points of the second lens unit more toward the image, which is advantageous for securing the magnification of the rear lens group. Moreover, by letting the second negative lens to bear the negative refracting power from the negative refracting power of the second lens unit, it becomes easy to suppress the refracting power of the first negative lens, and to suppress an occurrence of a spherical aberration. By making an arrangement such that, an upper limit value is not higher than an upper limit value in conditional expression (2), it becomes easy to suppress an excessive occurrence of the spherical aberration and a coma aberration by the second negative lens, particularly at the telephoto end.

The zoom lens system may satisfy the following conditional expression with regard to conditional expression (1).

$$-0.23 < f_2/f_t < -0.11 \quad (1')$$

The zoom lens system may further satisfy the following conditional expression.

$$-0.18 < f_2/f_t < -0.15 \quad (1'')$$

The zoom lens system may satisfy the following conditional expression with regard to conditional expression (2).

$$-0.37 < f_{2n2}/f_t < -0.21 \quad (2')$$

The zoom lens system may further satisfy the following conditional expression.

$$-0.36 < f_{2n2}/f_t < -0.28 \quad (2'')$$

Accordingly, it is possible to show further the abovementioned effect.

The upper limit value or the lower limit value of each conditional expression may be let to be an upper limit value and a lower limit value of a corresponding conditional expression more restricted. Similar is true for the following conditional expressions.

Various ideas, apart from those mentioned above, have been devised in the present invention to achieve an efficient and favorable optical performance while realizing the compactness. These ideas will be described below in detail.

In the zoom lens system, it is preferable that the second negative lens $L_{2n2}$ in the second lens unit is a biconcave lens which satisfies the following conditional expression.

$$-0.80 < SF_{2n2} < 0.50 \quad (3)$$

where, $SF_{2n2}$ is defined as $SF_{2n2} = (R_{2n2f} + R_{2n2r})/(R_{2n2f} - R_{2n2r})$ when $R_{2n2f}$ is a paraxial radius of curvature of a surface on the object side, of the second negative lens $L_{2n2}$ in the second lens unit, and $R_{2n2r}$ is a paraxial radius of curvature of a surface on an image side of the second negative lens $L_{2n2}$ in the second lens unit.

A reason for and an effect of adopting the above-mentioned arrangement in the zoom lens system will be described below. By making an arrangement such that a lower limit value is not lower than a lower limit value in conditional expression (3), it becomes easy to suppress an occurrence of astigmatism at the wide angle end. By making an arrangement such that an upper limit value is not higher than an upper limit value in conditional expression (3), it becomes easy to suppress an occurrence of the coma aberration at the telephoto end.

The zoom lens system may satisfy the following conditional expression.

$$-0.55 < SF_{2n2} < 0.35 \quad (3')$$

The zoom lens system may further satisfy the following conditional expression.

$$-0.36 < SF_{2n2} < 0.16 \quad (3'')$$

Accordingly, it is possible to show further the abovementioned effect.

Moreover, in the zoom lens system, it is preferable that a thickness on an optical axis of the second lens unit satisfies the following conditional expression (A), and a shape of the first negative lens $L_{2n1}$ in the second lens unit satisfies the following conditional expression (B), and a shape of the positive lens $L_{2p}$ in the second lens unit satisfies the following conditional expression (C).

$$0.06 < \Sigma d_{2G}/f_t < 0.23 \quad (A)$$

$$-0.9 < SF_{2n1} < 1.1 \quad (B)$$

$$-3.0 < SF_{2p} < 0.2 \quad (C)$$

where, $\Sigma d_{2G}$ denotes a distance on the optical axis, from a surface of incidence of the second lens unit up to a surface of exit of the second lens unit, $SF_{2n1}$ is defined as $SF_{2n1} = (R_{2n1f} + R_{2n1r})/(R_{2n1f} - R_{2n2r})$, when $R_{2n1f}$ is a paraxial radius of curvature of a surface on the object side, of the first negative lens $L_{2n1}$ in the second lens unit, and $R_{2n1r}$ is a paraxial radius of curvature of a surface on an image side of the first negative lens $L_{2n1}$ in the second lens unit, and.

$SF_{2p}$ is defined, as $SF_{2p} = (R_{2p1f} + R_{2pr})/(R_{2pf} - R_{2pr})$, when $R_{2pf}$ is a paraxial radius of curvature of a surface on the object side, of the positive lens. $L_{2p}$ in the second lens unit, and $R_{2pr}$ is a paraxial radius of curvature of a surface on an image side of the positive lens $L_{2p}$ in the second lens unit.

A reason for and an effect of adopting the above-mentioned arrangement in the zoom lens system will be described below. Conditional expression (A), (B), and (C) are conditional expression for making the second lens unit compact, and making easy the correction of aberration in the second lens unit. The conditional expression (A) is an expression which specifies the thickness on the optical axis of the second lens unit. By securing the thickness on the optical axis of the second lens unit by making an arrangement such that a lower limit value is not lower than a lower limit value in the conditional expression (A), it becomes easy to secure a refracting power of the positive lens $L_{2p}$ in the second lens unit, which is advantageous for correction of various aberrations which are susceptible to occur in the second lens unit. On the other hand, reducing the thickness on the optical axis of the second lens unit by making an arrangement such that an upper limit value is not higher than an upper limit value in conditional expression (A) is advantageous for slimming when the zoom lens system is collapsed The conditional expression (B) is an expression which specifies the shape of the first negative lens $L_{2n1}$ in the second lens unit. It is preferable to suppress the occurrence of aberration by securing the negative refracting power of a surface on image side of the first negative lens $L_{2n1}$ by making an arrangement such that a lower limit value is not lower than a lower limit in conditional expression (B), and by not letting a surface on the object side to be a surface having a strong negative refracting power. Not letting principal points of the first negative lens $L_{2n1}$ to be closer to the image by making an arrangement such that an upper limit value is not higher than an upper limit value in conditional expression (B) is advantageous for making small the second lens unit.

Conditional expression (C) is an expression which specifies the shape of the positive lens $L_{2p}$ in the second lens unit. By not letting a surface on the image side of the positive lens $L_{2p}$ to be a surface having a strong negative refracting power by making an arrangement such that a lower limit value is not lower than a lower limit value in conditional expression (C), it becomes easy to suppress an excessive correction of an image plane curvature. By securing the refracting power of a convex surface toward the object, of the positive lens $L_{2p}$ by making an arrangement such that an upper limit value is not higher than an upper limit value in conditional expression (C), it becomes easy to correct an oblique coma aberration which is susceptible to occur at the first negative lens $L_{21}$.

It is more preferable to let the lower limit value in conditional expression (A) to be 0.08, and a lower limit value of 0.1 is even more preferable. It is more preferable to let the upper limit value in conditional expression (A) to be 0.19, and an upper limit value of 0.15 is even more preferable. It is more preferable to let the lower limit value in conditional expression (B) to be 0.0, and a lower limit value of 0.1 is even more preferable. It is more preferable to let the upper limit value in conditional expression to be 0.9, and an upper limit value of 0.6 is even more preferable. It is more preferable to let the lower limit value in conditional expression (C) to be −2.0, and a lower limit value of −1.5 is even more preferable. It is more preferable to let the upper limit value in conditional expression (C) to be 0.0, and an upper limit value of −0.3 is even more preferable.

Moreover, in the zoom lens system, it is preferable that the following conditional expression is satisfied when focused on an object at a longest distance, regarding a magnification load of the second lens unit and the rear lens group.

$$1.1 < (\beta_{2T} \times \beta_{RW})/(\beta_{2W} \times \beta_{RT}) < 3.6 \quad (4)$$

where, $\beta_{2W}$ and $\beta_{2T}$ denote paraxial lateral magnification of the second lens unit at the wide angle end and the telephoto end respectively, and $\beta_{RW}$ and $\beta_{RT}$ denote paraxial lateral magnification of the rear lens group at the wide angle end and the telephoto end respectively.

A reason for and an effect of adopting the above-mentioned arrangement in the zoom lens system will be described below. By suppressing the magnification load of the rear lens group by making an arrangement such that a lower limit value is not lower than a lower limit value in conditional expression (4), it becomes easy to suppress a fluctuation in the position of the exit pupil due to the magnification, and to make bright $F_{NO}$ at the telephoto end. By not letting the magnification load of the second lens unit to be excessively substantial by making an arrangement such that an upper limit value is not higher than an upper limit in conditional expression (4), it becomes easy to suppress a fluctuation of the position of the entrance pupil, and to bring the position of the entrance pupil at the wide angle end closer to a surface of incidence of the first lens unit, and it becomes easy to make small an outer diameter of a lens closest to the object.

The zoom lens system may satisfy the following conditional expression.

$$1.3 < (\beta_{2T} \times \beta_{RW})/(\beta_{2W} \times \beta_{RT}) < 2.9 \quad (4')$$

Moreover, the zoom lens system may further satisfy the following conditional expression.

$$1.5<(\beta_{2T}\times\beta_{RW})/(\beta_{2W}\times\beta_{RT})<2.2 \quad (4'')$$

Accordingly, it is possible to show further the abovementioned effect.

Moreover, in the zoom lens system, it is preferable that a material of the first negative lens $L_{2n1}$ closest to the object in the second lens unit satisfies the following conditional expressions. Concretely, the following conditional expressions may be satisfied.

$$1.78<n_{d2n1}<2.20 \quad (5)$$

$$35<\nu_{d2n1}<50 \quad (6)$$

where, $n_{d2n1}$ denotes a refractive index for a d-line, of the first negative lens $L_{2n1}$ in the second lens unit, and $\nu_{d2n1}$ denotes an Abbe's number for the first negative lens $L_{2n1}$ in the second lens unit.

A reason for and an effect of adopting the above-mentioned arrangement in the zoom lens system will be described below. It is preferable to improve a mass production and a procurement of the material, and to carry out a cost reduction by making an arrangement such that an upper limit value is not higher than an upper limit value in conditional expression (5). It is preferable to make it easy to suppress an image plane curvature and a coma aberration at the wide angle end by making small an absolute value of curvature of a lens surface while securing the refracting power by making an arrangement such that a lower limit value is not lower than a lower limit value in conditional expression (5).

It is preferable to secure a procurement of the material having a high refractive index by making an arrangement such that an upper limit value is not higher than an upper limit value in conditional expression (6). It is preferable to make it easy to suppress a chromatic dispersion to be at moderate level, and to suppress a chromatic aberration by making an arrangement such that a lower limit value is not lower than a lower limit value in conditional expression (6).

Moreover, the zoom lens system may satisfy the following conditional expressions.

$$1.79<n_{d2n1}<1.95 \quad (5')$$

$$37<\nu_{d2n1}<47 \quad (6')$$

The zoom lens system may satisfy further, the following conditional expressions.

$$1.80<n_{d2n1}<1.90 \quad (5'')$$

$$40<\nu_{d2n1}<43 \quad (6'')$$

Accordingly, it is possible to show further the abovementioned effect.

Moreover, an appropriate material may be set for the negative lens $L_{2n2}$ in the second lens unit. Concretely, the following conditional expression may be satisfied.

$$1.78<n_{d2n2}<2.00 \quad (7)$$

$$35<\nu_{d2n2}<50 \quad (8)$$

where, $n_{d2n2}$ denotes a refractive index for a d-line, of the second negative lens $L_{2n2}$ in the second lens unit, and $\nu_{d2n2}$ denotes an Abbe's number for the second negative lens $L_{2n2}$ in the second lens unit.

A reason for and an effect of adopting the above-mentioned arrangement in the zoom lens system will be described below. It is preferable to improve the mass production and the procurement of the material, and to carry out the cost reduction by making an arrangement such that an upper limit value is not higher than an upper limit value in conditional expression (7). It becomes easy to suppress an occurrence of the coma aberration and the spherical aberration by making small the absolute value of curvature of a lens surface even when the refracting power is secured, by making an arrangement such that a lower limit value is not lower than a lower limit value in conditional expression (7).

It is preferable to improve the procurement of the material having a high refractive index by making an arrangement such that an upper limit value is not higher than an upper limit value in conditional expression (8). Making an arrangement such that a lower limit value is not lower than a lower limit value in conditional expression (8), is advantageous for suppressing the chromatic dispersion and correcting the chromatic aberration.

The zoom lens system may satisfy the following conditional expressions.

$$1.80<n_{d2n2}<1.95 \quad (7')$$

$$38<\nu_{d2n2}<46 \quad (8')$$

The zoom lens system may satisfy further, the following conditional expressions.

$$1.86<n_{d2n2}<1.90 \quad (7'')$$

$$40<\nu_{d2n2}<42 \quad (8'')$$

Accordingly, it is possible to show further the abovementioned effect.

Moreover, in the zoom lens system, it is preferable that a material of the positive lens in the second lens unit satisfies the following conditional expressions.

$$1.84<n_{d2p}<2.20 \quad (9)$$

$$13<\nu_{d2p}<30 \quad (10)$$

where, $n_{d2p}$ denotes a refractive index for a d-line, of the positive lens $L_{2p}$ in the second lens unit, and $\nu_{d2p}$ denotes an Abbe's number for the positive lens $L_{2p}$ in the second lens unit.

A reason for and an effect of adopting the above-mentioned arrangement in the zoom lens system will be described below. It is preferable to improve the mass production and the procurement of the material, and to carry out the cost reduction by making an arrangement such that an upper limit value is not higher than an upper limit value in conditional expression (9). By making an arrangement such that a lower limit value is not lower than a lower limit value in conditional expression (9), it is possible to make small the absolute value of curvature of the lens surface even when the refracting power is secured, and it becomes easy to suppress the occurrence of the spherical aberration and the coma aberration.

Moreover, conditional expression (10) is an expression regarding a correction of the chromatic aberration, and in particular, an oblique chromatic aberration of magnification. For correcting favorably inside the second lens unit, the chromatic aberration occurred due to a substantial negative refracting power of the second lens unit, it is preferable to use for the positive lens, a material having a comparatively substantial chromatic dispersion in an appropriate range.

It is preferable to secure dispersion and to carry out correction of the chromatic aberration occurred in the two negative lenses by making an arrangement such that an upper limit value is not higher than an upper limit value in conditional expression (10). It is preferable to suppress a chromatic dispersion at a short wavelength side and an occurrence of a secondary spectrum by suppressing a chromatic aberration at a short wavelength side occurred due to this positive lens, by making an arrangement such that a lower limit value is not lower than a lower limit value in conditional expression (10).

The zoom lens system may satisfy the following conditional expressions.

$$1.87 < n_{d2p} < 2.15 \quad (9')$$

$$15 < \nu_{d2p} < 26 \quad (10')$$

The zoom lens system may further satisfy the following conditional expressions.

$$1.90 < n_{d2p} < 2.12 \quad (9'')$$

$$17 < \nu_{d2p} < 20 \quad (10'')$$

Accordingly, it is possible to show further the abovementioned effect.

Moreover, for achieving a favorable optical performance by suppressing the occurrence of aberration, an aspherical surface may be disposed at least for a lens surface on the object side of the first negative lens $L_{2n1}$ closest to the object in the second lens unit. Moreover, both the surfaces may be let to be aspherical surfaces. This is effective for the correction of the coma aberration and the image plane curvature.

In this case, the zoom lens system may satisfy the following conditional expressions.

$$0.001 < asp_{2n1f}/f_t < 0.07 \quad (11)$$

$$0.005 < (asp_{2n1f} + |asp_{2n1r}|)/f_w < 0.15 \quad (12)$$

where, $asp_{2n1f}$ denotes an aspherical deviation at a lens surface toward the object, of the first negative lens $L_{2n1}$ in the second lens unit, $asp_{2n1r}$ denotes an aspherical deviation at a lens surface toward the image of the first negative lens $L_{2n1}$ in the second lens unit, and fw denotes a focal length at the wide angle end, of the entire zoom lens system.

Figure 22:
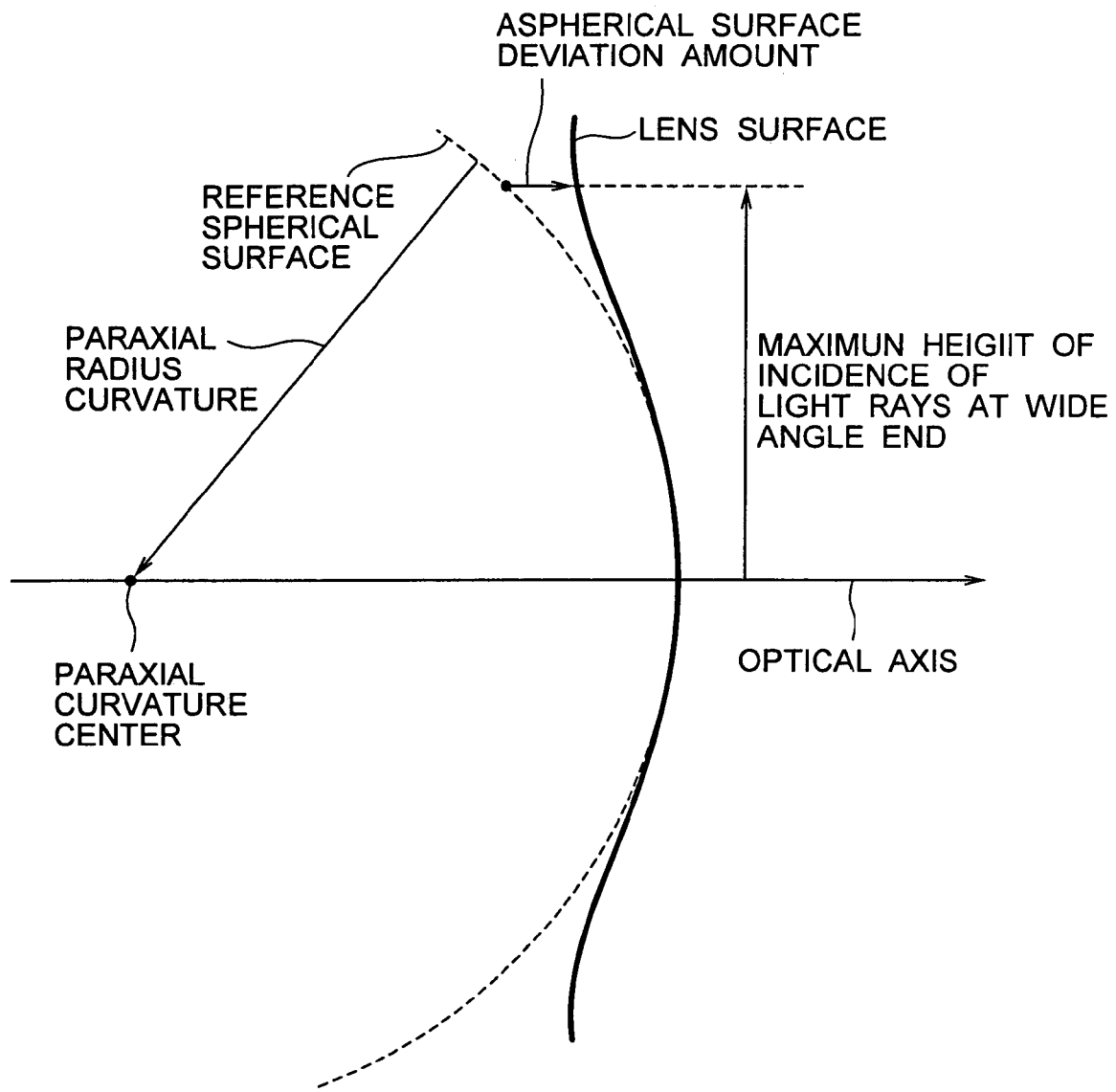
FIG. 22 is a diagram describing an amount of aspherical deviation.

The aspherical deviation, as shown in FIG. 22, is a distance from a reference spherical surface up to a lens surface when measured in a direction parallel to the optical axis, at a position of a maximum height of light rays incident at the wide angle end on the lens surface, when a spherical surface having a vertex same as a vertex of the lens, and for which a paraxial radius of curvature is let to a radius of curvature, is let to be the reference spherical surface, and a direction toward the image is let to be a positive reference numeral. The amount of aspherical deviation when the lens surface is a spherical or a flat is zero.

A reason for and an effect of adopting the above-mentioned arrangement in the zoom lens system will be described below. By making small the negative refracting power in a portion around the surface toward the object side of the first negative lens by making an arrangement such that a lower limit value is not lower than a lower limit value in conditional expression (11), it becomes easy to carry out the correction of oblique aberration at the wide angle end. It is preferable to suppress an occurrence of an asymmetric aberration due to decentering by suppressing the amount of aspherical deviation by making an arrangement such that an upper limit value is not higher than an upper limit value in conditional expression (11).

By making an arrangement such that a lower limit value is not lower than a lower limit value in conditional expression (12), it becomes easy to secure an effect of aberration correction due to the aspherical surface, and it becomes easy to suppress an excessive barrel distortion. By making an arrangement such that an upper limit value is not higher than an upper limit value in conditional expression (12), an extent of a change in shape of the aspherical surface is suppressed, and it becomes easy to suppress an effect of aberration due to decentering.

It is preferable to let the lower limit value both in conditional expressions (11) and (12) to be 0.006, and a lower limit value of 0.01 is more preferable. It is preferable to let the upper limit value both in conditional expressions (11) and (12) to be 0.06, and an upper limit value of 0.04 is more preferable.

From a point of view of making compact similarly as the second lens unit, it is advantageous to form also the first lens unit by a fewer number of lenses for making small when collapsed. When the magnification ratio is made higher, it is preferable to suppress the occurrence of the chromatic aberration particularly at the telephoto end.

Therefore, it is preferable that the first lens unit includes two lenses namely a positive lens $L_{1p}$ and a negative lens $L_{1n}$, and to make it advantageous for making the size small while suppressing the chromatic aberration.

Moreover, in the zoom lens system, an arrangement may be made such that each of the negative lens and the positive lens in the first lens unit is a single lens which is not cemented. When such an arrangement is made, it is possible to correct favorably the coma aberration at the telephoto end in particular, by using an air lens which is formed between the two lenses.

In this case, the zoom lens system may satisfy the following conditional expression.

$$0.0 \leq d_{1np}/d_1 < 0.2 \quad (13)$$

where, $d_{1np}$ denotes a distance on the optical axis between the negative lens and the positive lens in the first lens unit, and $d_1$ denotes a distance on the optical axis from a surface of incidence up to a surface of emergence of the first lens unit.

A reason for and an effect of adopting the above-mentioned arrangement in the zoom lens system will be described below. By suppressing an effective diameter of the lens, and by suppressing a height of off-axis light rays passing through a lens closest to the object by making an arrangement such that an upper limit value is not higher than an upper limit value in conditional expression (13), it becomes easy to make the zoom lens compact in the radial direction. A lower limit value is not lowered below a lower limit value in conditional expression (13), and does not have a minus sign.

The zoom lens system may satisfy the following conditional expression.

$$0.0 \leq d_{1np}/d_1 < 0.1 \quad (13')$$

The zoom lens system may further satisfy the following conditional expression.

$$0.0 \leq d_{1np}/d_1 < 0.03 \quad (13'')$$

Accordingly, it is possible to show further the abovementioned effect.

Moreover, in the zoom lens system, the negative lens and the positive lens in the first lens unit may be cemented. Accordingly, it is possible to correct favorably a chromatic aberration of magnification at the wide angle end and a longitudinal chromatic aberration at the telephoto end. Moreover, it is possible to reduce a decline in yield which is caused due to a deterioration of performance due to a relative decentering, which leads to a reduction in cost.

Moreover, in the zoom lens system, an optimum material may be set for the positive lens $L_{1p}$ and the negative lens $L_{1n}$ in the first lens unit. Concretely, the material of the positive lens $L_{1p}$ and the negative lens $L_{1n}$ may satisfy the following conditional expressions.

$$1.47 < n_{d1p} < 1.90 \tag{14}$$

$$40 < v_{d1p} < 85 \tag{15}$$

$$1.75 < n_{d1n} < 2.06 \tag{16}$$

$$12 < v_{d1n} < 31 \tag{17}$$

A reason for and an effect of adopting the above-mentioned arrangement will be described below. It is preferable to improve the mass production and the procurement of the material, and to carry out a cost reduction by making an arrangement such that an upper limit value is not higher than an upper limit value in conditional expression (14). By making an arrangement such that a lower limit value is not lower than a lower limit value in conditional expression (14), it is possible to make small the absolute value of curvature of the lens surface even when the refracting power is secured, and it becomes easy to suppress the occurrence of the spherical aberration and the coma aberration.

It is preferable to improve the procurement of the material having the high refractive index by making an arrangement such that an upper limit value is not higher than an upper limit value in conditional expression (15). By making an arrangement such that a lower limit value is not lower than a lower limit value in conditional expression (15), the chromatic dispersion is suppressed, which is advantageous for correction of the chromatic aberration.

It is preferable to improve the mass production and the procurement of the material, and to carry out the cost reduction by making an arrangement such that an upper limit value is not higher than an upper limit value in conditional expression (16). By making an arrangement such that a lower limit value is not lower than a lower limit value in conditional expression (16), it is possible to make small the absolute value of curvature of the lens surface even when the refracting power is secured, and it becomes easy to suppress the occurrence of the spherical aberration and the coma aberration.

Conditional expression (17) is an expression regarding a correction of the chromatic aberration, and in particular, a correction of a longitudinal chromatic aberration. For correcting favorably inside the first lens unit, the chromatic aberration which has occurred due to a substantial positive refracting power, it is preferable to use for the negative lens, a material having a comparatively substantial chromatic dispersion in an appropriate range. It is preferable to secure dispersion and to carry out correction of the chromatic aberration occurred in the positive lens by making an arrangement such that an upper limit value is not higher than an upper limit value in conditional expression (17). It is preferable to suppress the chromatic dispersion at a short wavelength side and the occurrence of the secondary spectrum by suppressing the chromatic aberration at the short wavelength side occurred due to this positive lens, by making an arrangement such that a lower limit value is not lower than a lower limit value in conditional expression (17).

The zoom lens system may satisfy the following conditional expressions.

$$1.57 < n_{d1p} < 1.80 \tag{14'}$$

$$45 < v_{d1p} < 70 \tag{15'}$$

$$1.82 < n_{d1n} < 2.04 \tag{16'}$$

$$15 < v_{d1n} < 27 \tag{17'}$$

The zoom lens system may further satisfy the following conditional expressions.

$$1.68 < n_{d1p} < 1.72 \tag{14''}$$

$$50 < v_{d1p} < 55 \tag{15''}$$

$$1.90 < n_{d1n} < 2.02 \tag{16''}$$

$$18 < v_{d1n} < 22 \tag{17''}$$

Accordingly, it is possible to show further the abovementioned effect.

Moreover, in the zoom lens system, the first lens unit may include in order from the object side the negative lens and the positive lens. When such arrangement is made, since positions of principal points on a rear side of the first lens unit move toward the image, it is effective for securing the zooming ratio.

Moreover, in the zoom lens system, the third lens unit may be arranged such that the third lens unit includes the following three lenses, for slimming the lens barrel.

Particularly, in the zoom lens system, it is desirable that the third lens unit includes three lenses which are arranged in order from the object side, namely, a positive lens, a positive lens, and a negative lens. Accordingly, by distributing a positive refracting power of the positive lens in two lenses, and by providing the negative lens on the image side, it becomes easy to suppress an aberration such as the spherical aberration, and to bring principal points of the third lens unit toward the image. Bringing the principal points toward the image is advantageous for securing the zooming ratio of the third lens unit.

Further, it is preferable to cement the negative lens and the positive lens second from the object side in the third lens unit. By cementing the positive lens and the negative lens, it is possible to carry out more effectively the correction of the longitudinal chromatic aberration. Moreover, by making the positive lens and the negative lens to be a cemented lens, it is possible to prevent a degradation of optical performance due to relative decentering of lenses in the assembling process. This leads to an improvement in the yield and the reduction of cost.

Further, disposing one or more aspheric surfaces in the third lens unit has a further effect on correction of the spherical aberration and the coma aberration. Particularly, it is preferable to let the positive lens closest to the object in the third lens unit to be a biaspherical lens. When an aspherical surface is disposed on a plurality of lenses, the degradation of optical performance due to the relative decentering of the lenses tends to be substantial. However, by letting both side surfaces of one lens to be aspherical, it is possible to carry out a further favorable correction of the spherical aberration and the coma aberration while suppressing the degradation of optical performance due to the relative decentering of the lenses to be small.

Moreover, in the zoom lens system, from a view point of balance of compactness and the optical performance, it is preferable to set the refracting power of the first lens unit such that the following conditional expression is satisfied.

$$0.3 < f_1/f_t < 1.5 \tag{18}$$

where, $f_1$ denotes a focal length of the first lens unit.

A reason for and an effect of adopting the above-mentioned arrangement in the zoom lens system will be described below. By making an arrangement such that an upper limit value is not higher than an upper limit value in conditional expression (18), it becomes easy to reduce an overall length of the zoom lens system, and it becomes easy to make the zoom lens system small. By suppressing the refracting power to be moderate by making an arrangement such that a lower limit value is not lower than a lower limit value in conditional expression (18), it becomes easy to suppress the coma aberration and the spherical aberration at the telephoto end.

The zoom lens system may satisfy the following conditional expression.

$$0.45 < f_1/f_t < 1.1 \quad (18')$$

The zoom lens system may satisfy further the following conditional expression.

$$0.6 < f_1/f_t < 0.7 \quad (18'')$$

Accordingly, it is possible to show further the abovementioned effect.

Moreover, in the zoom lens system, it may satisfy the following conditional expression regarding the refracting power of the third lens unit, in the zoom lens system according to aspects from a first aspect to the seventeenth aspect.

$$0.07 < f_3/f_t < 0.53 \quad (19)$$

where, $f_3$ denotes a focal length of the third lens unit.

A reason for and an effect of adopting the above-mentioned arrangement in the zoom lens system will be described below. Securing the refracting power by making an arrangement such that an upper limit value is not higher than an upper limit value in conditional expression (19) becomes advantageous for shortening the overall length. Suppressing the refracting power by making an arrangement such that a lower limit value is not lower than a lower limit value in conditional expression (19) becomes advantageous for the aberration correction in the third lens unit.

The zoom lens system may satisfy the following conditional expression.

$$0.11 < f_3/f_t < 0.40 \quad (19')$$

The zoom lens system may further satisfy the following conditional expression.

$$0.15 < f_3/f_t < 0.27 \quad (19'')$$

Accordingly, it is possible show further the abovementioned effect.

Moreover, in the zoom lens system, it may be let to be a four-unit zoom lens system which includes in order from an object side thereof, the first lens unit, the second lens unit, the third lens unit, and a fourth lens unit having a positive refracting power in the abovementioned zoom lens system according to aspects from the first aspect to the eighteenth aspect.

A reason for and an effect of adopting the above-mentioned arrangement in the zoom lens system will be described below. Due to the fourth lens unit having the positive refracting power, it becomes easy to reduce the overall length of the zoom lens system. Moreover, it becomes easy to position the exit pupil toward the object side, which is further advantageous in a case of using an electronic image pickup element.

Moreover, in the zoom lens system, it may be let to be a five-unit zoom lens system which includes in order from an object side thereof, the first lens unit, the second lens unit, the third lens unit, a fourth lens unit having a negative refracting power, and a fifth lens unit having a positive refracting power, in the abovementioned zoom lens system.

A reason for and an effect of adopting the above-mentioned arrangement in the zoom lens system will be described below. Due to the fifth lens unit having a positive refracting power, it becomes easy to reduce the overall length of the zoom lens system. Moreover, it becomes easy to position the exit pupil toward the object side, which is further advantageous in a case of using an electronic image pickup element. Moreover, moving the fourth lens unit having a negative refracting power, independent of the third lens unit and the fourth lens unit, at the time of zooming becomes advantageous for correction of an oblique aberration at the time of zooming.

Moreover, in the zoom lens system, it may satisfy the following conditional expression regarding a refracting power of a lens unit which is positioned closest to the abovementioned image in the zoom lens system, $$0.2 < f_{RE}/f_t < 0.9 \quad (20)$$

where, $f_{RE}$ denotes a focal length of the lens unit which is positioned closest to the image, in the zoom lens system.

A reason for and an effect of adopting the above-mentioned arrangement in the zoom lens system will be described below. It is preferable to secure an effect of making refract off-axis light beam by securing the refracting power of a lens unit which is positioned closest to the image by making an arrangement such that an upper limit value is not higher than an upper limit value in conditional expression (20). It is possible to make small an angle of light beam which is incident on an electronic image pickup element such as a CCD and a CMOS disposed at an image plane, and it becomes easy to suppress an occurrence of shading of brightness at a portion around a taking screen. By making an arrangement such that a lower limit value is not lower than a lower limit value in conditional expression (20), it becomes easy to suppress a lack of correction of an image plane curvature. Moreover, it is desirable to carry out a focusing operation by moving a lens unit which is closest to the image, and it also becomes easy to suppress a change in the image plane curvature at the time of focusing.

The zoom lens system may satisfy the following conditional expression.

$$0.3 < f_{RE}/f_t < 0.7 \quad (20')$$

The zoom lens system may further satisfy the following conditional expression.

$$0.4 < f_{RE}/f_t < 0.5 \quad (20'')$$

Accordingly, it is possible to show further the abovementioned effect.

Further, the lens unit closest to the image may be formed of a plastic material. The main function of the lens unit closest to the image is to allow to incident light rays efficiently on the electronic image pickup element such as a CCD and a CMOS by disposing an exit pupil at an appropriate position. Due to such function, when the refracting power is set in a range as in the abovementioned conditional expression (20), comparatively substantial refracting power is not necessary, and it is possible to form by a glass having a low refractive index such as a plastic lens. When a plastic lens is used in the lens unit closest to the image, it is possible to suppress the cost to be low, and to provide even lower cost zoom lens system.

Moreover, in the zoom lens system, it may satisfy the following conditional expression, in the abovementioned zoom lens system.

$$4.8 < f_t/f_w < 15.0 \quad (21)$$

where,
$f_w$ is a focal length at the wide angle end, of the entire zoom lens system.

A reason for and an effect of adopting the above-mentioned arrangement in the zoom lens system will be described below. It is preferable to make it easy to secure the optical performance by making an arrangement such that an upper limit value is not higher than an upper limit value in conditional expression (21). By securing the magnification ratio by making an arrangement such that a lower limit value is not lower than a lower limit value in conditional expression (21), it is possible to exert sufficiently a function which enables to have compactness and a high zooming ratio of the zoom lens system of the present invention.

The zoom lens system may satisfy the following conditional expression.

$$5.5 < f_t/f_w < 12.0 \tag{21'}$$

The zoom lens system may satisfy further the following conditional expression.

$$6.5 < f_t/f_w < 9.0 \tag{21''}$$

Accordingly, it is possible to show further the abovementioned effect.

Moreover, an electronic image pickup apparatus according to a first aspect may be let to be an image pickup apparatus which includes the zoom lens system mentioned above, and an image pickup element which is disposed toward the image side thereof, and which converts an image formed by the zoom lens system to an electric signal.

Moreover, the electronic image pickup apparatus according to a second aspect may satisfy the following conditional expression in the electronic image pickup apparatus according to the first aspect.

$$0.48 < I_m/f_w < 0.85 \tag{22}$$

where,
$I_m$ denotes a maximum image height in an effective image pickup area, and
$f_w$ denotes a focal length of the entire zoom lens system, at a wide angle end.

An effective image pickup area is an area of an image pickup surface on an image pickup element, on which an image is displayed and recorded, and when the area changes, an image height in a state of maximum image height is defined as the maximum image height Im. It is preferable not to let a taking image angle be excessively large by making an arrangement such that an upper limit value is not higher than an upper limit value in conditional expression (22), and to reduce an occurrence of a barrel distortion. It is preferable to make use of merits of making small the size and widening of an angle in which, this arrangement is adopted, by making an arrangement such that a lower limit value is not lower than a lower limit value in conditional expression (22).

The zoom lens system may satisfy the following conditional expression.

$$0.50 < I_m/f_w < 0.78 \tag{22'}$$

The zoom lens system may further satisfy the following conditional expression.

$$0.55 < I_m/f_w < 0.6 \tag{22''}$$

Accordingly, it is possible to show further the abovementioned effect.

Moreover, the aperture stop may be moved integrally with the third lens unit at the time of zooming from the wide angle end to the telephoto end. Since the height of the off-axis light rays might be lowered, it is even more advantageous for making small the third lens unit. Further, the aperture stop and a shutter mechanism may be let to be an integral structure. Accordingly, the purpose is served without making large a size of a shutter unit, and with a small dead space at the time of moving the aperture stop and the shutter unit.

Moreover, for cutting unnecessary light such as a ghost and a flare, a flare aperture may be disposed at a location other than a location of the aperture stop. The flare aperture may be disposed at any location such as an object side of the first lens unit, between the first lens unit and the second lens unit, between the second lens unit and the third lens unit, between the lens units in the rear lens group, and between the rear lens group and an image plane. An arrangement may be made to cut the flare light rays by a frame member which holds the lens unit, or the flare aperture may be formed by a member other than the frame member. Moreover, a direct printing may be carried out, or a paint may be applied, or a seal may be adhered to the lens. Moreover, the shape may be any shape such as a circular shape, an elliptical shape, a rectangular shape, a polygon, and an area surrounded by a function curve. Moreover, not only harmful light beam, but also light beam such as a coma flare around a screen may be cut.

Moreover, the ghost and the flare may be reduced by applying an antireflection coating to each lens. A multi-coating is desirable, as the multi-coating is capable of reducing effectively the ghost and the flare. Moreover, an infra-red rays cutting coating may be applied to the lens surfaces and cover glasses.

Moreover, it is desirable that focusing is carried out at a lens unit closest to the image, in the zoom lens system. Since it is easy to make light weight the lens unit closest to the image, it is possible to reduce a load exerted on a motor at the time of focusing. Furthermore, since the overall length does not change at the time of focusing, and a drive motor can be disposed inside the lens frame, it is advantageous for making the lens frame compact. Although it is desirable to carry out focusing by the lens unit closest to the image as described above, the focusing may be carried out by any of the first lens unit, the second lens unit, and the third lens unit. Moreover, the focusing may also be carried out by moving a plurality of lens units. Moreover, the focusing may be carried out by drawing out the entire lens system, or by drawing out some of the lenses, or the focusing may be carried over.

Moreover, the shading of brightness in a portion around an image may be reduced by shifting a micro lens of the CCD. For instance, a design of the micro lens of the CCD may be changed according to an angle of incidence of light rays for each image height. Moreover, an amount of degradation in the portion around an image may be corrected by an image processing. Moreover, a distortion may be let to occur intentionally in the zoom lens system, and the distortion may be corrected by carrying out electrically an image processing after taking pictures.

It is preferable that each of the above-mentioned inventions satisfies arbitrarily a plurality of conditional expressions simultaneously. Moreover, regarding each conditional expression, only an upper limit value or a lower limit value of a numerical range of further restricted conditional expressions may be restricted. Moreover, various arrangements described above may be combined arbitrarily.

As it has been described above, according to the present invention, it is possible to provide a zoom lens system which is advantageous for securing the zooming ratio and shortening the overall length at the telephoto end, and in which it is easy to secure the optical performance. Furthermore, it is possible to provide a small size electronic image pickup apparatus which includes such zoom lens system.

Exemplary embodiments of a zoom lens system and an electronic image pickup apparatus according to the present invention will be described below in detail by referring to the accompanying diagrams. However, the present invention is not restricted to the embodiments described below.

In the embodiments described below, a compact zoom lens system having a high zooming ratio of about seven times, and which is capable of making bright $F_{NO}$ at the telephoto end is realized. Moreover, it is a zoom lens system in which, an image quality of an image taken is maintained to be favorable, and which is a low cost zoom lens system suitable for an electronic image pickup apparatus such as a CCD and a CMOS.

Embodiments from a first embodiment to an eighth embodiment of the zoom lens system of the present invention will be described below. Lens cross-sectional views at a wide angle end, an intermediate state, and a telephoto end of an infinite object point focusing of the first embodiment to the eighth embodiment are shown in FIG. 1A, FIG. 1B, and FIG. 1C to FIG. 8A, FIG. 8B, and FIG. 8C. In FIG. 1A to FIG. 8C, G1 denotes a first lens unit, G2 denotes a second lens unit, S denotes an aperture stop, G3 denotes a third lens unit, G4 denotes a fourth lens unit, G5 denotes a fifth lens unit, F denotes a parallel flat plate which forms a low pass filter in which, a wavelength region restricting coating which restricts infrared light is applied, C denotes a parallel flat plate of carbon glass of an electronic image pickup element, and I denotes an image surface. A multilayered film for restricting a wavelength region may be applied to a surface of the carbon glass C. Moreover, the carbon glass C may be let to have an effect of a low pass filter.

In each embodiment, the aperture stop S moves integrally with the third lens unit G3. Each numerical data is data in a state when focused at an infinite object. A unit of length for each value is mm, and a unit of angle is degrees (°).

Focusing in each embodiment is carried out by moving a lens unit closer to an image. An image height $I_m$ in each embodiment is 3.84 mm. Further, zoom data are values at a wide angle end (WE), at an intermediate state (ST) during zooming, and at a telephoto end (TE). A flat plane in the third lens unit indicates a flare aperture.

Figure 1B:
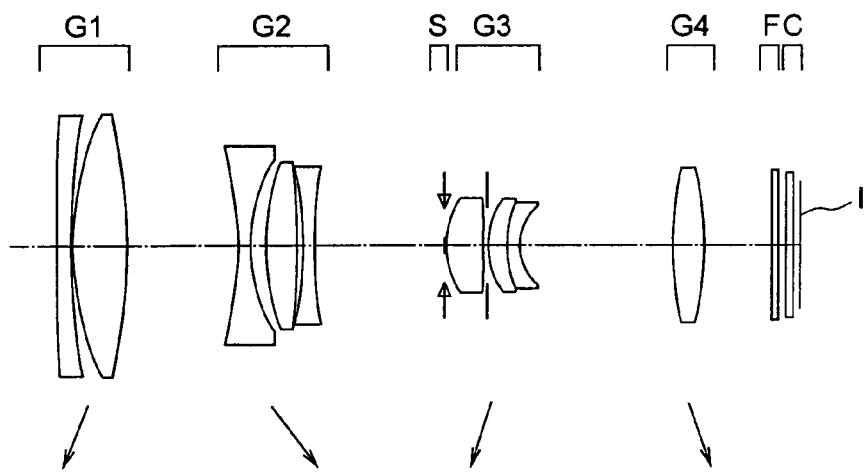
Figure 1C:
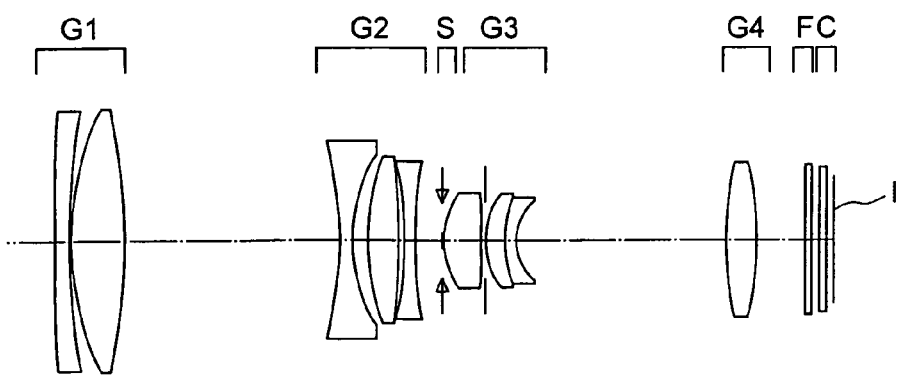

A zoom lens system in the first embodiment, as shown in FIG. 1A to FIG. 1C, includes, in order from an object side thereof, a first lens unit G1 having a positive refracting power, a second lens unit G2 having a negative refracting power, an aperture stop S, a third lens unit G3 having a positive refracting power, and a fourth lens unit G4 having a positive refracting power.

At the time of zooming from the wide angle end to the telephoto end, the first lens unit G1 moves toward the object side, the second lens unit G2 moves toward an image side, the third lens unit G3 moves integrally with the aperture stop S toward the object side, and the fourth lens unit G4 moves toward the image side.

In order from the object side, the first lens unit G1 includes a first negative meniscus lens having a convex surface directed toward the object side, and a second biconvex positive lens. The second lens unit G2 includes a third biconcave negative lens, a fourth biconvex positive lens, and a fifth biconcave negative lens. The third lens unit G3 includes a sixth biconvex positive lens, a seventh positive meniscus lens having a convex surface directed toward the object side, and an eighth negative meniscus lens having a convex surface directed toward the object side. The seventh negative meniscus lens and the eighth positive meniscus lens are cemented. The fourth lens unit G4 includes a ninth biconvex positive lens.

An aspheric surface is used for seven surfaces namely, a surface on the image side of the second biconvex positive lens, both surfaces of the third biconcave negative lens, a surface on the image side of the fifth biconcave negative lens, both surfaces of the sixth biconvex positive lens, and a surface on the object side of the ninth biconvex positive lens.

Figure 2A:
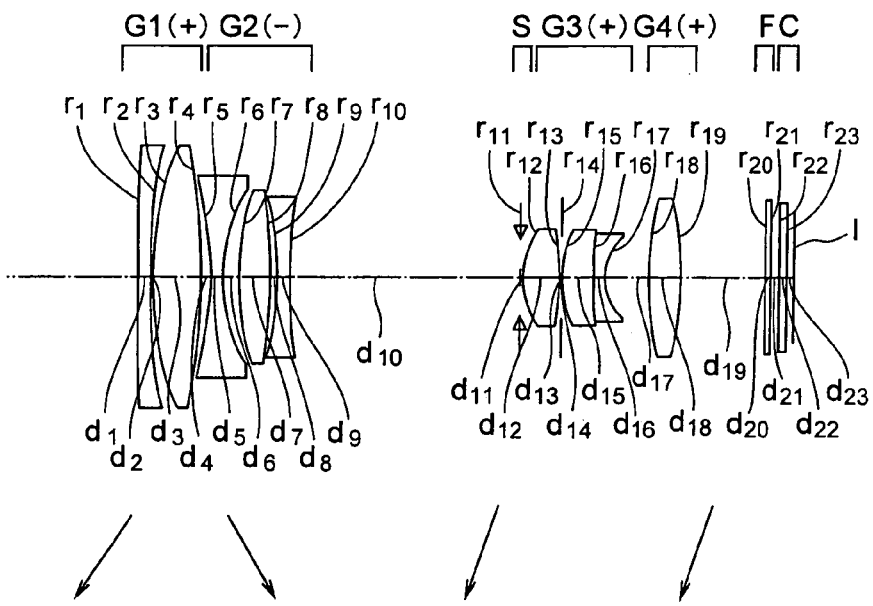
FIG. 2A, FIG. 2B, and FIG. 2C are diagrams similar to FIG. 1A, FIG. 1B, and FIG. 1C respectively, according to a second embodiment of the zoom lens system of the present invention.
Figure 2B:
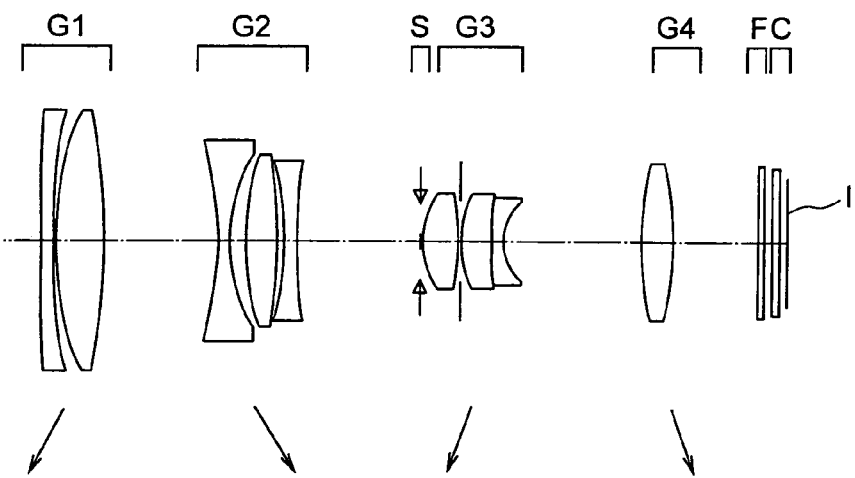
Figure 2C:
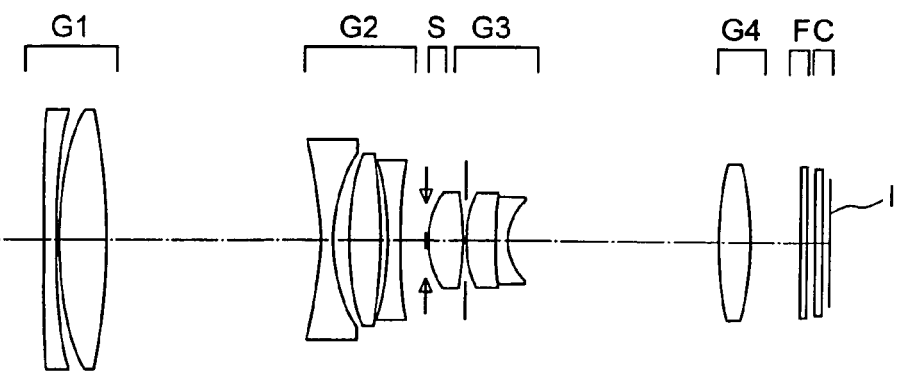

A zoom lens system in the second embodiment, as shown in FIG. 2A to FIG. 2C includes, in order from the object side thereof, a first lens unit G1 having a positive refracting power, a second lens unit G2 having a negative refracting power, an aperture stop S, a third lens unit G3 having a positive refracting power, and a fourth lens unit G4 having a positive refracting power.

At the time of zooming from the wide angle end to the telephoto end, the first lens unit G1 moves toward the object side, the second lens unit G2 moves toward an image side, the third lens unit G3 moves integrally with the aperture stop S toward the object side, and the fourth lens unit G4, after moving once toward the object side, is turned over, and moves toward the image side.

In order from the object side, the first lens unit G1 includes a first negative meniscus lens having a convex surface directed toward the object side, and a second biconvex positive lens. The second lens unit G2 includes a third biconcave negative lens, a fourth biconvex positive lens, and a fifth biconcave negative lens. The third lens unit G3 includes a sixth biconvex positive lens, a seventh positive meniscus lens having a convex surface directed toward the object side, and an eighth negative meniscus lens having a convex surface directed toward the object side. The seventh positive meniscus lens and the eighth negative meniscus lens are cemented. The fourth lens unit G4 includes a ninth biconvex positive lens.

An aspheric surface is used for six surfaces namely, a surface on the image side of the second biconvex positive lens, both surfaces of the third biconcave negative lens, both surfaces of the sixth biconvex positive lens, and a surface on the object side of the ninth biconvex positive lens.

Figure 3A:
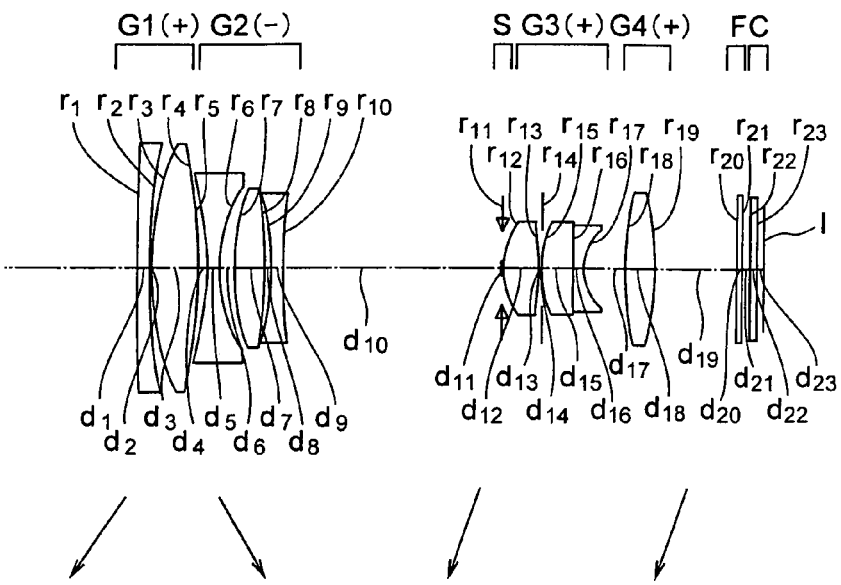
FIG. 3A, FIG. 3B, and FIG. 3C are diagrams similar to FIG. 1A, FIG. 1B, and FIG. 1C respectively, according to a third embodiment of the zoom lens system of the present invention.
Figure 3B:
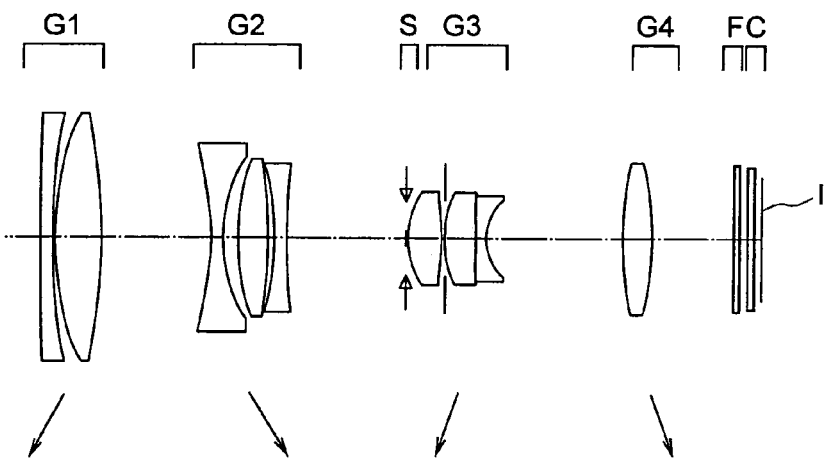
Figure 3C:
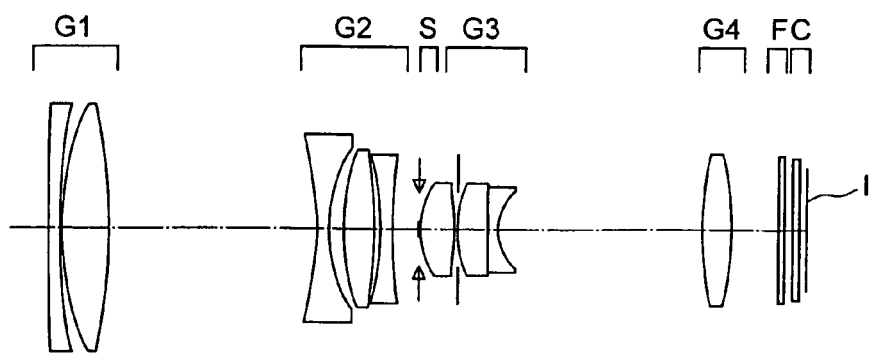

A zoom lens system in the third embodiment, as shown in FIG. 3A to FIG. 3C, includes, in order from the object side thereof, a first lens unit G1 having a positive refracting power, a second lens unit G2 having a negative refracting power, an aperture stop S, a third lens unit G3 having a positive refracting power, and a fourth lens unit G4 having a positive refracting power.

At the time of zooming from the wide angle end to the telephoto end, the first lens unit G1 moves toward the object side, the second lens unit G2 moves toward an image side, the third lens unit G3 moves integrally with the aperture stop S toward the object side, and the fourth lens unit G4, after moving once toward the object side, is turned over, and moves toward the image side.

In order from the object side, the first lens unit G1 includes a first negative meniscus lens having a convex surface directed toward the object side, and a second biconvex positive lens. The second lens unit G2 includes a third biconcave negative lens, a fourth biconvex positive lens, and a fifth biconcave negative lens. The third lens unit G3 includes a sixth biconvex positive lens, a seventh positive meniscus lens having a convex surface directed toward the object side, and an eighth negative meniscus lens having a convex surface directed toward the object side. The seventh positive meniscus lens and the eighth negative meniscus lens are cemented. The fourth lens unit G4 includes a ninth biconvex positive lens.

An aspheric surface is used for seven surfaces namely, a surface on the image side of the second biconvex positive lens, both surfaces of the third biconcave negative lens, both surfaces of the sixth biconvex positive lens, and both surfaces of the ninth biconvex positive lens.

Figure 4A:
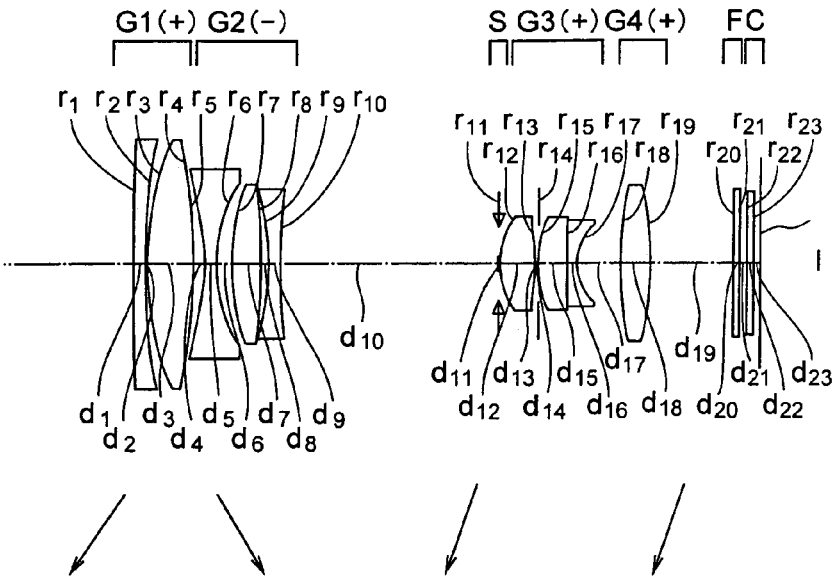
FIG. 4A, FIG. 4B, and FIG. 4C are diagrams similar to FIG. 1A, FIG. 1B, and FIG. 1C respectively, according to a fourth embodiment of the zoom lens system of the present invention.
Figure 4B:
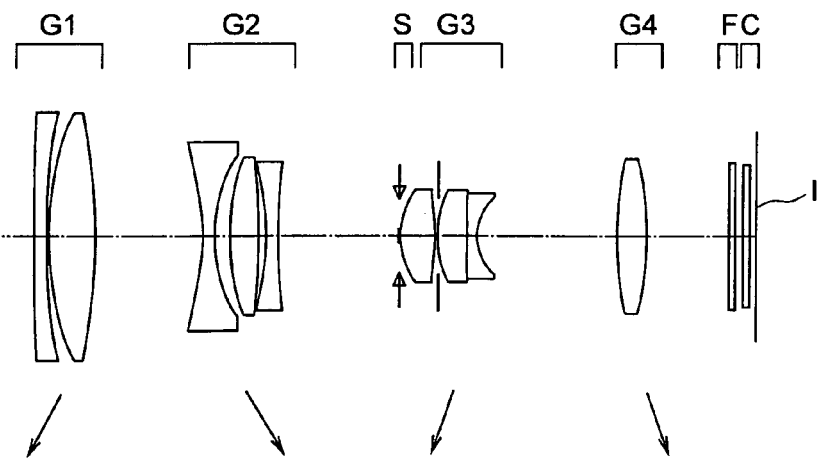
Figure 4C:
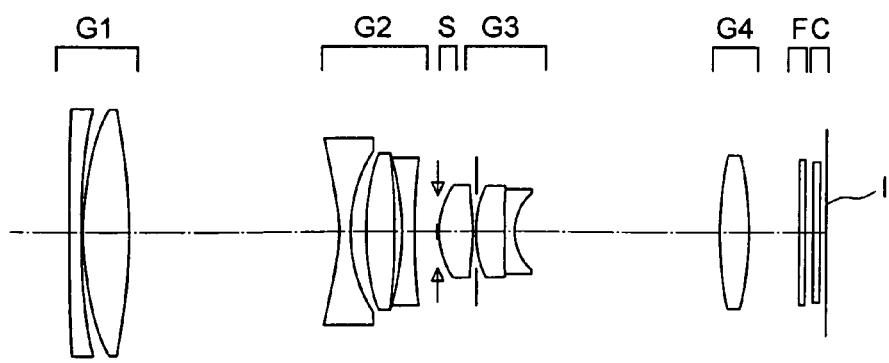

A zoom lens system in the fourth embodiment, as shown in FIG. 4A to FIG. 4C, includes, in order from the object side thereof, a first lens unit G1 having a positive refracting power, a second lens unit G2 having a negative refracting power, an aperture stop S, a third lens unit G3 having a positive refracting power, and a fourth lens unit G4 having a positive refracting power.

At the time of zooming from the wide angle end to the telephoto end, the first lens unit G1 moves toward the object side, the second lens unit G2 moves toward an image side, the third lens unit G3 moves integrally with the aperture stop S toward the object side, and the fourth lens unit G4, after moving once toward the object side, is turned over, and moves toward the image side.

In order from the object side, the first lens unit G1 includes a first negative meniscus lens having a convex surface directed toward the object side, and a second biconvex positive lens. The second lens unit G2 includes a third biconcave negative lens, a fourth biconvex positive lens, and a fifth biconcave negative lens. The third lens unit G3 includes a sixth biconvex positive lens, a seventh positive meniscus lens having a convex surface directed toward the object side, and an eighth negative meniscus lens having a convex surface directed toward the object side. The seventh positive meniscus lens and the eighth negative meniscus lens are cemented. The fourth lens unit G4 includes a ninth biconvex positive lens.

An aspheric surface is used for seven surfaces namely, a surface on the image side of the second biconvex positive lens, both surfaces of the third biconcave negative lens, both surfaces of the sixth biconvex positive lens, and both surfaces of the ninth biconvex positive lens.

Figure 5A:
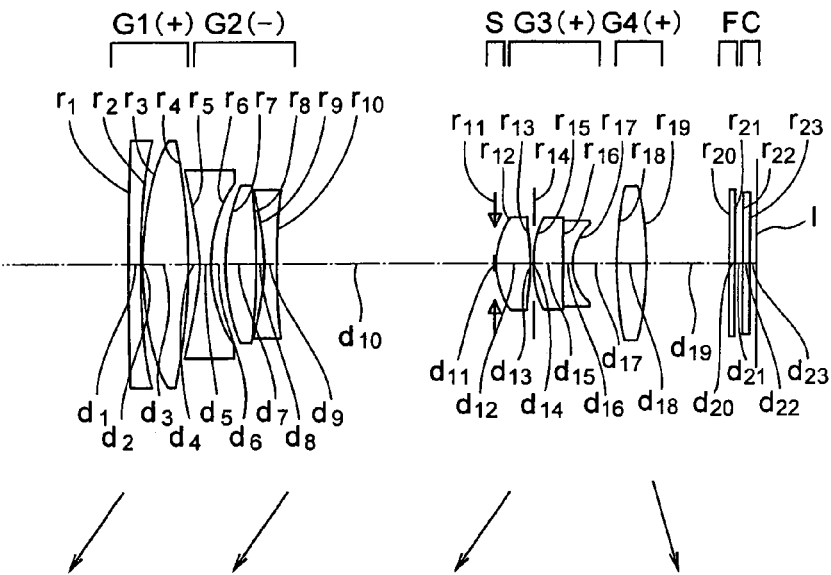
FIG. 5A, FIG. 5B, and FIG. 5C are diagrams similar to FIG. 1A, FIG. 1B, and FIG. 1C respectively, according to a fifth embodiment of the zoom lens system of the present invention.
Figure 5B:
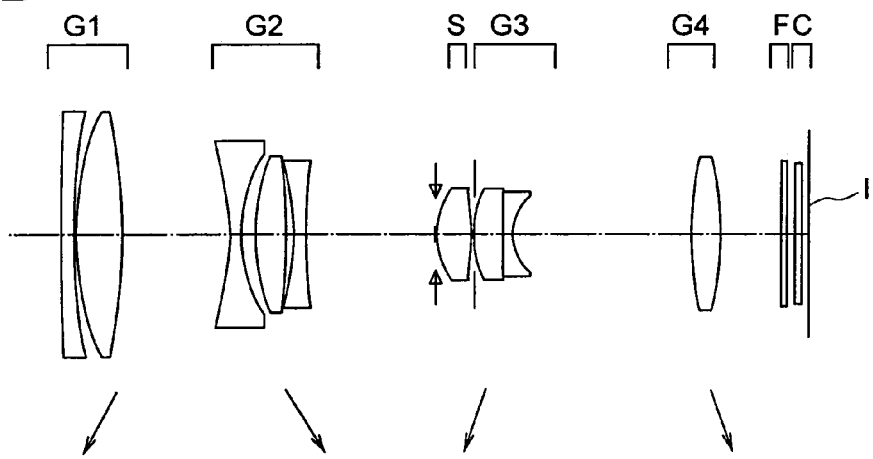
Figure 5C:
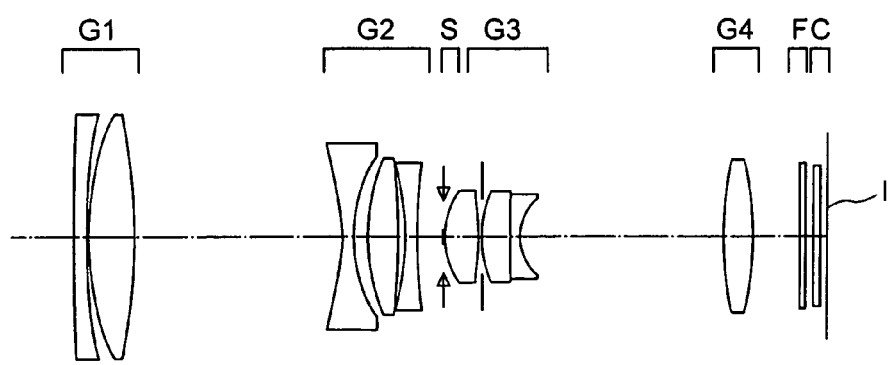

A zoom lens system in the fifth embodiment, as shown in FIG. 5A to FIG. 5C, includes in order from the object side thereof, a first lens unit G1 having a positive refracting power, a second lens unit G2 having a negative refracting power, an aperture stop S, a third lens unit G3 having a positive refracting power, and a fourth lens unit G4 having a positive refracting power.

At the time of zooming from the wide angle end to the telephoto end, the first lens unit G1 moves toward the object side, the second lens unit G2, after moving once toward the object side, is turned over, and moves toward the image side, the third lens unit G3 moves integrally with the aperture stop S toward the object side, and the fourth lens unit G4 moves toward the image side.

In order from the object side, the first lens unit G1 includes a first negative meniscus lens having a convex surface directed toward the object side, and a second biconvex positive lens. The second lens unit G2 includes a third biconcave negative lens, a fourth biconvex positive lens, and a fifth biconcave negative lens. The third lens unit G3 includes a sixth biconvex positive lens, a seventh positive meniscus lens having a convex surface directed toward the object side, and an eighth negative meniscus lens having a convex surface directed toward the object side. The seventh positive meniscus lens and the eighth negative meniscus lens are cemented. The fourth lens unit G4 includes a ninth biconvex positive lens.

An aspheric surface is used for seven surfaces namely, a surface on the image side of the second biconvex positive lens, both surfaces of the third biconcave negative lens, both surfaces of the sixth biconvex positive lens, and both surfaces of the ninth biconvex positive lens.

Figure 6A:
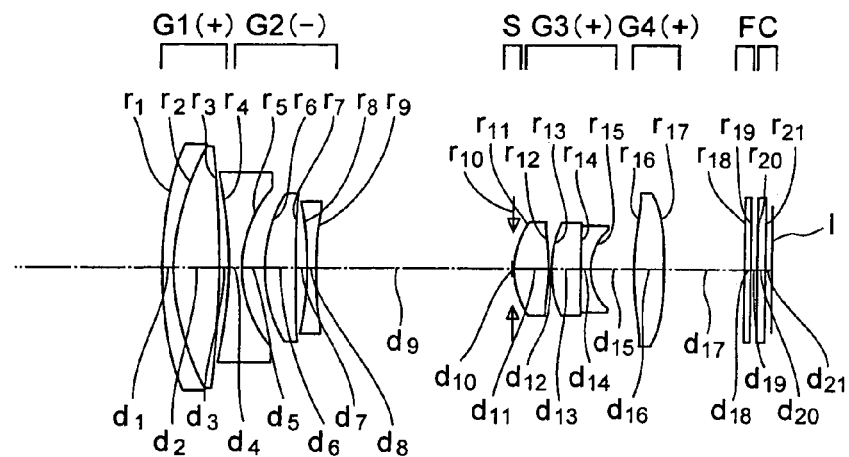
FIG. 6A, FIG. 6B, and FIG. 6C are diagrams similar to FIG. 1A, FIG. 1B, and FIG. 1C respectively, according to a sixth embodiment of the zoom lens system of the present invention.
Figure 6B:
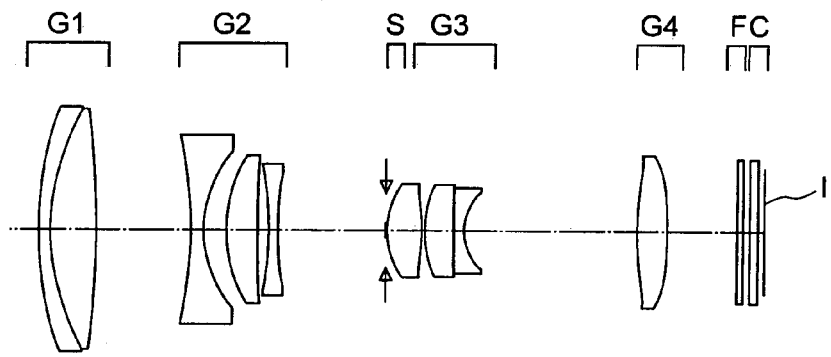
Figure 6C:
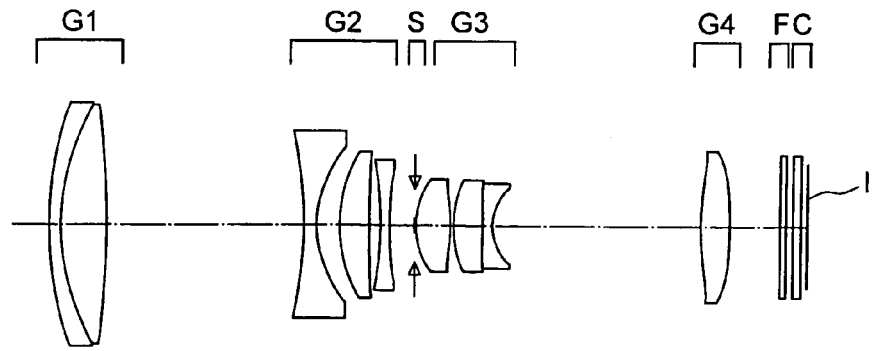

A zoom lens system in the sixth embodiment, as shown in FIG. 6A to FIG. 6C, includes, in order from the object side thereof, a first lens unit G1 having a positive refracting power, a second lens unit G2 having a negative refracting power, an aperture stop S, a third lens unit G3 having a positive refracting power, and a fourth lens unit G4 having a positive refracting power.

At the time of zooming from the wide angle end to the telephoto end, the first lens unit G1 moves toward the object side, the second lens unit G2, after moving once toward the object side, is turned over, and moves toward the image side, the third lens unit G3 moves integrally with the aperture stop S toward the object side, and the fourth lens unit G4 moves toward the image side.

In order from the object side, the first lens unit G1 includes a first negative meniscus lens having a convex surface directed toward the object side, and a second biconvex positive lens. The first negative meniscus lens and the second biconvex positive lens are cemented. The second lens unit G2 includes a third biconcave negative lens, a fourth positive meniscus lens having a convex surface directed toward the object side, and a fifth biconcave negative lens. The third lens unit G3 includes a sixth biconvex positive lens, a seventh positive meniscus lens having a convex surface directed toward the object side, and an eighth negative meniscus lens having a convex surface directed toward the object side. The seventh positive meniscus lens and the eighth negative meniscus lens are cemented. The fourth lens unit G4 includes a ninth biconvex positive lens.

An aspheric surface is used for seven surfaces namely, a surface on the image side of the second biconvex positive lens, both surfaces of the third biconcave negative lens, both surfaces of the sixth biconvex positive lens, and both surfaces of the ninth biconvex positive lens.

Figure 7A:
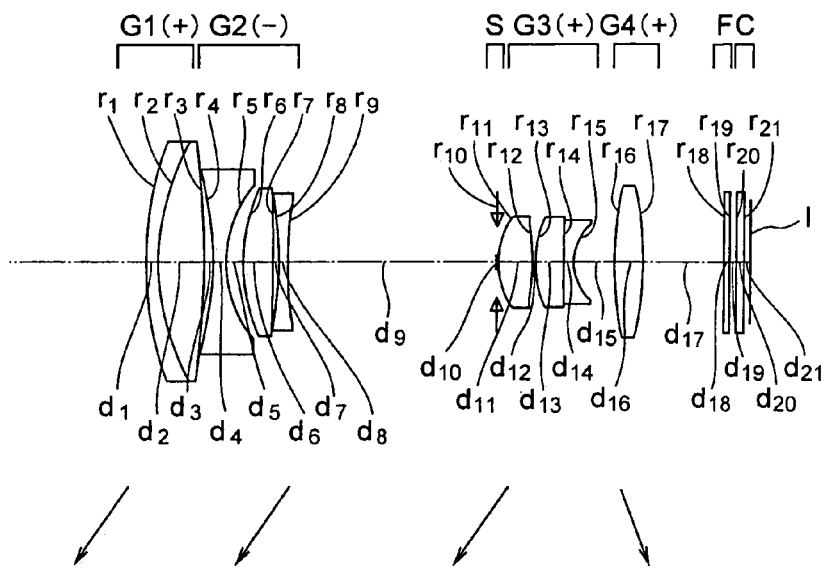
FIG. 7A, FIG. 7B, and FIG. 7C are diagrams similar to FIG. 1A, FIG. 1B, and FIG. 1C respectively, according to a seventh embodiment of the zoom lens system of the present invention.
Figure 7B:
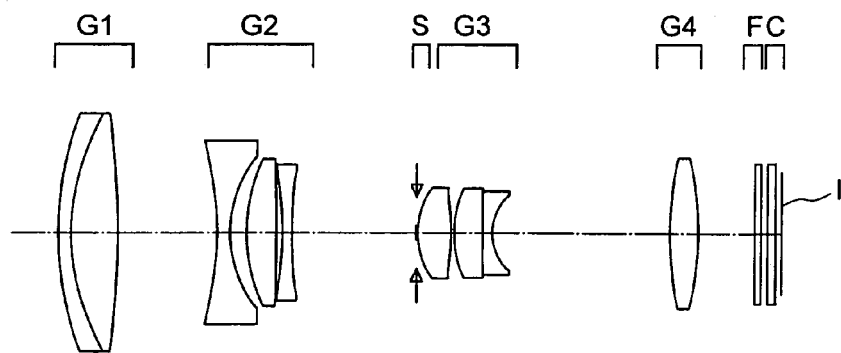
Figure 7C:
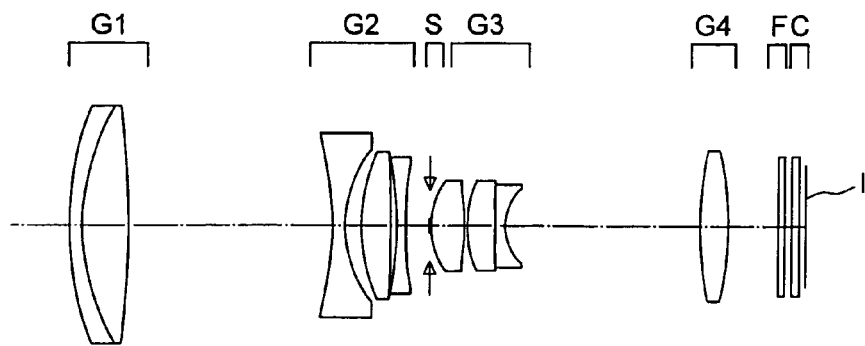

A zoom lens system in the seventh embodiment, as shown in FIG. 7A to 7C, includes, in order from the object side thereof, a first lens unit G1 having a positive refracting power, a second lens unit G2 having a negative refracting power, an aperture stop S, a third lens unit G3 having a positive refracting power, and a fourth lens unit G4 having a positive refracting power.

At the time of zooming from the wide angle end to the telephoto end, the first lens unit G1 moves toward the object side, the second lens unit G2, after moving once toward the object side, is turned over, and moves toward the image side, the third lens unit G3 moves integrally with the aperture stop S toward the object side, and the fourth lens unit G4 moves toward the image side.

In order from the object side, the first lens unit G1 includes a first negative meniscus lens having a convex surfaced directed toward the object side, and the second biconvex positive lens. The first negative meniscus lens and the second biconvex positive lens are cemented. The second lens unit G2 includes a third biconcave negative lens, a fourth biconvex positive lens, and a fifth biconcave negative lens. The third lens unit G3 includes a sixth biconvex positive lens, a seventh positive meniscus lens having a convex surface directed toward the object side, and an eighth negative meniscus lens having a convex surface directed toward the object side. The seventh positive meniscus lens and the eighth negative meniscus lens are cemented. The fourth lens unit G4 includes a ninth biconvex positive lens.

An aspheric surface is used for seven surfaces namely, a surface on the image side of the second biconvex positive lens, both surfaces of the third biconcave negative lens, both surfaces of the sixth biconvex positive lens, and both surfaces of the ninth biconvex positive lens.

Figure 8A:
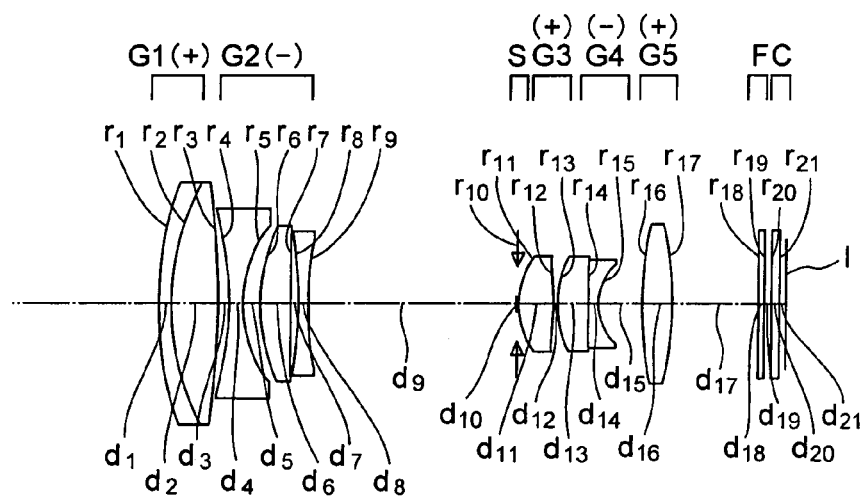
FIG. 8A, FIG. 8B, and FIG. 8C are diagrams similar to FIG. 1A, FIG. 1B, and FIG. 1C respectively, according to an eighth embodiment of the zoom lens system of the present invention.
Figure 8B:
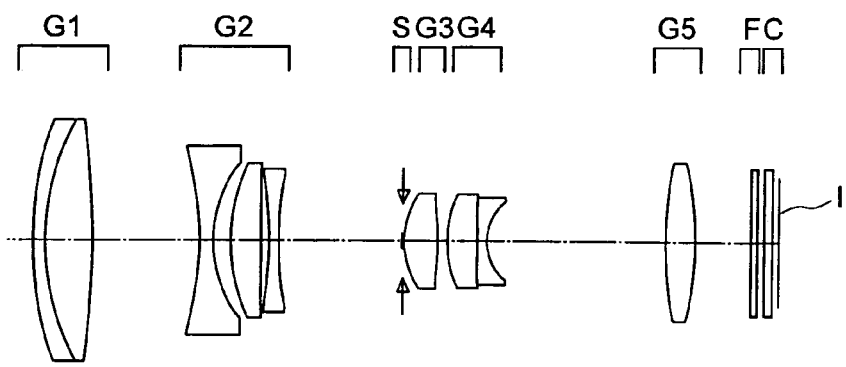
Figure 8C:
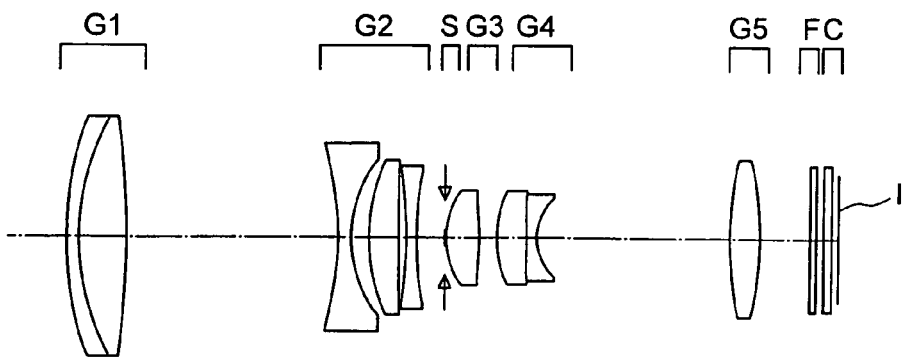
Figure 9A:
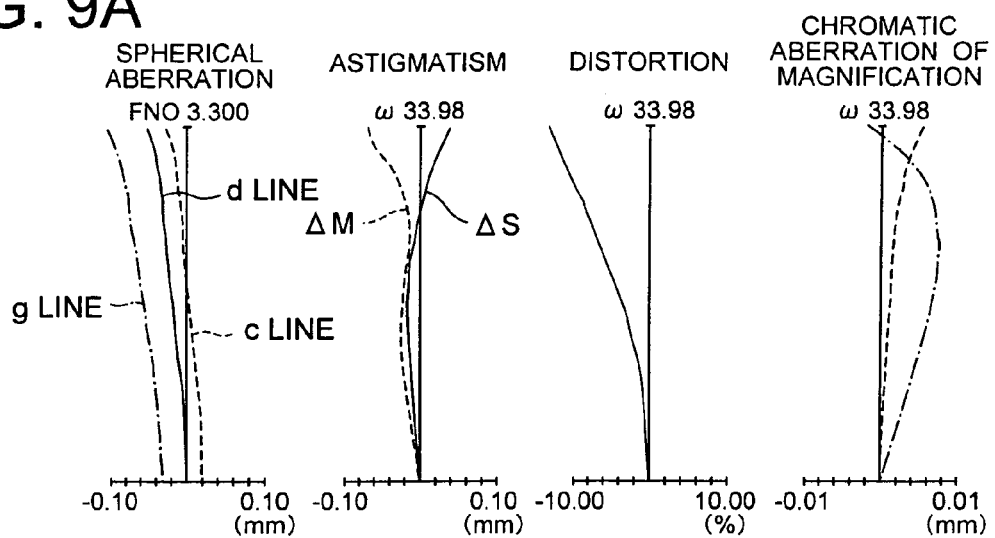
FIG. 9A, FIG. 9B, and FIG. 9C are diagrams showing a spherical aberration, an astigmatism, a distortion, and a chromatic aberration of magnification at the time of the infinite object point focusing, according to the first embodiment, where.
Figure 9B:
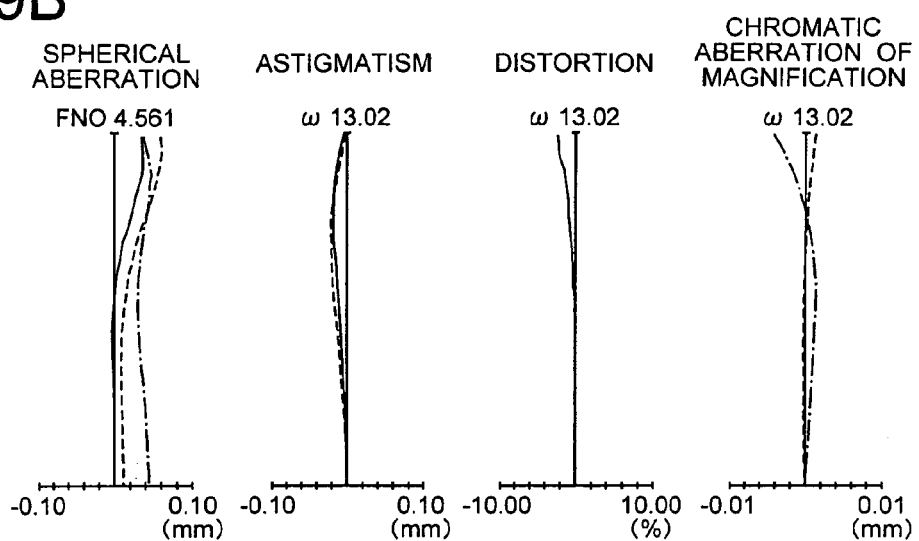
Figure 9C:
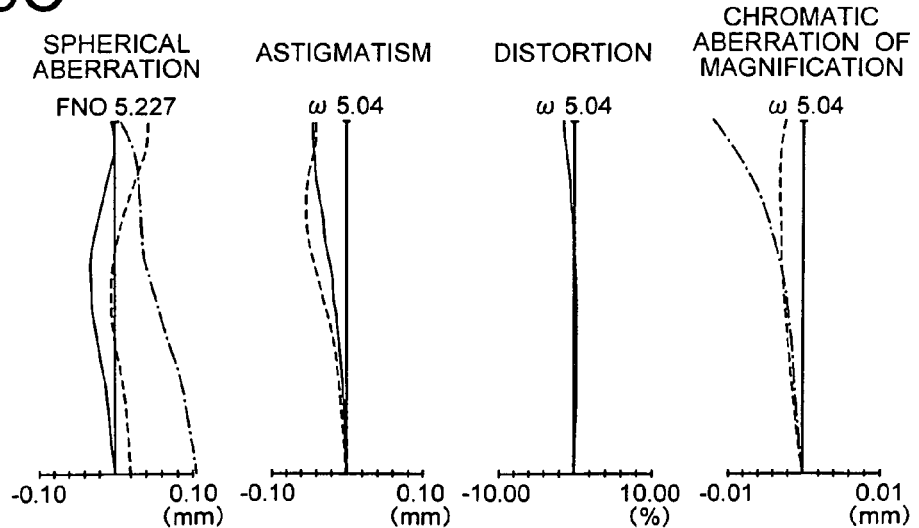
Figure 10A:
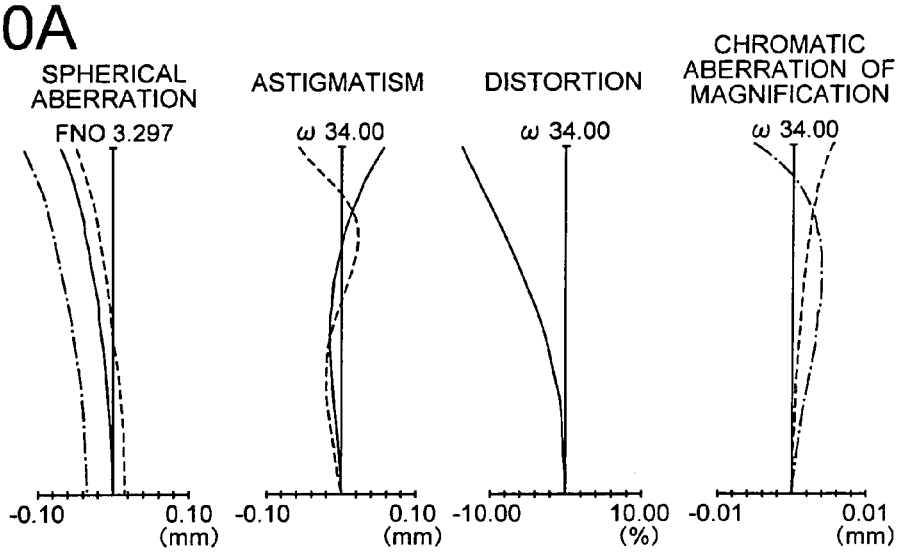
FIG. 10A, FIG. 10B, and FIG. 10C are diagrams similar to FIG. 9A, FIG. 9B, and FIG. 9C respectively, at the time of the infinite object point focusing, according to the second embodiment.
Figure 10B:
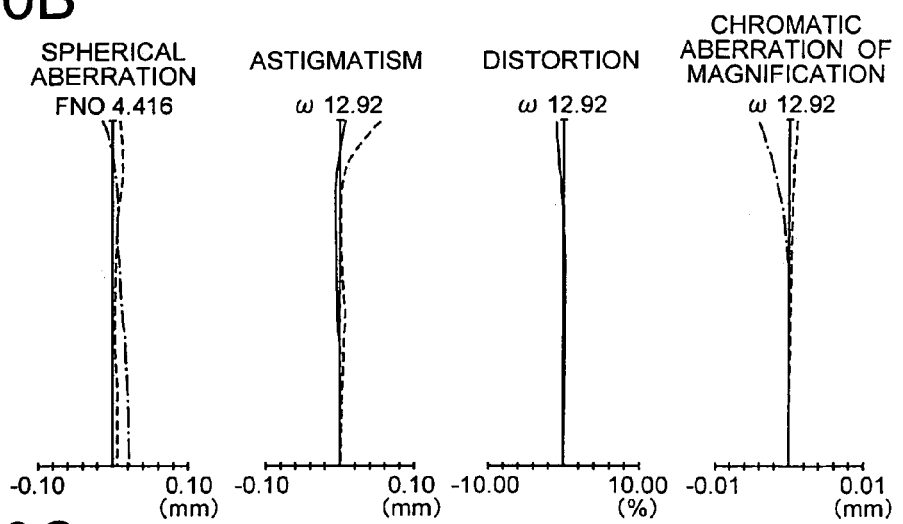
Figure 10C:
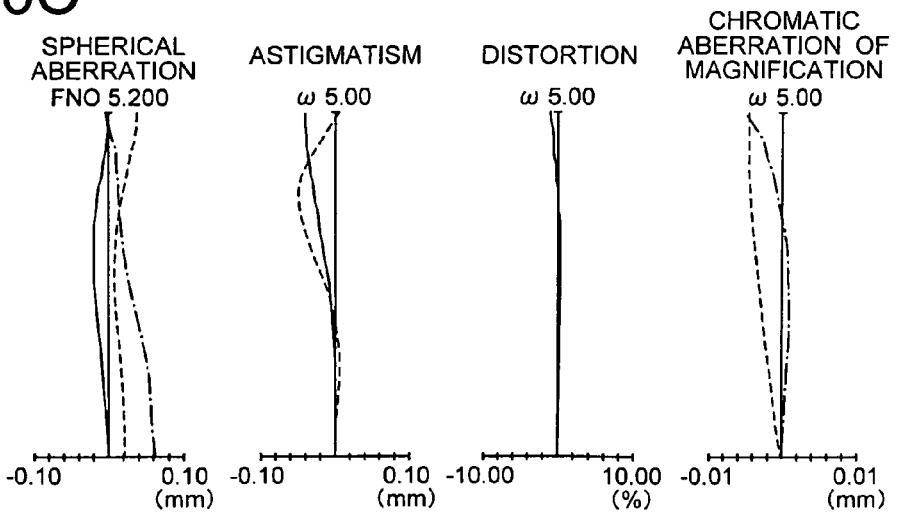
Figure 11A:
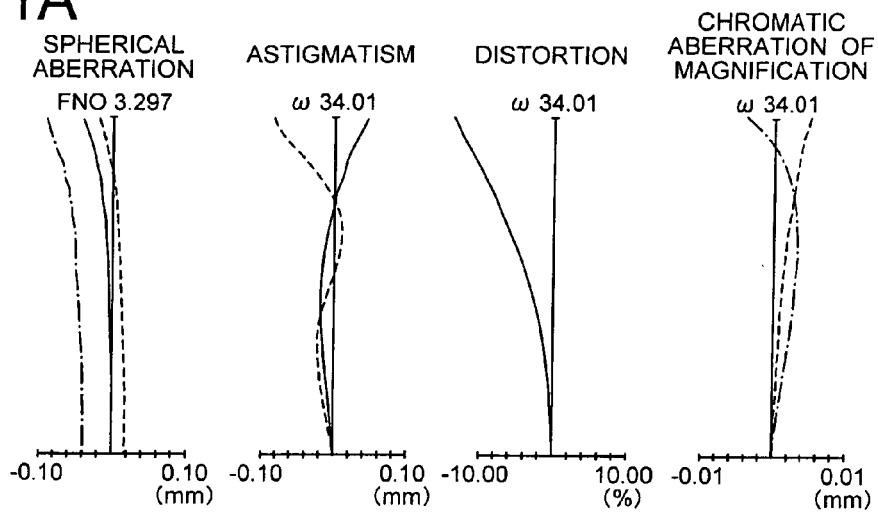
FIG. 11A, FIG. 11B, and FIG. 11C are diagrams similar to FIG. 9A, FIG. 9B, and FIG. 9C respectively, at the time of the infinite object point focusing, according to the third embodiment.
Figure 11B:
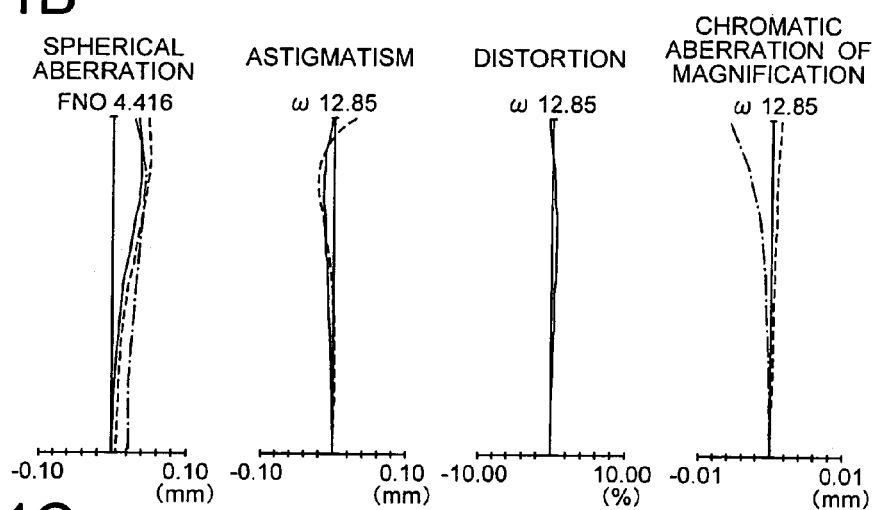
Figure 11C:
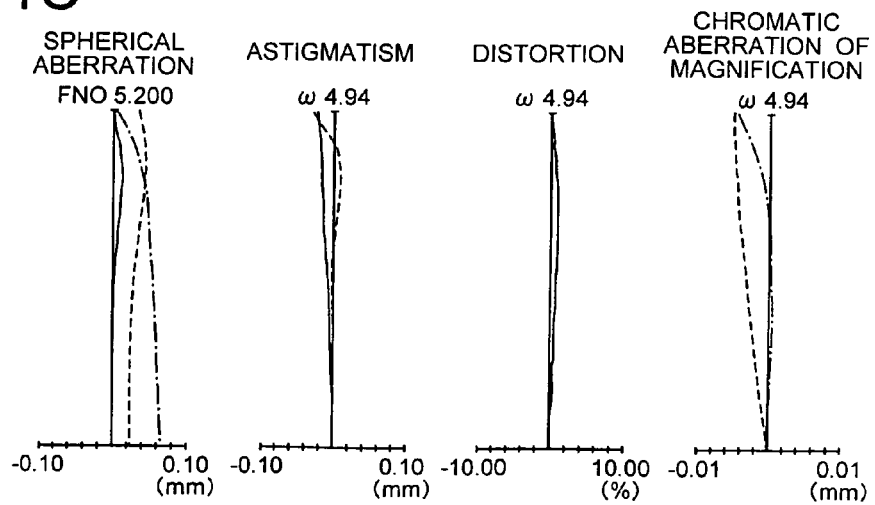
Figure 12A:
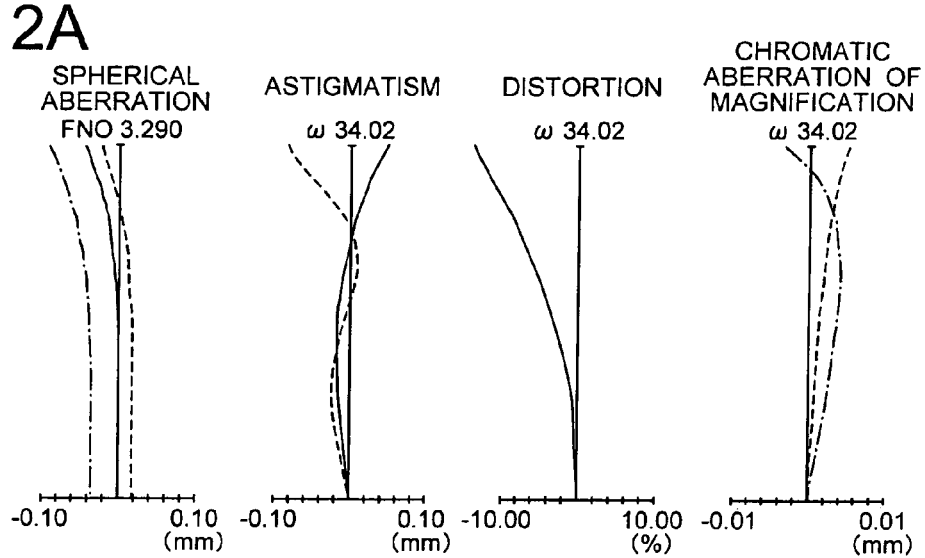
FIG. 12A, FIG. 12B, and FIG. 12C are diagrams similar to FIG. 9A, FIG. 9B, and FIG. 9C respectively, at the time of the infinite object point focusing, according to the fourth embodiment.
Figure 12B:
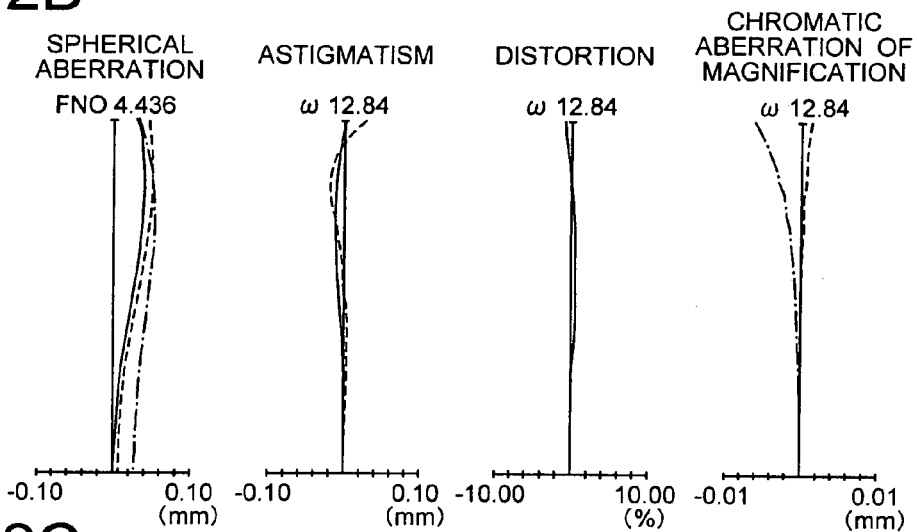
Figure 12C:
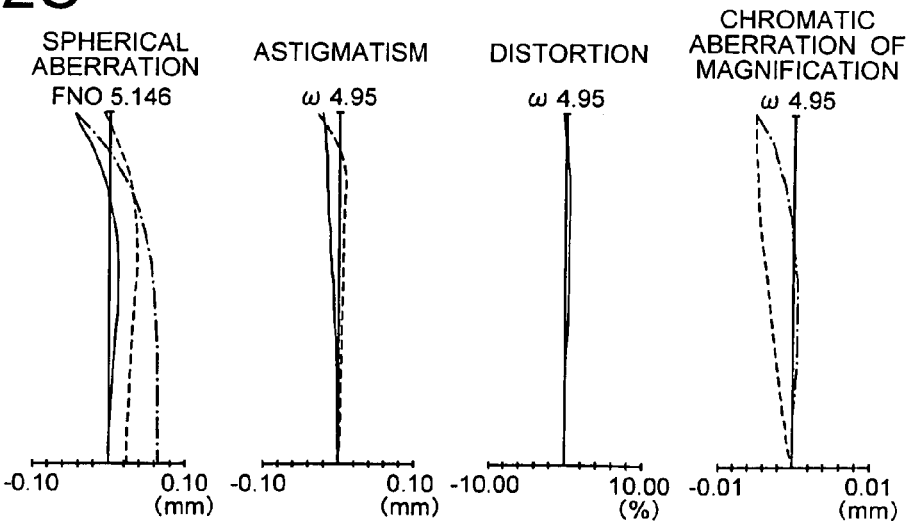
Figure 13A:
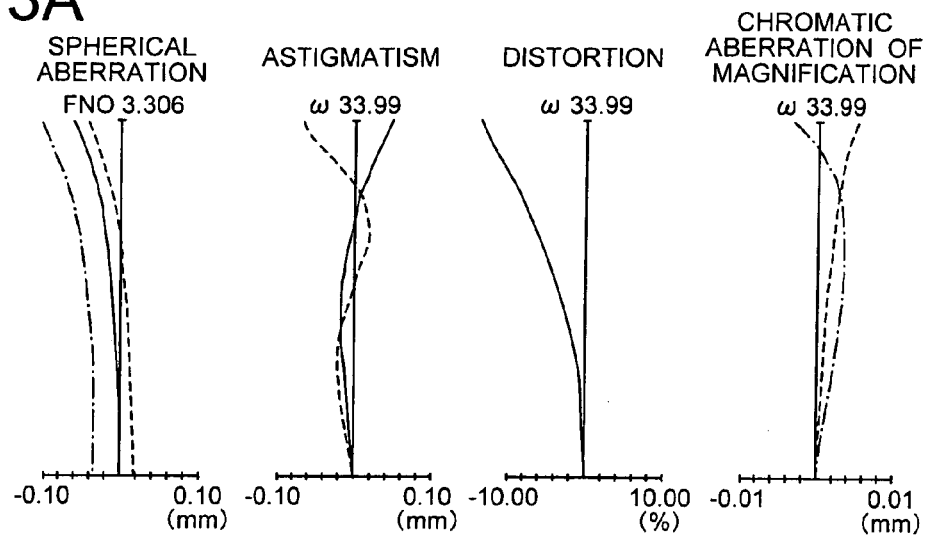
FIG. 13A, FIG. 13B, and FIG. 13C are diagrams similar to FIG. 9A, FIG. 9B, and FIG. 9C respectively, at the time of the infinite object point focusing, according to the fifth embodiment.
Figure 13B:
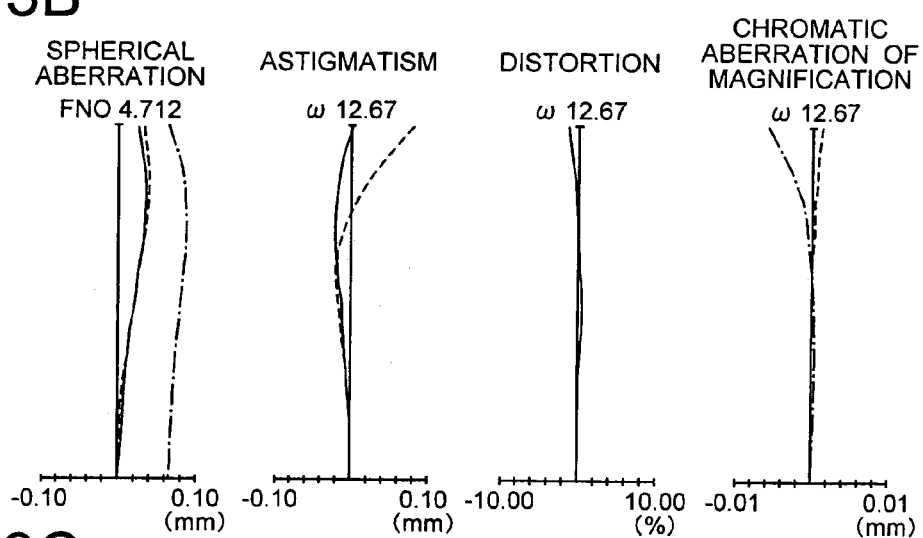
Figure 13C:
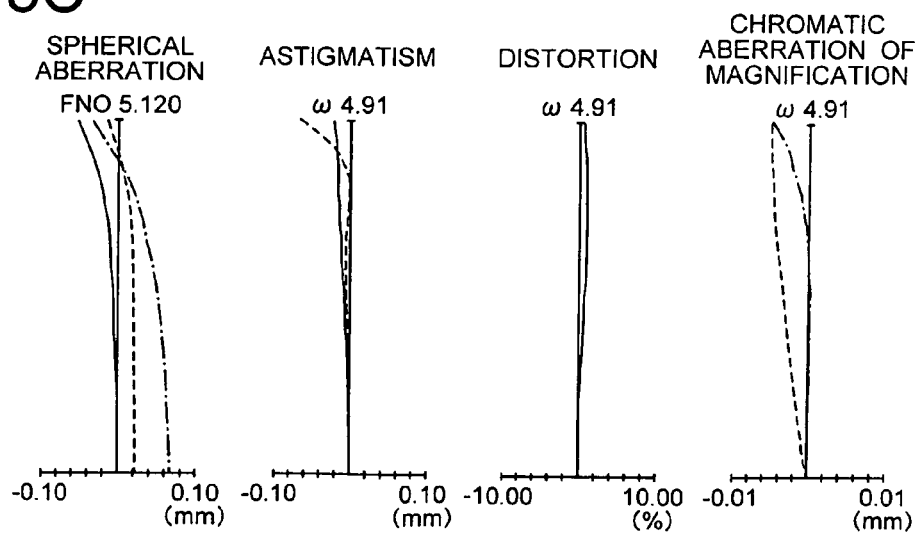
Figure 14A:
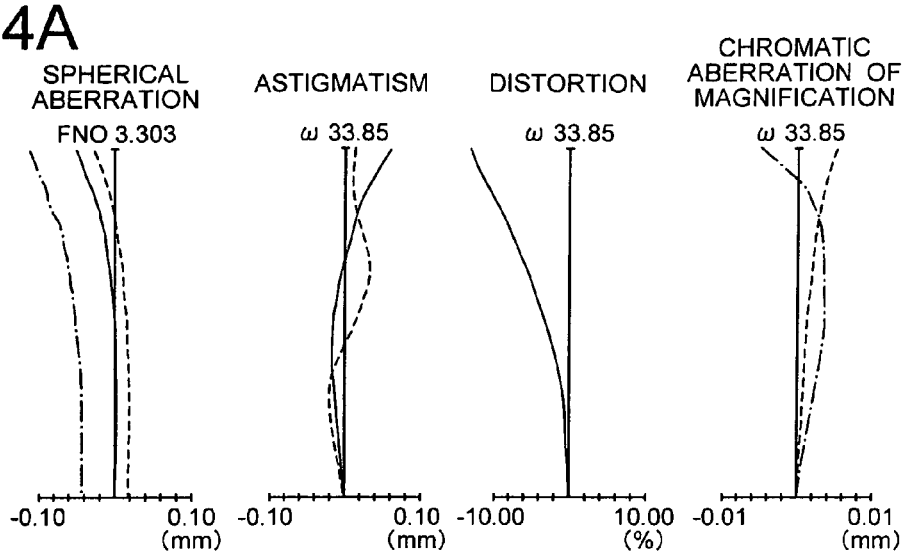
FIG. 14A, FIG. 14B, and FIG. 14C are diagrams similar to FIG. 9A, FIG. 9B, and FIG. 9C respectively, at the time of the infinite object point focusing, according to the sixth embodiment.
Figure 14B:
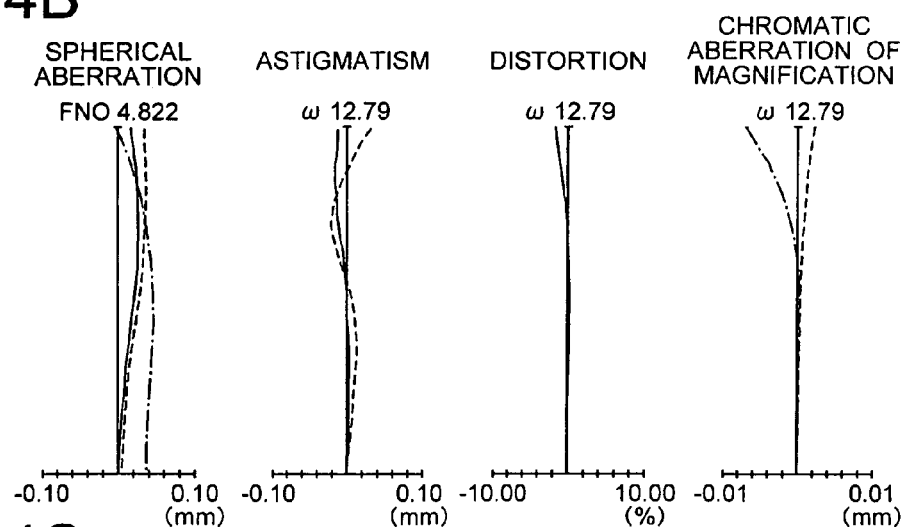
Figure 14C:
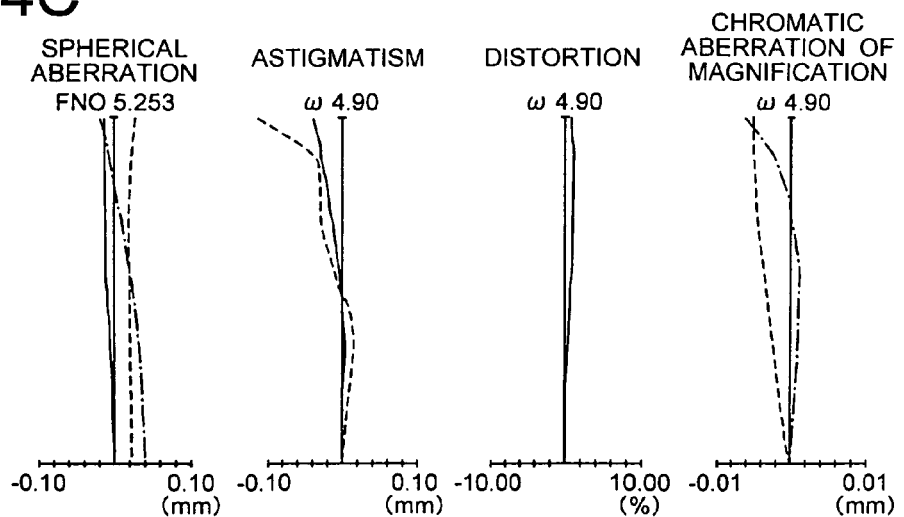
Figure 15A:
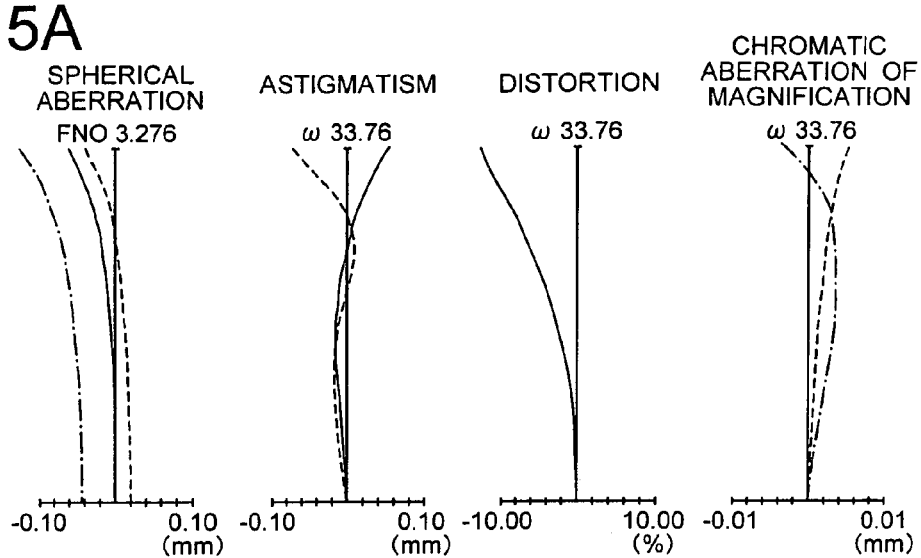
FIG. 15A, FIG. 15B, and FIG. 15C are diagrams similar to FIG. 9A, FIG. 9B, and FIG. 9C respectively, at the time of the infinite object point focusing, according to the seventh embodiment.
Figure 15B:
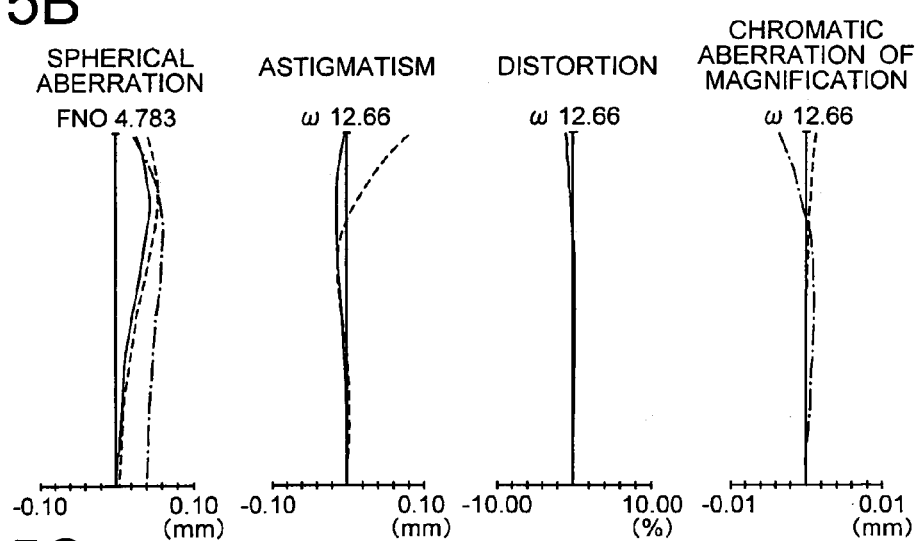
Figure 15C:
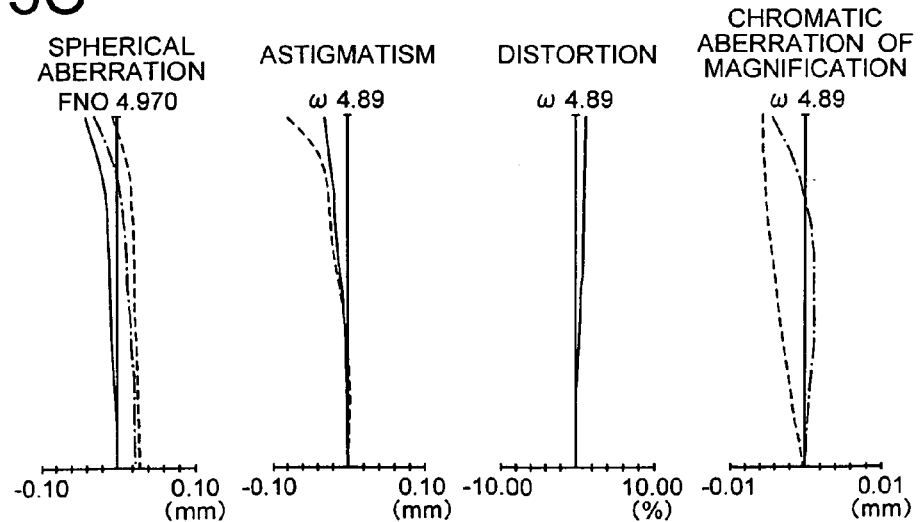
Figure 16A:
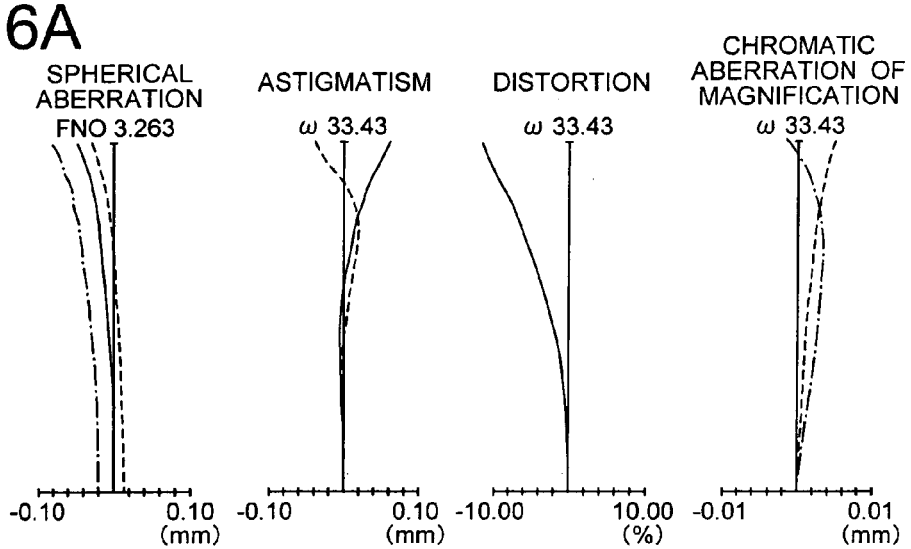
FIG. 16A, FIG. 16B, and FIG. 16C are diagrams similar to FIG. 9A, FIG. 9B, and FIG. 9C respectively, at the time of the infinite object point focusing, according to the eighth embodiment.
Figure 16B:
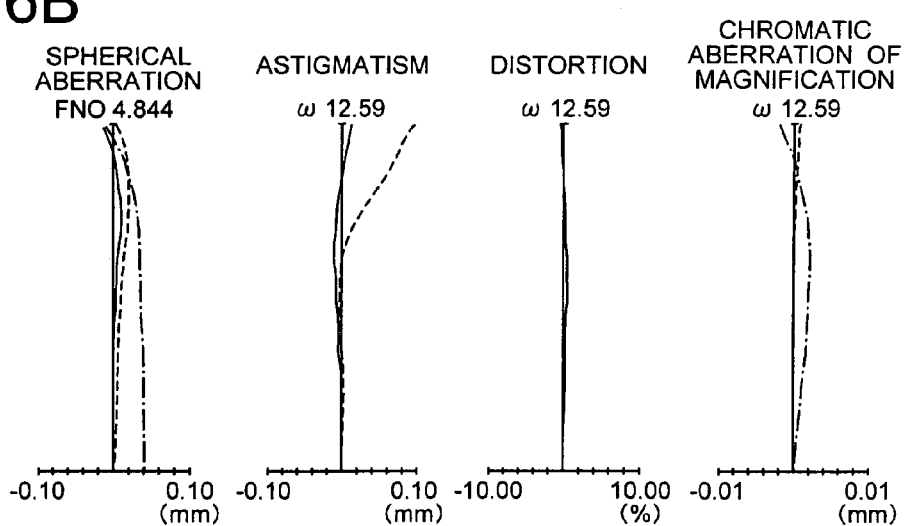
Figure 16C:
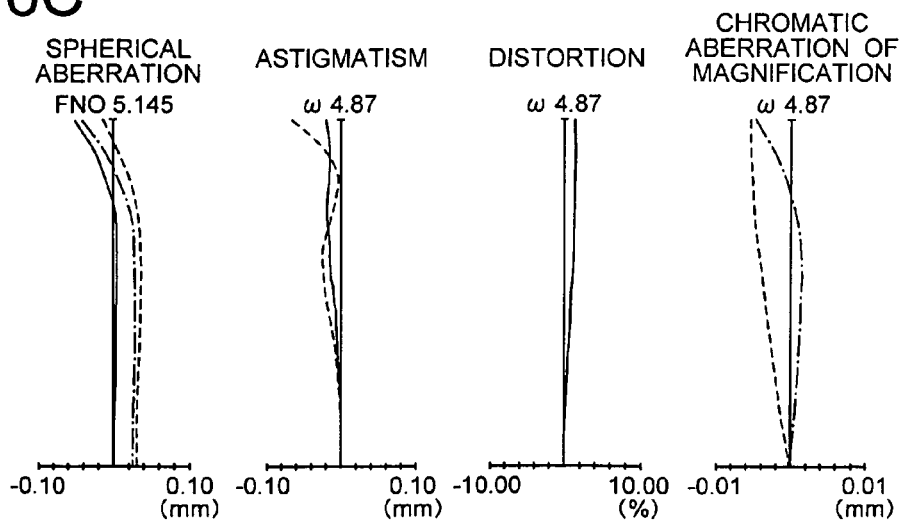

A zoom lens system in the eighth embodiment, as shown in FIG. 8A to FIG. 8C, includes in order from the object side thereof, a first lens unit G1 having a positive refracting power, a second lens unit G2 having a negative refracting power, an aperture stop S, a third lens unit G3 having a positive refracting power, a fourth lens unit G4 having a negative refracting power, and a fifth lens unit G5 having a positive refracting power.

At the time of zooming from the wide angle end to the telephoto end, the first lens unit G1 moves toward the object side, the second lens unit G2, after moving once toward the object side, is turned over, and moves toward the image side, the third lens unit G3 moves integrally with the aperture stop S toward the object side, the fourth lens unit G4 moves toward the object side, and the fifth lens unit G5 moves toward the image side.

In order from the object side, the first lens unit G1 includes a first negative meniscus lens having a convex surface directed toward the object side, and a second biconvex positive lens. The first negative meniscus lens and the second biconvex positive lens are cemented. The second lens unit G2 includes a third biconcave negative lens, a fourth biconvex positive lens, and a fifth biconcave negative lens. The third lens unit G3 includes a sixth biconvex positive lens. The fourth lens unit G4 includes a seventh positive meniscus lens having a convex surface directed toward the object side, and an eighth negative meniscus lens having a convex surface directed toward the object side. The seventh positive meniscus lens and the eighth negative meniscus lens are cemented. The fifth lens unit G5 includes a ninth biconvex positive lens.

An aspheric surface is used for seven surfaces namely, a surface on the image side of the second biconvex positive lens, both surfaces of the third biconcave negative lens, both surfaces of the sixth biconvex positive lens, and both surface of the ninth biconvex positive lens.

Numerical data of each embodiment described above is shown below. Apart from symbols described above, f denotes a focal length of the entire zoom lens system, BF denotes a back focus, each of $f_1, f_2, \ldots$ denotes a focal length of each lens unit, Im denotes an image height, $F_{NO}$ denotes an F number, $\omega$ denotes a half image angle, WE denotes a wide angle end, ST denotes an intermediate state during zooming, TE denotes a telephoto end, each of $r_1, r_2, \ldots$ denotes a radius of curvature of each lens surface, each of $d_1, d_2, \ldots$ denotes a distance between two lenses, each of $n_{d1}, n_{d2}, \ldots$ denotes a refractive index of each lens for a d-line, and each of $\nu_{d1}, \nu_{d2}, \ldots$ denotes an Abbe's number for each lens. The overall length of the lens system which will be described later is a length which is obtained by adding the back focus to a distance from the first lens surface up to the last lens surface. BF (back focus) is a unit which is expressed upon air conversion of a distance from the last lens surface up to a paraxial image plane.

When x is let to be an optical axis with a direction of traveling of light as a positive direction, and y is let to be in a direction orthogonal to the optical axis, a shape of the aspheric surface is described by the following expression.

$$x=(y^2/r)/[1+\{1-(K+1)(y/r)^2\}^{1/2}]+A_4 y^4+A_6 y^6+A_8 y^8+A_{10} y^{10}+A_{12} y^{12}$$

where, r denotes a paraxial radius of curvature, K denotes a conical coefficient, $A_4, A_6, A_8, A_{10},$ and $A_{12}$ denote aspherical-surface coefficients of a fourth order, a sixth order, an eight order, a tenth order, and a twelfth order respectively.

Moreover, in the aspherical surface coefficients, 'e–n' ('e$^{-n}$') (where, n is an integral number) indicates '$10^{-n}$'.

EXAMPLE 1

| | | | |
|---|---|---|---|
| $r_1 = 500.207$ | $d_1 = 0.80$ | $n_{d1} = 2.00170$ | $\nu_{d1} = 20.64$ |
| $r_2 = 45.739$ | $d_2 = 0.10$ | | |
| $r_3 = 19.596$ | $d_3 = 3.46$ | $n_{d2} = 1.69350$ | $\nu_{d2} = 53.21$ |
| $r_4 = -34.537$ (A) | $d_4 =$ (Variable) | | |
| $r_5 = -17.590$ (A) | $d_5 = 0.80$ | $n_{d3} = 1.83481$ | $\nu_{d3} = 42.71$ |
| $r_6 = 10.463$ (A) | $d_6 = 0.88$ | | |
| $r_7 = 14.610$ | $d_7 = 1.95$ | $n_{d4} = 1.94595$ | $\nu_{d4} = 17.98$ |
| $r_8 = -82.373$ | $d_8 = 0.40$ | | |
| $r_9 = -21.383$ | $d_9 = 0.79$ | $n_{d5} = 1.88300$ | $\nu_{d5} = 40.76$ |
| $r_{10} = 28.821$ | $d_{10} =$ (Variable) | | |
| $r_{11} = \infty$ (S) | $d_{11} = 0.10$ | | |
| $r_{12} = 5.254$ (A) | $d_{12} = 2.45$ | $n_{d6} = 1.59201$ | $\nu_{d6} = 67.02$ |
| $r_{13} = -29.571$ (A) | $d_{13} = 0.10$ | | |
| $r_{14} = \infty$ | $d_{14} = 0.00$ | | |
| $r_{15} = 4.791$ | $d_{15} = 1.28$ | $n_{d7} = 1.48749$ | $\nu_{d7} = 70.23$ |
| $r_{16} = 6.925$ | $d_{16} = 0.80$ | $n_{d8} = 2.00069$ | $\nu_{d8} = 25.46$ |
| $r_{17} = 3.210$ | $d_{17} =$ (Variable) | | |
| $r_{18} = 37.416$ (A) | $d_{18} = 1.90$ | $n_{d9} = 1.74330$ | $\nu_{d9} = 49.33$ |
| $r_{19} = -22.377$ | $d_{19} =$ (Variable) | | |
| $r_{20} = \infty$ | $d_{20} = 0.40$ | $n_{d10} = 1.54771$ | $\nu_{d10} = 62.84$ |
| $r_{21} = \infty$ | $d_{21} = 0.50$ | | |
| $r_{22} = \infty$ | $d_{22} = 0.50$ | $n_{d11} = 1.51633$ | $\nu_{d11} = 64.14$ |
| $r_{23} = \infty$ | $d_{23} = 0.37$ | | |
| $r_{24} = \infty$ (Light receiving surface of electronic image pickup apparatus, image plane) | | | |

| Aspherical coefficients |
|---|
| 4th surface |
| K = 0.000
$A_4 = 3.91766e-05$
$A_6 = -1.77968e-08$
$A_8 = -6.65444e-10$
$A_{10} = 4.31894e-12$ |
| 5th surface |
| K = 0.000
$A_4 = 8.38673e-05$
$A_6 = 5.42081e-06$
$A_8 = -7.08744e-08$
$A_{10} = 1.98215e-10$ |
| 6th surface |
| K = 0.000
$A_4 = -2.01234e-04$
$A_6 = 7.58799e-06$
$A_8 = -1.78418e-08$
$A_{10} = 1.68048e-09$ |
| 12th surface |
| K = 0.000
$A_4 = -3.98391e-04$
$A_6 = 6.47480e-07$
$A_8 = -1.71049e-06$
$A_{10} = 2.44901e-07$ |
| 13th surface |
| K = 0.000
$A_4 = 7.22162e-04$
$A_6 = 1.82097e-05$
$A_8 = -3.19628e-06$
$A_{10} = 4.88986e-07$ |
| 18th surface |
| K = 0.000
$A_4 = 1.56725e-04$
$A_6 = 9.81895e-06$ |

-continued $A_8 = -3.64558e-07$
$A_{10} = 5.59353e-09$

Zoom data (∞)

| | | |
|---|---|---|
| Zoom ratio | 6.59579 | |
| $f_1$ | 28.5573 | |
| $f_2$ | -7.70601 | |
| $f_3$ | 10.6269 | |
| $f_4$ | 19.0979 | |

| | WE | ST | TE |
|---|---|---|---|
| f (mm) | 6.60 | 17.00 | 44.28 |
| $F_{NO}$ | 3.30 | 4.56 | 5.23 |
| 2ω (°) | 67.97 | 26.05 | 10.08 |
| Im | 3.84 | 3.84 | 3.84 |
| Lens total length | 40.695 | 47.153 | 49.279 |
| BF | 6.459 | 5.866 | 4.594 |
| $d_4$ | 0.60 | 7.21 | 13.71 |
| $d_{10}$ | 14.58 | 8.31 | 1.68 |
| $d_{17}$ | 3.24 | 9.96 | 13.47 |
| $d_{19}$ | 5.06 | 4.45 | 3.13 |

EXAMPLE 2

| | | | |
|---|---|---|---|
| $r_1 = 221.686$ | $d_1 = 0.80$ | $n_{d1} = 1.92286$ | $v_{d1} = 18.90$ |
| $r_2 = 45.779$ | $d_2 = 0.10$ | | |
| $r_3 = 20.719$ | $d_3 = 3.15$ | $n_{d2} = 1.69350$ | $v_{d2} = 53.21$ |
| $r_4 = -37.693$ (A) | $d_4 =$ (Variable) | | |
| $r_5 = -16.878$ (A) | $d_5 = 0.80$ | $n_{d3} = 1.83481$ | $v_{d3} = 42.71$ |
| $r_6 = 11.006$ (A) | $d_6 = 0.87$ | | |
| $r_7 = 16.621$ | $d_7 = 2.01$ | $n_{d4} = 1.92286$ | $v_{d4} = 18.90$ |
| $r_8 = -38.980$ | $d_8 = 0.42$ | | |
| $r_9 = -18.455$ | $d_9 = 0.79$ | $n_{d5} = 1.88300$ | $v_{d5} = 40.76$ |
| $r_{10} = 30.191$ | $d_{10} =$ (Variable) | | |
| $r_{11} = \infty$ (S) | $d_{11} = 0.14$ | | |
| $r_{12} = 4.989$ (A) | $d_{12} = 2.20$ | $n_{d6} = 1.49700$ | $v_{d6} = 81.54$ |
| $r_{13} = -14.752$ (A) | $d_{13} = 0.10$ | | |
| $r_{14} = \infty$ | $d_{14} = 0.00$ | | |
| $r_{15} = 6.955$ | $d_{15} = 1.95$ | $n_{d7} = 1.51633$ | $v_{d7} = 64.14$ |
| $r_{16} = 28.287$ | $d_{16} = 0.69$ | $n_{d8} = 1.66680$ | $v_{d8} = 33.05$ |
| $r_{17} = 3.379$ | $d_{17} =$ (Variable) | | |
| $r_{18} = 36.911$ (A) | $d_{18} = 1.96$ | $n_{d9} = 1.69350$ | $v_{d9} = 53.21$ |
| $r_{19} = -20.395$ | $d_{19} =$ (Variable) | | |
| $r_{20} = \infty$ | $d_{20} = 0.40$ | $n_{d10} = 1.54771$ | $v_{d10} = 62.84$ |
| $r_{21} = \infty$ | $d_{21} = 0.50$ | | |
| $r_{22} = \infty$ | $d_{22} = 0.50$ | $n_{d11} = 1.51633$ | $v_{d11} = 64.14$ |
| $r_{23} = \infty$ | $d_{23} = 0.37$ | | |
| $r_{24} = \infty$ (Light receiving surface of electronic image pickup apparatus, image plane) | | | |

Aspherical coefficients

4th surface $K = 0.000$
$A_4 = 3.30421e-05$
$A_6 = -3.16331e-08$
$A_8 = -3.25000e-10$
$A_{10} = 2.39929e-12$ 5th surface $K = 0.000$
$A_4 = 5.35538e-05$
$A_6 = 4.60091e-06$
$A_8 = -1.48875e-08$
$A_{10} = -4.13261e-10$ 6th surface $K = 0.000$
$A_4 = -2.58349e-04$
$A_6 = 6.96644e-06$
$A_8 = -4.05237e-08$
$A_{10} = 3.32090e-09$ 12th surface $K = 0.000$
$A_4 = -7.90545e-04$
$A_6 = -1.03563e-05$
$A_8 = -1.56201e-06$
$A_{10} = 1.92987e-07$ 13th surface $K = 0.000$
$A_4 = 5.96245e-04$
$A_6 = 3.72740e-06$
$A_8 = -1.23081e-06$
$A_{10} = 2.60366e-07$ 18th surface $K = 0.000$
$A_4 = 1.26076e-04$
$A_6 = 1.48024e-05$
$A_8 = -6.90546e-07$
$A_{10} = 1.20624e-08$ Zoom data (∞)

| | | |
|---|---|---|
| Zoom ratio | 6.71032 | |
| $f_1$ | 28.3248 | |
| $f_2$ | -7.66459 | |
| $f_3$ | 10.8338 | |
| $f_4$ | 19.2118 | |

| | WE | ST | TE |
|---|---|---|---|
| f (mm) | 6.62 | 16.93 | 44.43 |
| $F_{NO}$ | 3.30 | 4.42 | 5.20 |
| 2ω (°) | 67.99 | 25.84 | 9.99 |
| Im | 3.84 | 3.84 | 3.84 |
| Lens total length | 40.817 | 46.705 | 49.342 |
| BF | 6.716 | 6.843 | 4.614 |
| $d_4$ | 0.65 | 7.25 | 13.64 |
| $d_{10}$ | 14.54 | 7.88 | 1.67 |
| $d_{17}$ | 2.92 | 8.74 | 13.42 |
| $d_{19}$ | 5.30 | 5.33 | 3.14 |

EXAMPLE 3

| | | | |
|---|---|---|---|
| $r_1 = 163.955$ | $d_1 = 0.80$ | $n_{d1} = 1.92286$ | $v_{d1} = 18.90$ |
| $r_2 = 42.291$ | $d_2 = 0.10$ | | |
| $r_3 = 20.541$ | $d_3 = 3.17$ | $n_{d2} = 1.69350$ | $v_{d2} = 53.21$ |
| $r_4 = -37.061$(A) | $d_4 =$ (Variable) | | |
| $r_5 = -17.129$(A) | $d_5 = 0.80$ | $n_{d3} = 1.83481$ | $v_{d3} = 42.71$ |
| $r_6 = 10.282$(A) | $d_6 = 0.86$ | | |
| $r_7 = 15.198$ | $d_7 = 1.95$ | $n_{d4} = 1.92286$ | $v_{d4} = 18.90$ |
| $r_8 = -50.025$ | $d_8 = 0.44$ | | |
| $r_9 = -18.626$ | $d_9 = 0.79$ | $n_{d5} = 1.88300$ | $v_{d5} = 40.76$ |
| $r_{10} = 32.908$ | $d_{10} =$ (Variable) | | |
| $r_{11} = \infty$(S) | $d_{11} = 0.14$ | | |
| $r_{12} = 4.978$(A) | $d_{12} = 2.20$ | $n_{d6} = 1.49700$ | $v_{d6} = 81.54$ |
| $r_{13} = -15.799$(A) | $d_{13} = 0.10$ | | |
| $r_{14} = \infty$ | $d_{14} = 0.00$ | | |
| $r_{15} = 6.943$ | $d_{15} = 1.95$ | $n_{d7} = 1.51633$ | $v_{d7} = 64.14$ |
| $r_{16} = 27.806$ | $d_{16} = 0.69$ | $n_{d8} = 1.66680$ | $v_{d8} = 33.05$ |
| $r_{17} = 3.432$ | $d_{17} =$ (Variable) | | |
| $r_{18} = 28.200$(A) | $d_{18} = 1.94$ | $n_{d9} = 1.69350$ | $v_{d9} = 53.21$ |
| $r_{19} = -23.845$(A) | $d_{19} =$ (Variable) | | |
| $r_{20} = \infty$ | $d_{20} = 0.40$ | $n_{d10} = 1.54771$ | $v_{d10} = 62.84$ |
| $r_{21} = \infty$ | $d_{21} = 0.50$ | | |

-continued

| | | | |
|---|---|---|---|
| $r_{22} = \infty$ | $d_{22} = 0.50$ | $n_{d11} = 1.51633$ | $\nu_{d11} = 64.14$ |
| $r_{23} = \infty$ | $d_{23} = 0.37$ | | |
| $r_{24} = \infty$(Light receiving surface of electronic image pickup apparatus, image plane) | | | |

Aspherical coefficients

4th surface $K = 0.000$
$A_4 = 3.47248e-05$
$A_6 = -8.49942e-08$
$A_8 = 5.39289e-10$
$A_{10} = -2.35182e-12$ 5th surface $K = 0.000$
$A_4 = 5.88480e-05$
$A_6 = 3.45472e-06$
$A_8 = -1.95572e-09$
$A_{10} = -3.95730e-10$ 6th surface $K = 0.000$
$A_4 = -2.86698e-04$
$A_6 = 7.94087e-06$
$A_8 = -2.00213e-07$
$A_{10} = 6.56702e-09$ 12th surface $K = 0.000$
$A_4 = -7.66206e-04$
$A_6 = -1.48671e-05$
$A_8 = -4.84806e-07$
$A_{10} = 1.79360e-07$ 13th surface $K = 0.000$
$A_4 = 6.37118e-04$
$A_6 = -6.59683e-06$
$A_8 = 5.90329e-07$
$A_{10} = 2.31825e-07$ 18th surface $K = 0.000$
$A_4 = 4.53741e-04$
$A_6 = -7.19572e-06$
$A_8 = -1.33142e-06$
$A_{10} = 4.18129e-08$ 19th surface $K = 0.000$
$A_4 = 3.81656e-04$
$A_6 = -1.41858e-05$
$A_8 = -1.32917e-06$
$A_{10} = 4.38528e-08$ Zoom data($\infty$)

| | | | |
|---|---|---|---|
| Zoom ratio | | 6.71839 | |
| $f_1$ | | 28.0288 | |
| $f_2$ | | −7.57324 | |
| $f_3$ | | 10.889 | |
| $f_4$ | | 18.9193 | |

| | WE | ST | TE |
|---|---|---|---|
| f(mm) | 6.62 | 16.93 | 44.49 |
| $F_{NO}$ | 3.30 | 4.42 | 5.20 |
| 2ω(°) | 68.02 | 25.70 | 9.87 |
| Im | 3.84 | 3.84 | 3.84 |
| Lens total length | 40.472 | 46.861 | 49.328 |
| BF | 6.736 | 6.920 | 4.621 |
| $d_4$ | 0.65 | 7.22 | 13.60 |
| $d_{10}$ | 14.28 | 7.84 | 1.67 |

-continued

| | | | |
|---|---|---|---|
| $d_{17}$ | 2.87 | 8.94 | 13.50 |
| $d_{19}$ | 5.40 | 5.48 | 3.17 |

EXAMPLE 4

| | | | |
|---|---|---|---|
| $r_1 = 164.066$ | $d_1 = 0.80$ | $n_{d1} = 1.92286$ | $\nu_{d1} = 18.90$ |
| $r_2 = 42.177$ | $d_3 = 3.19$ | $n_{d2} = 1.69350$ | $\nu_{d2} = 53.21$ |
| $r_4 = -37.917$(A) | $d_4 =$ (Variable) | | |
| $r_5 = -17.436$(A) | $d_5 = 0.80$ | $n_{d3} = 1.83481$ | $\nu_{d3} = 42.71$ |
| $r_6 = 9.974$(A) | $d_6 = 0.87$ | | |
| $r_7 = 14.790$ | $d_7 = 1.96$ | $n_{d4} = 1.92286$ | $\nu_{d4} = 18.90$ |
| $r_8 = -53.264$ | $d_8 = 0.45$ | | |
| $r_9 = -18.747$ | $d_9 = 0.79$ | $n_{d5} = 1.88300$ | $\nu_{d5} = 40.76$ |
| $r_{10} = 33.465$ | $d_{10} =$ (Variable) | | |
| $r_{11} = \infty$(S) | $d_{11} = 0.14$ | | |
| $r_{12} = 4.965$(A) | $d_{12} = 2.20$ | $n_{d6} = 1.49700$ | $\nu_{d6} = 81.54$ |
| $r_{13} = -15.254$(A) | $d_{13} = 0.10$ | | |
| $r_{14} = \infty$ | $d_{14} = 0.00$ | | |
| $r_{15} = 7.071$ | $d_{15} = 1.95$ | $n_{d7} = 1.51633$ | $\nu_{d7} = 64.14$ |
| $r_{16} = 30.040$ | $d_{16} = 0.69$ | $n_{d8} = 1.66680$ | $\nu_{d8} = 33.05$ |
| $r_{17} = 3.432$ | $d_{17} =$ (Variable) | | |
| $r_{18} = 26.757$(A) | $d_{18} = 1.95$ | $n_{d9} = 1.69350$ | $\nu_{d9} = 53.21$ |
| $r_{19} = -24.900$(A) | $d_{19} =$ (Variable) | | |
| $r_{20} = \infty$ | $d_{20} = 0.40$ | $n_{d10} = 1.54771$ | $\nu_{d10} = 62.84$ |
| $r_{21} = \infty$ | $d_{21} = 0.50$ | | |
| $r_{22} = \infty$ | $d_{22} = 0.50$ | $n_{d11} = 1.51633$ | $\nu_{d11} = 64.14$ |
| $r_{23} = \infty$ | $d_{23} = 0.37$ | | |
| $r_{24} = \infty$(Light receiving surface of electronic image pickup apparatus, image plane) | | | |

Aspherical coefficients

4th surface $K = 0.000$
$A_4 = 3.48139e-05$
$A_6 = -9.00157e-08$
$A_8 = 6.34704e-10$
$A_{10} = -2.78708e-12$ 5th surface $K = 0.000$
$A_4 = 3.78198e-05$
$A_6 = 3.71533e-06$
$A_8 = 4.69201e-09$
$A_{10} = -5.20656e-10$ 6th surface $K = 0.000$
$A_4 = -3.12338e-04$
$A_6 = 7.41158e-06$
$A_8 = -1.68675e-07$
$A_{10} = 6.52689e-09$ 12th surface $K = 0.000$
$A_4 = -8.20320e-04$
$A_6 = -1.82385e-05$
$A_8 = 1.28817e-07$
$A_{10} = 9.22421e-08$ 13th surface $K = 0.000$
$A_4 = 6.13505e-04$
$A_6 = -1.48205e-05$
$A_8 = 1.84127e-06$
$A_{10} = 1.00722e-07$ -continued 18th surface K = 0.000
$A_4$ = 4.69138e−04
$A_6$ = −7.29321e−06
$A_8$ = −9.71972e−07
$A_{10}$ = 3.07577e−08

19th surface

K = 0.000
$A_4$ = 3.89373e−04
$A_6$ = −1.42707e−05
$A_8$ = −9.83228e−07
$A_{10}$ = 3.34093e−08

Zoom data (∞)

| | | | |
|---|---|---|---|
| Zoom ratio | | 6.7179 | |
| $f_1$ | | 28.0095 | |
| $f_2$ | | −7.56116 | |
| $f_3$ | | 10.9003 | |
| $f_4$ | | 18.8893 | |
| | WE | ST | TE |
| f(mm) | 6.62 | 17.01 | 44.49 |
| $F_{NO}$ | 3.29 | 4.44 | 5.15 |
| 2ω(°) | 68.04 | 25.68 | 9.90 |
| Im | 3.84 | 3.84 | 3.84 |
| Lens total length | 40.529 | 46.960 | 49.337 |
| BF | 6.751 | 6.932 | 4.623 |
| $d_4$ | 0.64 | 7.20 | 13.61 |
| $d_{10}$ | 14.27 | 7.79 | 1.67 |
| $d_{17}$ | 2.87 | 9.04 | 13.45 |
| $d_{19}$ | 5.39 | 5.49 | 3.16 |

EXAMPLE 5

| | | | |
|---|---|---|---|
| $r_1$ = 164.290 | $d_1$ = 0.80 | $n_{d1}$ = 1.92286 | $v_{d1}$ = 18.90 |
| $r_2$ = 42.006 | $d_2$ = 0.10 | | |
| $r_3$ = 20.528 | $d_3$ = 3.23 | $n_{d2}$ = 1.69350 | $v_{d2}$ = 53.21 |
| $r_4$ = −36.130(A) | $d_4$ = (Variable) | | |
| $r_5$ = −17.430(A) | $d_5$ = 0.80 | $n_{d3}$ = 1.83481 | $v_{d3}$ = 42.71 |
| $r_6$ = 9.847(A) | $d_6$ = 0.89 | | |
| $r_7$ = 14.810 | $d_7$ = 1.96 | $n_{d4}$ = 1.92286 | $v_{d4}$ = 18.90 |
| $r_8$ = −53.551 | $d_8$ = 0.45 | | |
| $r_9$ = −19.236 | $d_9$ = 0.79 | $n_{d5}$ = 1.88300 | $v_{d5}$ = 40.76 |
| $r_{10}$ = 33.352 | $d_{10}$ = (Variable) | | |
| $r_{11}$ = ∞(S) | $d_{11}$ = 0.14 | | |
| $r_{12}$ = 4.993(A) | $d_{12}$ = 2.20 | $n_{d6}$ = 1.49700 | $v_{d6}$ = 81.54 |
| $r_{13}$ = −16.289(A) | $d_{13}$ = 0.10 | | |
| $r_{14}$ = ∞ | $d_{14}$ = 0.00 | | |
| $r_{15}$ = 6.943 | $d_{15}$ = 1.95 | $n_{d7}$ = 1.51633 | $v_{d7}$ = 64.14 |
| $r_{16}$ = 32.067 | $d_{16}$ = 0.69 | $n_{d8}$ = 1.66680 | $v_{d8}$ = 33.05 |
| $r_{17}$ = 3.446 | $d_{17}$ = (Variable) | | |
| $r_{18}$ = 21.059(A) | $d_{18}$ = 1.95 | $n_{d9}$ = 1.69350 | $v_{d9}$ = 53.21 |
| $r_{19}$ = −32.749(A) | $d_{19}$ = (Variable) | | |
| $r_{20}$ = ∞ | $d_{20}$ = 0.40 | $n_{d10}$ = 1.54771 | $v_{d10}$ = 62.84 |
| $r_{21}$ = ∞ | $d_{21}$ = 0.50 | | |
| $r_{22}$ = ∞ | $d_{22}$ = 0.50 | $n_{d11}$ = 1.51633 | $v_{d11}$ = 64.14 |
| $r_{23}$ = ∞ | $d_{23}$ = 0.37 | | |
| $r_{24}$ = ∞(Light receiving surface of electronic image pickup apparatus, image plane) | | | |

Aspherical coefficients

4th surface

K = 0.000
$A_4$ = 3.55846e−05

-continued $A_6$ = −7.84781e−08
$A_8$ = 3.91858e−10
$A_{10}$ = −1.35153e−12

5th surface

K = 0.000
$A_4$ = 5.30520e−05
$A_6$ = 3.44321e−06
$A_8$ = −2.64614e−09
$A_{10}$ = −4.17059e−10

6th surface

K = 0.000
$A_4$ = −2.90084e−04
$A_6$ = 6.88077e−06
$A_8$ = −1.25164e−07
$A_{10}$ = 4.82695e−09

12th surface

K = 0.000
$A_4$ = −7.66431e−04
$A_6$ = −1.26220e−05
$A_8$ = −2.78834e−07
$A_{10}$ = 1.49151e−07

13th surface

K = 0.000
$A_4$ = 5.71686e−04
$A_6$ = −3.43827e−06
$A_8$ = 8.72738e−07
$A_{10}$ = 1.92117e−07

18th surface

K = 0.000
$A_4$ = 3.70848e−04
$A_6$ = −6.68050e−06
$A_8$ = −1.18010e−06
$A_{10}$ = 3.67358e−08

19th surface

K = 0.000
$A_4$ = 3.46958e−04
$A_6$ = −1.92683e−05
$A_8$ = −9.42946e−07
$A_{10}$ = 3.50981e−08

Zoom data(∞)

| | | | |
|---|---|---|---|
| Zoom ratio | | 6.71196 | |
| $f_1$ | | 27.7776 | |
| $f_2$ | | −7.55699 | |
| $f_3$ | | 11.0757 | |
| $f_4$ | | 18.7603 | |
| | WE | ST | TE |
| f(mm) | 6.62 | 17.34 | 44.45 |
| $F_{NO}$ | 3.31 | 4.71 | 5.12 |
| 2ω(°) | 67.99 | 25.35 | 9.83 |
| Im | 3.84 | 3.84 | 3.84 |
| Lens total length | 40.782 | 48.828 | 49.322 |
| BF | 6.861 | 5.547 | 4.623 |
| $d_4$ | 0.63 | 6.95 | 13.62 |
| $d_{10}$ | 14.36 | 8.68 | 1.67 |
| $d_{17}$ | 2.87 | 11.59 | 13.34 |
| $d_{19}$ | 5.46 | 4.07 | 3.17 |

EXAMPLE 6

| | | | |
|---|---|---|---|
| $r_1$ = 23.006 | $d_1$ = 0.80 | $n_{d1}$ = 1.92286 | $v_{d1}$ = 18.90 |
| $r_2$ = 15.977 | $d_2$ = 3.00 | $n_{d2}$ = 1.69350 | $v_{d2}$ = 53.21 |
| $r_3$ = −62.704(A) | $d_3$ = (Variable) | | |
| $r_4$ = −22.989(A) | $d_4$ = 0.90 | $n_{d3}$ = 1.83481 | $v_{d3}$ = 42.71 |

-continued

| | | | |
|---|---|---|---|
| $r_5 = 8.008(A)$ | $d_5 = 1.39$ | | |
| $r_6 = 10.182$ | $d_6 = 1.98$ | $n_{d4} = 1.92286$ | $\nu_{d4} = 18.90$ |
| $r_7 = 62.378$ | $d_7 = 0.73$ | | |
| $r_8 = -23.718$ | $d_8 = 0.60$ | $n_{d5} = 1.88300$ | $\nu_{d5} = 40.76$ |
| $r_9 = 25.162$ | $d_9 = $ (Variable) | | |
| $r_{10} = \infty$ (S) | $d_{10} = 0.14$ | | |
| $r_{11} = 5.027(A)$ | $d_{11} = 2.20$ | $n_{d6} = 1.49700$ | $\nu_{d6} = 81.54$ |
| $r_{12} = -12.074(A)$ | $d_{12} = 0.10$ | | |
| $r_{13} = 7.900$ | $d_{13} = 1.95$ | $n_{d7} = 1.51633$ | $\nu_{d7} = 64.14$ |
| $r_{14} = 33.216$ | $d_{14} = 0.69$ | $n_{d8} = 1.66680$ | $\nu_{d8} = 33.05$ |
| $r_{15} = 3.627$ | $d_{15} = $ (Variable) | | |
| $r_{16} = 24.000(A)$ | $d_{16} = 1.97$ | $n_{d9} = 1.69350$ | $\nu_{d9} = 53.21$ |
| $r_{17} = -26.936(A)$ | $d_{17} = $ (Variable) | | |
| $r_{18} = \infty$ | $d_{18} = 0.40$ | $n_{d10} = 1.54771$ | $\nu_{d10} = 62.84$ |
| $r_{19} = \infty$ | $d_{19} = 0.50$ | | |
| $r_{20} = \infty$ | $d_{20} = 0.50$ | $n_{d11} = 1.51633$ | $\nu_{d11} = 64.14$ |
| $r_{21} = \infty$ | $d_{21} = 0.37$ | | |
| $r_{22} = \infty$ (Light receiving surface of electronic image pickup apparatus, image plane) | | | |

Aspherical coefficients

3rd surface $K = 0.000$
$A_4 = 1.59974e-05$
$A_6 = -4.42324e-08$
$A_8 = 1.84410e-10$
$A_{10} = -3.58654e-13$ 4th surface $K = 0.000$
$A_4 = 5.75994e-05$
$A_6 = -9.85323e-07$
$A_8 = 9.63724e-08$
$A_{10} = -1.08278e-09$ 5th surface $K = 0.000$
$A_4 = -2.49956e-04$
$A_6 = 7.63525e-06$
$A_8 = -6.41552e-07$
$A_{10} = 2.11270e-08$ 11th surface $K = 0.000$
$A_4 = -1.07374e-03$
$A_6 = 5.52660e-06$
$A_8 = -2.37896e-06$
$A_{10} = 1.85262e-07$ 12th surface $K = 0.000$
$A_4 = 4.77468e-04$
$A_6 = 1.87922e-05$
$A_8 = -1.97636e-06$
$A_{10} = 2.42875e-07$ 16th surface $K = 0.000$
$A_4 = 2.46144e-05$
$A_6 = 2.29610e-05$
$A_8 = -3.04556e-06$
$A_{10} = 5.72624e-08$ 17th surface $K = 0.000$
$A_4 = 8.68126e-21$
$A_6 = 7.52396e-06$
$A_8 = -2.43406e-06$
$A_{10} = 4.93919e-08$ -continued Zoom data($\infty$)

| | | | |
|---|---|---|---|
| Zoom ratio | | 6.71772 | |
| $f_1$ | | 27.4998 | |
| $f_2$ | | -6.90604 | |
| $f_3$ | | 10.3789 | |
| $f_4$ | | 18.596 | |

| | WE | ST | TE |
|---|---|---|---|
| f(mm) | 6.63 | 17.25 | 44.55 |
| $F_{NO}$ | 3.30 | 4.82 | 5.25 |
| $2\omega(°)$ | 67.70 | 25.58 | 9.79 |
| Im | 3.84 | 3.84 | 3.84 |
| Lens total length | 39.435 | 47.185 | 49.282 |
| BF | 6.659 | 6.073 | 4.628 |
| $d_3$ | 0.64 | 6.11 | 12.83 |
| $d_9$ | 12.81 | 7.23 | 1.66 |
| $d_{15}$ | 2.87 | 11.31 | 13.70 |
| $d_{17}$ | 5.25 | 4.59 | 3.12 |

EXAMPLE 7

| | | | |
|---|---|---|---|
| $r_1 = 24.009$ | $d_1 = 0.80$ | $n_{d1} = 1.92286$ | $\nu_{d1} = 18.90$ |
| $r_2 = 16.679$ | $d_2 = 3.11$ | $n_{d2} = 1.69350$ | $\nu_{d2} = 53.21$ |
| $r_3 = -61.591(A)$ | $d_3 = $ (Variable) | | |
| $r_4 = -17.849(A)$ | $d_4 = 0.90$ | $n_{d3} = 1.83481$ | $\nu_{d3} = 42.71$ |
| $r_5 = 8.512(A)$ | $d_5 = 0.98$ | | |
| $r_6 = 12.199$ | $d_6 = 1.91$ | $n_{d4} = 1.92286$ | $\nu_{d4} = 18.90$ |
| $r_7 = -629.166$ | $d_7 = 0.42$ | | |
| $r_8 = -24.081$ | $d_8 = 0.65$ | $n_{d5} = 1.88300$ | $\nu_{d5} = 40.76$ |
| $r_9 = 33.852$ | $d_9 = $ (Variable) | | |
| $r_{10} = \infty$ (S) | $d_{10} = 0.14$ | | |
| $r_{11} = 4.966(A)$ | $d_{11} = 2.20$ | $n_{d6} = 1.49700$ | $\nu_{d6} = 81.54$ |
| $r_{12} = -13.809(A)$ | $d_{12} = 0.10$ | | |
| $r_{13} = 7.650$ | $d_{13} = 1.95$ | $n_{d7} = 1.51633$ | $\nu_{d7} = 64.14$ |
| $r_{14} = 25.423$ | $d_{14} = 0.69$ | $n_{d8} = 1.66680$ | $\nu_{d8} = 33.05$ |
| $r_{15} = 3.516$ | $d_{15} = $ (Variable) | | |
| $r_{16} = 22.535(A)$ | $d_{16} = 1.97$ | $n_{d9} = 1.69350$ | $\nu_{d9} = 53.21$ |
| $r_{17} = -28.269(A)$ | $d_{17} = $ (Variable) | | |
| $r_{18} = \infty$ | $d_{18} = 0.40$ | $n_{d10} = 1.54771$ | $\nu_{d10} = 62.84$ |
| $r_{19} = \infty$ | $d_{19} = 0.50$ | | |
| $r_{20} = \infty$ | $d_{20} = 0.50$ | $n_{d11} = 1.51633$ | $\nu_{d11} = 64.14$ |
| $r_{21} = \infty$ | $d_{21} = 0.37$ | | |
| $r_{22} = \infty$ (Light receiving surface of electronic image pickup apparatus, image plane) | | | |

Aspherical coefficients

3rd surface $K = 0.000$
$A_4 = 1.45797e-05$
$A_6 = -2.83973e-08$
$A_8 = 1.43593e-10$
$A_{10} = -7.28441e-13$ 4th surface $K = 0.000$
$A_4 = 7.92371e-05$
$A_6 = 3.01302e-06$
$A_8 = 7.02997e-09$
$A_{10} = -5.47908e-10$ 5th surface $K = 0.000$
$A_4 = -2.80133e-04$
$A_6 = 5.81816e-06$ -continued $A_8 = -7.40250e-08$
$A_{10} = 6.16626e-09$ 11th surface $K = 0.000$
$A_4 = -9.43285e-04$
$A_6 = -1.52224e-05$
$A_8 = -6.21863e-07$
$A_{10} = 1.24039e-07$ 12th surface $K = 0.000$
$A_4 = 5.15161e-04$
$A_6 = -2.94658e-06$
$A_8 = -2.87406e-08$
$A_{10} = 1.82809e-07$ 16th surface $K = 0.000$
$A_4 = 2.83398e-04$
$A_6 = -5.55729e-06$
$A_8 = -1.61308e-06$
$A_{10} = 5.52699e-08$ 17th surface $K = 0.000$
$A_4 = 2.63848e-04$
$A_6 = -2.09586e-05$
$A_8 = -1.07906e-06$
$A_{10} = 4.66921e-08$ Zoom data(∞)

| | | | |
|---|---|---|---|
| Zoom ratio | | 6.71719 | |
| $f_1$ | | 28.192 | |
| $f_2$ | | -7.33373 | |
| $f_3$ | | 10.8192 | |
| $f_4$ | | 18.3721 | |
| | WE | ST | TE |
| f(mm) | 6.62 | 17.25 | 44.45 |
| $F_{NO}$ | 3.28 | 4.78 | 4.97 |
| 2ω(°) | 67.52 | 25.33 | 9.77 |
| Im | 3.84 | 3.84 | 3.84 |
| Lens total length | 39.985 | 48.043 | 48.720 |
| BF | 6.722 | 5.258 | 4.636 |
| $d_3$ | 0.68 | 6.65 | 13.53 |
| $d_9$ | 13.90 | 8.45 | 1.67 |
| $d_{15}$ | 2.86 | 11.85 | 13.06 |
| $d_{17}$ | 5.30 | 3.78 | 3.23 |

EXAMPLE 8

| | | | |
|---|---|---|---|
| $r_1 = 24.020$ | $d_1 = 0.80$ | $n_{d1} = 1.92286$ | $v_{d1} = 18.90$ |
| $r_2 = 16.572$ | $d_2 = 3.08$ | $n_{d2} = 1.69350$ | $v_{d2} = 53.21$ |
| $r_3 = -68.334$ (A) | $d_3 =$ (Variable) | | |
| $r_4 = -21.830$ (A) | $d_4 = 0.90$ | $n_{d3} = 1.83481$ | $v_{d3} = 42.71$ |
| $r_5 = 8.126$ (A) | $d_5 = 1.00$ | | |
| $r_6 = 12.507$ | $d_6 = 2.01$ | $n_{d4} = 1.92286$ | $v_{d4} = 18.90$ |
| $r_7 = -160.265$ | $d_7 = 0.44$ | | |
| $r_8 = -27.890$ | $d_8 = 0.65$ | $n_{d5} = 1.88300$ | $v_{d5} = 40.76$ |
| $r_9 = 21.047$ | $d_9 =$ (Variable) | | |
| $r_{10} = \infty$ (S) | $d_{10} = 0.14$ | | |
| $r_{11} = 5.061$ (A) | $d_{11} = 2.20$ | $n_{d6} = 1.49700$ | $v_{d6} = 81.54$ |
| $r_{12} = -13.544$ (A) | $d_{12} =$ (Variable) | | |
| $r_{13} = 7.030$ | $d_{13} = 1.95$ | $n_{d7} = 1.51633$ | $v_{d7} = 64.14$ |
| $r_{14} = 49.126$ | $d_{14} = 0.69$ | $n_{d8} = 1.66680$ | $v_{d8} = 33.05$ |
| $r_{15} = 3.499$ | $d_{15} =$ (Variable) | | |
| $r_{16} = 23.559$ (A) | $d_{16} = 2.01$ | $n_{d9} = 1.69350$ | $v_{d9} = 53.21$ |
| $r_{17} = -26.698$ (A) | $d_{17} =$ (Variable) | | |
| $r_{18} = \infty$ | $d_{18} = 0.40$ | $n_{d10} = 1.54771$ | $v_{d10} = 62.84$ |
| $r_{19} = \infty$ | $d_{19} = 0.50$ | | |
| $r_{20} = \infty$ | $d_{20} = 0.50$ | $n_{d11} = 1.51633$ | $v_{d11} = 64.14$ |
| $r_{21} = \infty$ | $d_{21} = 0.37$ | | |
| $r_{22} = \infty$ (Light receiving surface of electronic image pickup apparatus, image plane) | | | |

Aspherical coefficients

3rd surface $K = 0.000$
$A_4 = 1.17380e-05$
$A_6 = -2.24608e-08$
$A_8 = 2.75549e-10$
$A_{10} = -2.05321e-12$ 4th surface $K = 0.000$
$A_4 = -9.11156e-05$
$A_6 = 8.78426e-06$
$A_8 = -1.22764e-07$
$A_{10} = 5.28096e-10$ 5th surface $K = 0.000$
$A_4 = -3.85803e-04$
$A_6 = 4.49285e-06$
$A_8 = 2.22686e-07$
$A_{10} = -3.14604e-09$ 11th surface $K = 0.000$
$A_4 = -7.80650e-04$
$A_6 = -1.15675e-05$
$A_8 = -4.74312e-07$
$A_{10} = 2.42119e-07$ 12th surface $K = 0.000$
$A_4 = 6.50113e-04$
$A_6 = 9.15799e-07$
$A_8 = 7.50956e-08$
$A_{10} = 3.30091e-07$ 16th surface $K = 0.000$
$A_4 = 2.91274e-04$
$A_6 = -5.95470e-06$
$A_8 = -2.42391e-06$
$A_{10} = 8.28202e-08$ 17th surface $K = 0.000$
$A_4 = 2.44954e-04$
$A_6 = -2.01991e-05$
$A_8 = -1.81550e-06$
$A_{10} = 6.89403e-08$ Zoom data (∞)

| | | | |
|---|---|---|---|
| Zoom ratio | | 6.73995 | |
| $f_1$ | | 29.1282 | |
| $f_2$ | | -6.99367 | |
| $f_3$ | | 7.71607 | |
| $f_4$ | | -11.0709 | |
| $f_5$ | | 18.3461 | |
| | WE | ST | TE |
| f (mm) | 6.61 | 17.26 | 44.55 |
| $F_{NO}$ | 3.26 | 4.84 | 5.14 |
| 2ω (°) | 66.87 | 25.18 | 9.74 |
| Im | 3.84 | 3.84 | 3.84 |
| Lens total length | 39.613 | 47.505 | 49.236 |
| BF | 6.808 | 4.964 | 4.637 |
| $d_3$ | 0.70 | 6.81 | 13.68 |
| $d_9$ | 13.25 | 7.94 | 1.68 |

-continued

|  |  |  |  |
|---|---|---|---|
| $d_{12}$ | 0.10 | 0.49 | 0.96 |
| $d_{15}$ | 2.89 | 11.43 | 12.41 |
| $d_{17}$ | 5.43 | 3.50 | 3.22 |

A spherical aberration, an astigmatism, a distortion, and a chromatic aberration of magnification at the wide angle end, at the intermediate state during zooming, and at the telephoto end at the time of infinite object point focusing according to the first embodiment to the eighth embodiment described above, are shown in FIG. 9A, FIG. 9B, and FIG. 9C to FIG. 16A, FIG. 16B, and FIG. 16C. In the diagrams, 'FIY' denotes the maximum image height, and 'ω' denotes a half image angle.

Values of conditional expressions (1) to (22) in the embodiments are given below.

|  | Example1 | Example2 | Example3 | Example4 |
|---|---|---|---|---|
| (1) $f_2/f_t$ | −0.174 | −0.173 | −0.170 | −0.170 |
| (2) $f_{2n2}/f_t$ | −0.312 | −0.290 | −0.301 | −0.304 |
| (3) $SF_{2n2}$ | −0.148 | −0.241 | −0.277 | −0.282 |
| (A) $\Sigma d_{2G}/f_t$ | 0.109 | 0.110 | 0.109 | 0.109 |
| (B) $SF_{2n1}$ | 0.254 | 0.211 | 0.250 | 0.272 |
| (C) $SF_{2p}$ | −0.699 | −0.402 | −0.534 | −0.565 |
| (4) $(\beta_{2T} \times \beta_{RW})/(\beta_{2W} \times \beta_{RT})$ | 1.803 | 1.859 | 1.936 | 1.959 |
| (5) $n_{d2n1}$ | 1.83481 | 1.83481 | 1.83481 | 1.83481 |
| (6) $\nu_{d2n1}$ | 42.71 | 42.71 | 42.71 | 42.71 |
| (7) $n_{d2n2}$ | 1.8830 | 1.8830 | 1.8830 | 1.8830 |
| (8) $\nu_{d2n2}$ | 40.76 | 40.76 | 40.76 | 40.76 |
| (9) $n_{d2p}$ | 1.94595 | 1.92286 | 1.92286 | 1.92286 |
| (10) $\nu_{d2p}$ | 17.98 | 18.90 | 18.90 | 18.90 |
| (11) $asp_{2n1f}/f_w$ | 0.03316 | 0.03054 | 0.02513 | 0.02362 |
| (12) $(asp_{2n1f}+ |asp_{2n1r}|)/f_w$ | 0.03405 | 0.03648 | 0.03557 | 0.03578 |
| (13) $d_{1np}/d_1$ | 0.023 | 0.025 | 0.025 | 0.024 |
| (14) $n_{d1p}$ | 1.6935 | 1.6935 | 1.6935 | 1.6935 |
| (15) $\nu_{d1p}$ | 53.21 | 53.21 | 53.21 | 53.21 |
| (16) $n_{d1n}$ | 2.0017 | 1.92286 | 1.92286 | 1.92286 |
| (17) $\nu_{d1n}$ | 20.64 | 18.90 | 18.90 | 18.90 |
| (18) $f_1/f_t$ | 0.645 | 0.638 | 0.630 | 0.630 |
| (19) $f_3/f_t$ | 0.240 | 0.244 | 0.245 | 0.245 |
| (20) $f_4/f_t$ | 0.431 | 0.432 | 0.425 | 0.425 |
| (21) $f_t/f_w$ | 6.713 | 6.710 | 6.718 | 6.718 |
| (22) $L_m/f_w$ | 0.582 | 0.580 | 0.580 | 0.580 |

| (value of conditional expression) | | | | |
|---|---|---|---|---|
|  | Example5 | Example6 | Example7 | Example8 |
| (1) $f_2/f_t$ | −0.170 | −0.155 | −0.165 | −0.157 |
| (2) $f_{2n2}/f_t$ | −0.309 | −0.309 | −0.357 | −0.303 |
| (3) $SF_{2n2}$ | −0.268 | −0.030 | −0.169 | 0.140 |
| (A) $\Sigma d_{2G}/f_t$ | 0.110 | 0.126 | 0.110 | 0.112 |
| (B) $SF_{2n1}$ | 0.278 | 0.483 | 0.354 | 0.457 |
| (C) $SF_{2p}$ | −0.567 | −1.390 | −0.962 | −0.855 |
| (4) $(\beta_{2T} \times \beta_{RW})/(\beta_{2W} \times \beta_{RT})$ | 2.092 | 1.878 | 2.062 | 1.626 |
| (5) $n_{d2n1}$ | 1.83481 | 1.83481 | 1.83481 | 1.83481 |
| (6) $\nu_{d2n1}$ | 42.71 | 42.71 | 42.71 | 42.71 |
| (7) $n_{d2n2}$ | 1.8830 | 1.8830 | 1.8830 | 1.8830 |
| (8) $\nu_{d2n2}$ | 40.76 | 40.76 | 40.76 | 40.76 |
| (9) $n_{d2p}$ | 1.92286 | 1.92286 | 1.92286 | 1.92286 |
| (10) $\nu_{d2p}$ | 18.90 | 18.90 | 18.90 | 18.90 |
| (11) $asp_{2n1f}/f_w$ | 0.02396 | 0.01490 | 0.02439 | 0.01204 |
| (12) $(asp_{2n1f}+ |asp_{2n1r}|)/f_w$ | 0.03513 | 0.02669 | 0.03325 | 0.02699 |
| (13) $d_{1np}/d_1$ | 0.024 | 0.000 | 0.000 | 0.000 |
| (14) $n_{d1p}$ | 1.6935 | 1.6935 | 1.6935 | 1.6935 |
| (15) $\nu_{d1p}$ | 53.21 | 53.21 | 53.21 | 53.21 |
| (16) $n_{d1n}$ | 1.92286 | 1.92286 | 1.92286 | 1.92286 |
| (17) $\nu_{d1n}$ | 18.90 | 18.90 | 18.90 | 18.90 |
| (18) $f_1/f_t$ | 0.625 | 0.617 | 0.634 | 0.654 |
| (19) $f_3/f_t$ | 0.249 | 0.233 | 0.243 | 0.173 |
| (20) $f_4/f_t$ | 0.422 | 0.417 | 0.413 | — |
| (21) $f_t/f_w$ | 6.712 | 6.718 | 6.717 | 6.740 |
| (22) $L_m/f_w$ | 0.580 | 0.579 | 0.580 | 0.581 |

Incidentally, for preventing the occurrence of the ghost and the flare, generally, the antireflection coating is applied to a surface of a lens in contact with air.

On the other hand, at a cemented surface of a cemented lens, a refractive index of an adhesive is sufficiently higher than a refractive index of air. Therefore, in many cases, a reflectance is originally of the level of a single-layer coating, or lower, and the coating is applied in few cases. However, when the antireflection coating is applied positively even to the cemented surface, it is possible to reduce further the ghost and the flare, and to achieve a more favorable image.

Particularly, recently, a glass material having a high refractive index has been widely used in an optical system of cameras, for having a high effect on the aberration correction. However, when the glass material having a high refractive index is used as a cemented lens, a reflection at the cemented surface becomes unignorable. In such a case, applying the antireflection coating on the cemented surface is particularly effective.

An effective usage of the cemented surface coating has been disclosed in Japanese Patent Application Laid-open Publication No. Hei 2-27301, No. 2001-324676, No. 2005-92115, and U.S. Pat. No. 7,116,482. In these patent literatures, a cemented lens surface coating in a first lens unit of a positive preceding zoom lens system has been described, and the same as disclosed in these patent literatures may be implemented for the cemented lens surface in the first lens unit having a positive power, of the present invention.

As a coating material to be used, according to a refractive index of the adhesive material and a refractive index of the lens which is a base, coating materials such as $Ta_2O_5$, $TiO_2$, $Nb_2O_5$, $ZrO_2$, $HfO_2$, $CeO_2$, $SnO_2$, $In_2O_3$, $ZnO$, and $Y_2O_3$ having a comparatively higher refractive index, and coating materials such as $MgF_2$, $SiO_2$, and $Al_2O_3$ having a comparatively lower refractive index may be selected appropriately, and set to a film thickness which satisfies phase conditions.

Naturally, similar to the coating on the surface of the lens in contact with air, the coating on the cemented surface may also be let to be a multi layer coating. By combining appropriately a film thickness and a coating material of number of films not less than in two layers, it is possible to reduce further the reflectance, and to control spectral characteristics and angular characteristics.

Moreover, it is needless to mention that for the cemented surface of lenses other than the lenses in the first lens unit, it is effective to apply the coating on the cemented surface based on a similar idea.

(Correction of Distortion)

Incidentally, when the zoom lens system of the present invention is used, a digital correction of distortion of an image is carried out electrically. A basic concept for the digital correction of the distortion of an image will be described below.

Figure 17:
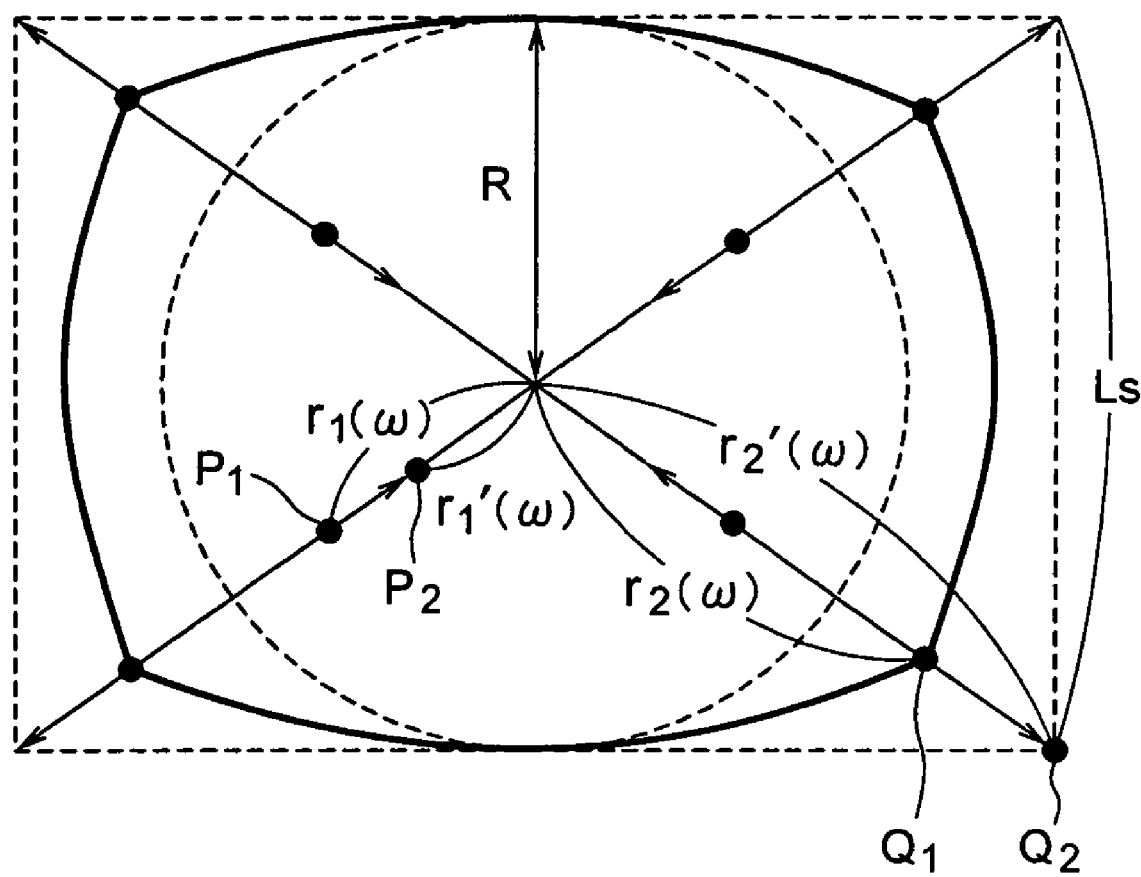
FIG. 17 is a diagram describing a correction of a distortion.

For example, as shown in FIG. 17, with a point of intersection of an optical axis and an image pickup plane to be a center, a magnification on a circumference (image height) of a circle of radius R making a contact internally with a longer side of an effective image pickup plane is fixed, and this circumference is let to be a base reference for the correction. Next, each point on a circumference (image height) of an arbitrary radius $r(\omega)$ other than the radius R is moved in a substantial direction of radiation, and the correction is carried out by moving on a concentric circle such that the radius becomes $r'(\omega)$.

For example, in FIG. 17, a point $P_1$ on a circumference of an arbitrary radius $r_1(\omega)$ positioned at an inner side of a circle of radius R is moved to a point $P_2$ on a circumference of a radius $r_1'(\omega)$ which is to be corrected, directed toward a center of the circle. Moreover, a point $Q_2$ on a circumference of an arbitrary radius $r_2(\omega)$ positioned at an outer side of the circle of radius R is moved to a point $Q_2$ on a circumference of a radius $r_2'(\omega)$ which is to be corrected, directed toward a direction away from the center of the circle.

Here, $r'(\omega)$ can be expressed as follows.

$$r'(\omega) = \alpha \cdot f \tan \omega \quad (0 \leq \alpha \leq 1)$$

where, $\omega$ is a half image angle of an object and f is a focal length of an imaging optical system (the zoom lens system in the present invention).

Here, when an ideal image height corresponding to a circle (image height) of radius R is let to be Y, then $$\alpha = R/Y = R/(f \tan \omega).$$

The optical system, ideally, is rotationally symmetric with respect to an optical axis. In other words, the distortion also occurs in a rotationally symmetric manner with respect to the optical axis. Consequently, as it has been described above, in a case of correcting electrically the optical distortion, when it is possible to carry out correction by fixing a magnification on a circumference (image height) of the circle of radius R making a contact internally with a longer side of the effective image pickup plane, with a point of intersection of an optical axis on a reproduced image, and an image pickup plane to be a center, and moving each point on the circumference (image height) of radius $r(\omega)$ other than the radius R in a substantial direction of radiation, and moving on a concentric circle such that the radius becomes $r'(\omega)$, it can be considered to be advantageous from a point of amount of data and amount of calculation.

Incidentally, an optical image ceases to be a continuous amount at a point of time when an image is picked up by an electronic image pickup element (due to sampling). Consequently, the circle of radius R which is drawn exactly on the optical image ceases to be an accurate circle as long as pixels on the electronic image pickup element are not arranged radially.

In other words, regarding a shape correction of image data expressed for each discrete coordinate point, a circle which can fix the magnification does not exist. Therefore, for each pixel (Xi, Yj), a method of determining coordinates of a destination of movement (Xi', Yj') may be used. When two or more points (Xi, Yj) have moved to the coordinates (Xi', Yj'), an average of values of each pixel is taken. Moreover, when there is no point which has moved, interpolation may be performed by using a value of coordinate (Xi', Yj') of some of the surrounding pixels.

Such method is effective for correction when the distortion with respect to the optical axis is remarkable due to a manufacturing error etc. of the optical system or the electronic image pickup element, in the electronic image pickup apparatus having the zoom lens system in particular, and when the circle of the radius R drawn on the optical image is asymmetric. Moreover, it is effective for correction when there occurs to be a geometric distortion at the time of reproducing a signal to an image in an image pickup element or various output devices.

In the electronic image pickup apparatus of the present invention, for calculating a correction amount $r'(\omega) - r(\omega)$, an arrangement may be made such that a relationship between $r(\omega)$, in other words, half image angle and the image height, or a relationship between a real image height r and an ideal image height $r'/\alpha$ is recorded in a recording medium which is built-in in the electronic image pickup apparatus.

For an image after the distortion correction, not to have an extreme shortage of an amount of light at both ends in a direction of short side, the radius R may satisfy the following conditional expression.

$$0 \leq R \leq 0.6\ Ls$$

where, Ls is a length of a short side of the effective image pickup surface.

It is preferable that the radius R satisfies the following conditional expression.

$$0.3Ls \leq R \leq 0.6Ls$$

Furthermore, it is most advantageous to match the radius R with a radius of a circle making an internal contact in a short side direction of a substantially effective image pickup plane. In a case of correction in which, the magnification is fixed near the radius R=0, in other words, near on the axis, it is somewhat disadvantageous from an aspect of substantial number of images, but it is possible to secure an effect for making the size small even when the angle is widened.

A focal length interval which requires a correction is divided into a number of focal point zones. Moreover, the correction may be carried out with the amount of correction as in a case in which, a correction result which satisfies substantially the following relationship $$r'(\omega) = \alpha \cdot f \tan \omega$$

near a telephoto end in the focal point zones which are divided.

However, in this case, at a wide angle end in the focal point zones which are divided, a barrel-shape distortion at the wide angel end of the focal point zones which are divided is remained to some extent. Moreover, when the number of divided zones is increased, there arises a need to hold specific data necessary for correction, additionally in a recording medium. Therefore it is not preferable to increase the number of divided zones. Therefore, one or a plurality of coefficients associated with each focal length in the focal point zones which are divided, are calculated in advance. The coefficients may be determined based on a measurement by simulation or by actual equipment.

An amount of correction in a case in which, the correction result which satisfies substantially the following relationship $$r'(\omega) = \alpha \cdot f \tan \omega$$

near the telephoto end in the focal point zones which are divided may be calculated, and may let to be a final amount of correction by multiplying uniformly the coefficient for each focal length with respect to this amount of correction.

Incidentally, when there is no distortion in an image achieved by imaging (forming an image) of an infinite object, the following relationship $$f = y/\tan \omega$$

holds.

Here, y denotes a height (image height) of an image point from the optical axis, f denotes a focal length of an imaging system (zoom lens system in the present invention), and ω denotes an angle (object half image angle) with respect to the optical axis in an object point direction corresponding to image points connecting from a center on an image pickup plane up to a position of y.

When there is a barrel-shape distortion in the imaging system, the relationship becomes $$f > y/\tan \omega.$$

In other words, when the focal length f of the imaging system, and the image height y are let to be fixed, a value of ω becomes large.

(Digital Camera)

Figure 18:
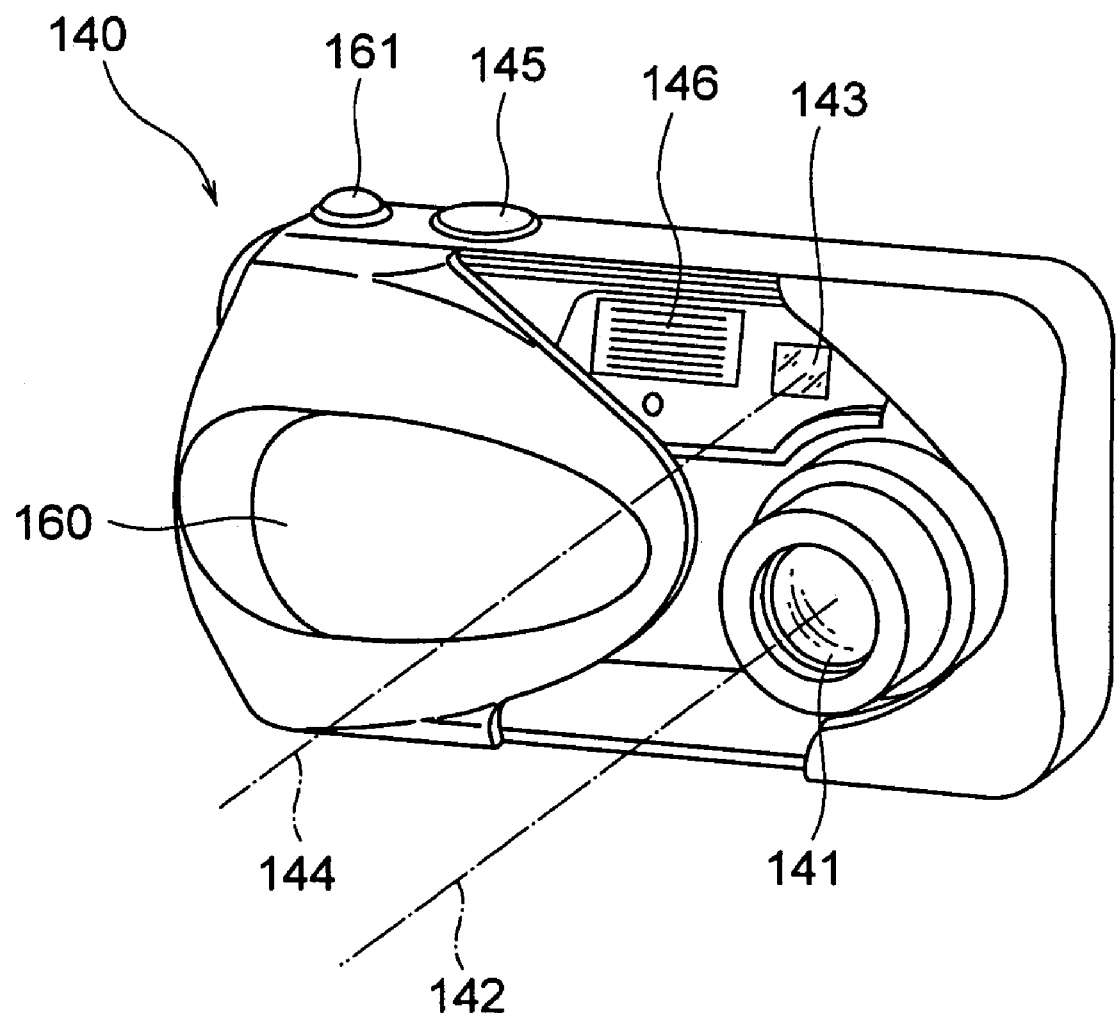
FIG. 18 is a front perspective view showing an appearance of a digital camera in which, the zoom lens system according to the present invention is incorporated.
Figure 19:
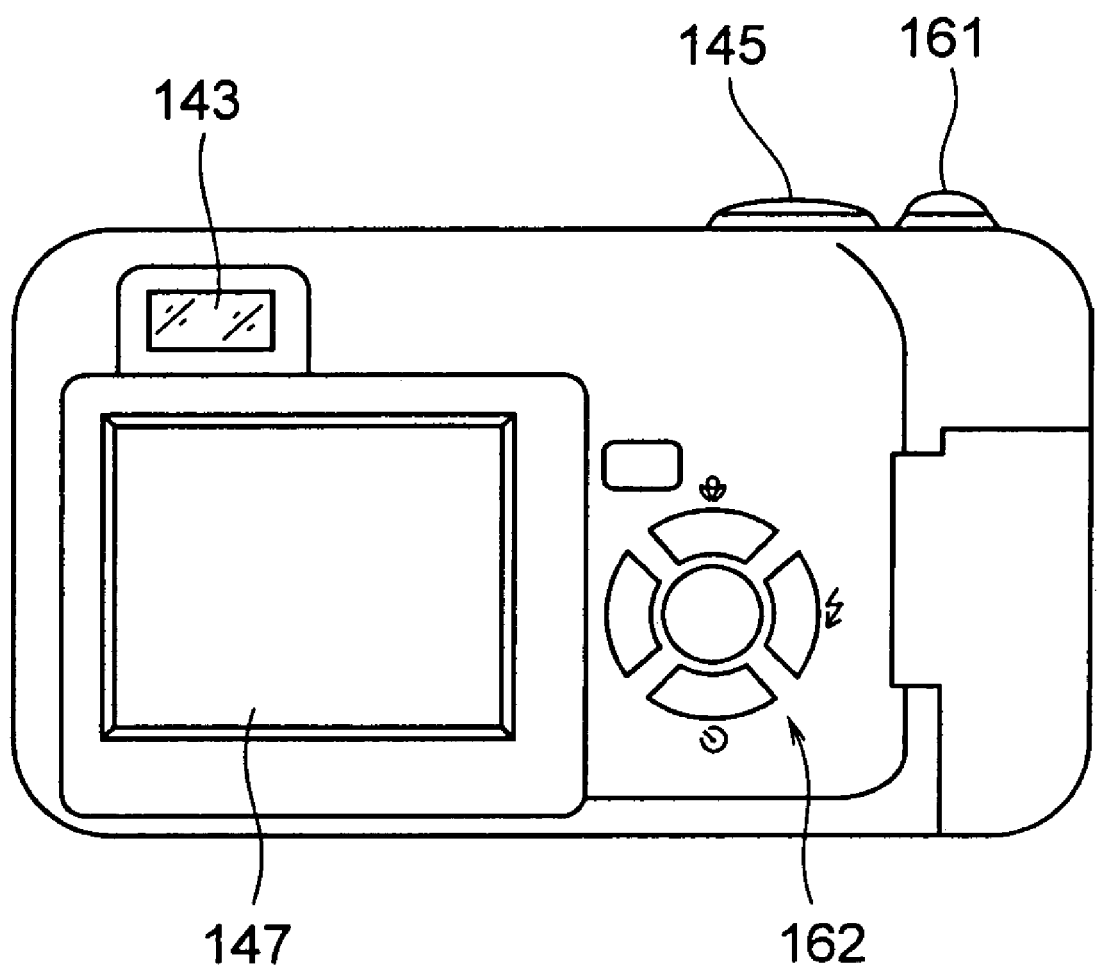
FIG. 19 is a rear perspective view of the digital camera in FIG. 18.
Figure 20:
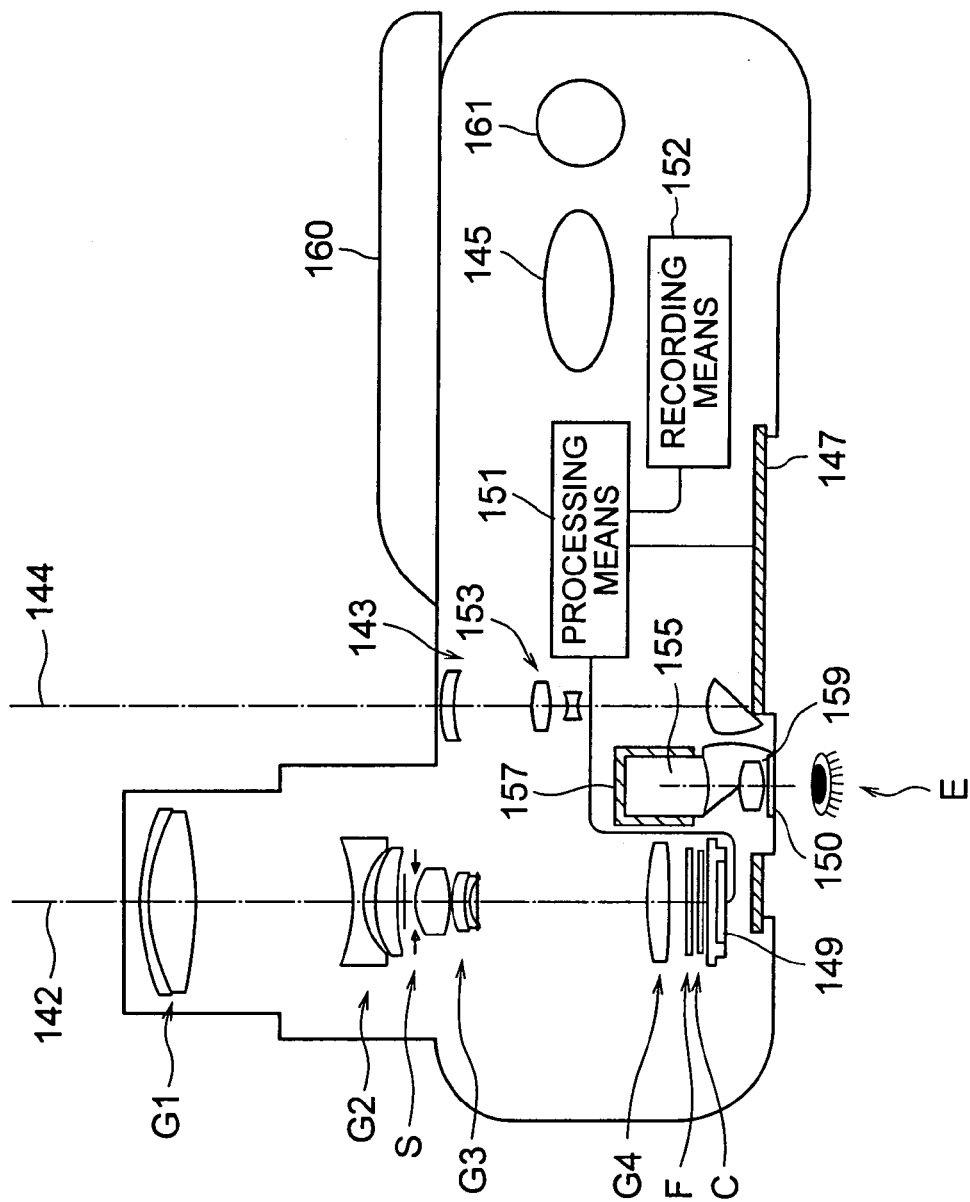
FIG. 20 is a cross-sectional view of the digital camera in FIG. 18.

FIG. 18 to FIG. 20 are conceptual diagrams of a structure of a digital camera according to the present invention in which a zoom lens system described above is incorporated in a taking optical system 141. FIG. 18 is a front perspective view showing an appearance of a digital camera 140, FIG. 19 is a rear perspective view of the same, and FIG. 20 is a schematic cross-sectional view showing a structure of the digital camera 140. In FIG. 18 and FIG. 20, show an uncollapsed state (lens is not drawn out) of the taking optical system 141. The digital camera 140, in a case of this example, includes the taking optical system 141 having a taking optical path 142, a finder optical system 143 having a finder optical path 144, a shutter button 145, a flash 146, a liquid-crystal display monitor 147, a focal-length changing button 161, and a setting changing switch 162 etc., and in the uncollapsed state of the taking optical system 141, by sliding a cover 160, the taking optical system 141, the finder optical system 143, and the flash 146 are covered by the cover 160. Further, when the cover 160 is opened and the digital camera is set in a photo taking state, the taking optical system 141 assumes the uncollapsed state as shown in FIG. 20, when the shutter button 145 disposed on an upper portion of the digital camera 140 is pressed, in synchronization with the pressing of the shutter button 145, a photograph is taken by the taking optical system 141 such as the zoom lens system in the first embodiment. An object image formed by the taking optical system 141 is formed on an image pickup surface of a CCD 149 via a cover glass C and a low pass filter on which a wavelength region restricting coating is applied. An object image which is received as light by the CCD 149 is displayed on the liquid-crystal display monitor 147 which is provided on a rear surface of the digital camera 140 as an electronic image, via a processing means 151. Moreover, a recording means 152 is connected to the processing means 151, and it is also possible to record the electronic image which is taken. The recording means 152 may be provided separately from the processing means 151, or may be formed by recording by writing electronically in a flexible disc, a memory card, or an MO etc. Moreover, the camera may be formed as a silver-salt camera in which a silver-salt film is disposed instead of the CCD 149.

Furthermore, a finder objective optical system 153 is disposed on the finder optical path 144. The finder objective optical system 153 consists of a plurality of lens units (three units in the diagram), and two prisms, and is made of a zoom optical system in which a focal length changes in synchronization with a zoom lens system of the taking optical system 141. An object image formed by the finder objective optical system 153 is formed on a field frame 157 of an erecting prism 155 which is an image erecting member. On a rear side of the erecting prism 155, an eyepiece optical system 159 which guides an erected image to a viewer's eyeball, is disposed. A cover member 150 is disposed on an emergence side of the eyepiece optical system 159.

Since the digital camera 140 structured in such manner has the taking optical system 141 according to the present invention, has an extremely small thickness in collapsed state, and an extremely stable imaging performance in the entire zooming region at high magnification, it is possible to realize a high-performance, a small size, and a widening of angle.

(Internal Circuit Structure)

Figure 21:
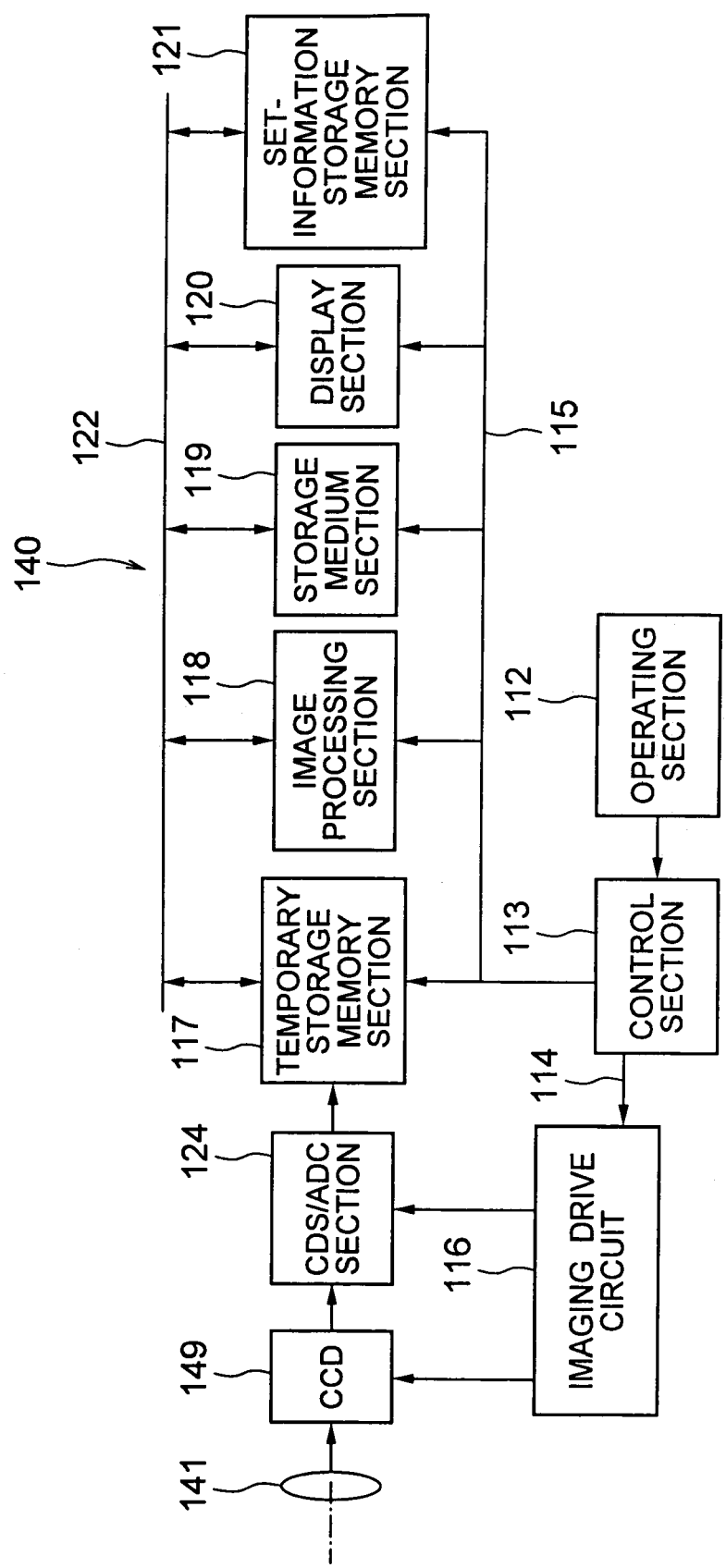
FIG. 21 is a structural block diagram of an internal circuit of main components of a digital camera.

FIG. 21 is a structural block diagram of an internal circuit of main components of the digital camera 140. In the following description, the processing means 151 described above includes for instance, a CDS/ADC section 124, a temporary storage memory 117, and an image processing section 118, and a storage means 152 consists of a storage medium section 119 for example.

As shown in FIG. 21, the digital camera 140 includes an operating section 112, a control section 113 which is connected to the operating section 112, the temporary storage memory 117 and an imaging drive circuit 116 which are connected to a control-signal output port of the control section 113, via a bus 114 and a bus 115, the image processing section 118, the storage medium section 119, a display section 120, and a set-information storage memory section 121.

The temporary storage memory 117, the image processing section 118, the storage medium section 119, the display section 120, and the set-information storage memory section 121 are structured to be capable of mutually inputting and outputting data via a bus 122. Moreover, the CCD 149 and the CDS/ADC section 124 are connected to the imaging drive circuit 116.

The operating section 112 includes various input buttons and switches, and is a circuit which informs the control section, event information which is input from outside (by a user of the digital camera) via these input buttons and switches.

The control section 113 is a central processing unit (CPU), and has a built-in computer program memory which is not shown in the diagram. The control section 113 is a circuit which controls the entire digital camera 140 upon receiving instructions and commands input by the user of the camera via the operating section 112, according to a computer program stored in this computer program memory.

The CCD 149 receives as light an object image which is formed via the taking optical system 141 according to the present invention. The CCD 149 is an image pickup element which is driven and controlled by the imaging drive circuit 116, and which converts an amount of light for each pixel of the object image to an electric signal, and outputs to the CDS/ADC section 124.

The CDS/ADC section 124 is a circuit which amplifies the electric signal which is input from the CCD 149, and carries out analog/digital conversion, and outputs to the temporary storage memory 117 image raw data (bare data, hereinafter called as 'RAW data') which is only amplified and converted to digital data.

The temporary storage memory 117 is a buffer which includes an SDRAM (Synchronous Dynamic Random Access Memory) for example, and is a memory device which stores temporarily the RAW data which is output from the CDS/ADC section 124. The image processing section 118 is a circuit which reads the RAW data stored in the temporary storage memory 117, or the RAW data stored in the storage medium section 119, and carries out electrically various image-processing including the distortion correction, based on image-quality parameters specified by the control section 113.

The storage medium section 119 is a recording medium in the form of a card or a stick including a flash memory for instance, detachably mounted. The storage medium section 119 is a control circuit of a device in which, the RAW data transferred from the temporary storage memory 117 and image data subjected to image processing in the image processing section 118 are recorded and maintained in the card flash memory and the stick flash memory.

The display section 120 includes the liquid-crystal display monitor, and is a circuit which displays images and operation menu on the liquid-crystal display monitor. The set-information storage memory section 121 includes a ROM section in which various image quality parameters are stored in advance, and a RAM section which stores image quality parameters which are selected by an input operation on the operating section 112, from among the image quality parameters which are read from the ROM section. The set-information storage memory section 121 is a circuit which controls an input to and an output from the memories.

The digital camera 140 structured in such manner has the taking optical system 141, according to the present invention, which, while having a sufficient wide angle region, and a compact structure, has an extremely stable imaging performance in the entire magnification region at a high magnification. Therefore, it is possible to realize the high performance, the small size, and widening of the angle. Moreover, a prompt focusing operation at the wide angle side (end) and the telephoto side (end) is possible.

As it has been described above, the present invention is useful for a zoom lens system having a high magnification ratio of about seven times, in which, the slimming of the digital camera is taken into consideration.

As it has been described above, the present invention is useful for a zoom lens system having a high zooming ratio of about seven times, in which, the slimming of the camera is taken into consideration.

What is claimed is:

1. A zoom lens system comprising in order from an object side thereof:

a first lens unit having a positive refracting power;

a second lens unit having a negative refracting power;

a rear lens group having a positive refracting power which includes a third lens unit having a positive refracting power; and an aperture stop which is disposed between the second lens unit and the third lens unit, wherein at a time of zooming from a wide angle end to a telephoto end, when focused on an object at a longest distance, each of the first lens unit, the second lens unit, and the third lens unit moves such that a distance between the first lens unit and the second lens unit is increased and a distance between the second lens unit and the third lens unit is decreased, and the aperture stop moves such that a distance of the aperture stop from the second lens unit is decreased, and the second lens unit comprises in order from the object side, a first negative lens $L_{2n1}$, a positive lens $L_{2p}$, and a second negative lens $L_{2n2}$, wherein the positive lens $L_{2p}$ is a biconvex lens, and the total number of lenses in the second lens unit is three, and satisfies the following conditional expressions $$-0.28 < f_2/f_t < -0.07 \quad (1)$$

$$-0.38 < f_{2n2}/f_t < -0.14 \quad (2)$$

where, $f_2$ denotes a focal length of the second lens unit, $f_{2n2}$ denotes a focal length of the second negative lens $L_{2n2}$ in the second lens unit, and $f_t$ denotes a focal length of the entire zoom lens system, at the telephoto end, and wherein a material of the positive lens in the second lens unit satisfies the following conditional expressions $$1.84 < n_{d2p} < 2.20 \quad (9)$$

$$13 < v_{d2p} < 30 \quad (10)$$

where, $n_{d2p}$ denotes a refractive index for a d-line, of the positive lens $L_{2p}$ in the second lens unit, and $\nu_{d2p}$ denotes an Abbe's number for the positive lens $L_{2p}$ the second lens unit.

2. The zoom lens system according to claim 1, wherein the second negative lens $L_{2n2}$ in the second lens unit is a biconcave lens which satisfies the following conditional expression $$-0.80 < SF_{2n2} < 0.50 \qquad (3)$$

where, $SF_{2n2}$ is defined as $SF_{2n2} = (R_{2n2f} + R_{2n2r})/(R_{2n2f} - R_{2n2r})$, when $R_{2n2f}$ is a paraxial radius of curvature of a surface on the object side, of the second negative lens $L_{2n2}$ in the second lens unit, and $R_{2n2r}$ is a paraxial radius of curvature of a surface on an image side, of the second negative lens $L_{2n2}$ in the second lens unit.

3. The zoom lens system according to claim 1, wherein the total number of lenses in the third lens unit is three at the most.

4. The zoom lens system according to claim 3, wherein the third lens unit includes in order from the object side thereof, a positive lens, a positive lens, and a negative lens.

5. The zoom lens system according to claim 1, wherein the zoom lens system satisfies the following conditional expression $$0.3 < f_1/f_t < 1.5 \qquad (18)$$

where, $f_1$ denotes a focal length of the first lens unit.

6. The zoom lens system according to claim 1, wherein the zoom lens system satisfies the following conditional expression $$0.07 < f_3/f_t < 0.53 \qquad (19)$$

where, $f_3$ denotes a focal length of the third lens unit.

7. The zoom lens system according to claim 1, comprising in order from the object side thereof:

the first lens unit;
the second lens unit;
the third lens unit; and
a fourth lens unit having a positive refracting power, wherein
the zoom lens system is a four-unit zoom lens system.

8. The zoom lens system according to claim 7, wherein the zoom lens system satisfies the following conditional expression $$0.2 < f_{RG}/f_t < 0.9 \qquad (20)$$

where, $f_{RG}$ denotes a focal length of the lens unit which is positioned closest to the image, in the zoom lens system.

9. The zoom lens system according to claim 1, wherein the zoom lens system satisfies the following conditional expression $$4.8 < f_t/f_w < 15.0 \qquad (21)$$

where, $f_w$ is a focal length at the wide angle end, of the entire zoom lens system.

10. An electronic image pickup apparatus comprising:
a zoom lens system according to claim 1; and
an image pickup element which is disposed on an image side of the zoom lens system, and which converts an image formed by the zoom lens system, to an electric signal.

11. The electronic image pickup apparatus according to claim 10, wherein the electronic image pickup apparatus satisfies the following conditional expression $$0.48 < I_m/f_w < 0.85 \qquad (22)$$

where, $I_m$ denotes a maximum image height in an effective image pickup area, and $f_w$ denotes a focal length of the entire zoom lens system, at a wide angle end.

12. A zoom lens system comprising in order from an object side thereof:

a first lens unit having a positive refracting power;
a second lens unit having a negative refracting power;
a rear lens group having a positive refracting power which includes a third lens unit having a positive refracting power; and
an aperture stop which is disposed between the second lens unit and the third lens unit, wherein at a time of zooming from a wide angle end to a telephoto end, when focused on an object at a longest distance, each of the first lens unit, the second lens unit, and the third lens unit moves such that a distance between the first lens unit and the second lens unit is increased and a distance between the second lens unit and the third lens unit is decreased, and the aperture stop moves such that a distance of the aperture stop from the second lens unit is decreased, and the second lens unit comprises in order from the object side, a first negative lens $L_{2n1}$, a positive lens $L_{2p}$, and a second negative lens $L_{2n2}$, and the total number of lenses in the second lens unit is three, and satisfies the following conditional expressions $$-0.28 < f_2/f_t < -0.07 \qquad (1)$$

$$-0.38 < f_{2n2}/f_t < -0.14 \qquad (2)$$

where, $f_2$ denotes a focal length of the second lens unit, $f_{2n2}$ denotes a focal length of the second negative lens $L_{2n2}$ in the second lens unit, and $f_t$ denotes a focal length of the entire zoom lens system, at the telephoto end, wherein:

a thickness on an optical axis of the second lens unit satisfies the following conditional expression (A), and a shape of the first negative lens $L_{2n1}$ in the second lens unit satisfies the following conditional expression (B), and a shape of the positive lens $L_{2p}$ in the second lens unit satisfies the following conditional expression (C)

$$0.06 < \Sigma_{d2G}/f_t < 0.23 \qquad (A)$$

$$-0.9 < SF_{2n1} < 1.1 \qquad (B)$$

$$-3.0 < SF_{2p} < 0.2 \qquad (C)$$

where, $\Sigma_{d2G}$ denotes a distance on the optical axis, from a surface of incidence of the second lens unit up to a surface of exit of the second lens unit, $SF_{2n1}$ is defined as $SF_{2n1} = (R_{2n1f} + R_{2n1r})/(R_{2n1f} - R_{2n1r})$, when $R_{2n1f}$ is a paraxial radius of curvature of a surface on the object side, of the first negative lens $L_{2n1}$ in the second lens unit, and $R_{2n1r}$ is a paraxial radius of curvature of a surface on an image side of the first negative lens $L_{2n1}$ in the second lens unit, and $SF_{2p}$ is defined as $SF_{2p}=(R_{2pf}+R_{2pr})/(R_{2pf}-R_{2p})$, when $R_{2pf}$ is a paraxial radius of curvature of a surface on the object side, of the positive lens $L_{2p}$ in the second lens unit, and $R_{2pr}$ is a paraxial radius of curvature of a surface on an image side, of the positive lens $L_{2p}$ in the second lens unit.

13. A zoom lens system comprising in order from an object side thereof:
    a first lens unit having a positive refracting power;
    a second lens unit having a negative refracting power;
    a rear lens group having a positive refracting power which includes a third lens unit having a positive refracting power; and
    an aperture stop which is disposed between the second lens unit and the third lens unit, wherein
    at a time of zooming from a wide angle end to a telephoto end, when focused on an object at a longest distance, each of the first lens unit, the second lens unit, and the third lens unit moves such that a distance between the first lens unit and the second lens unit is increased and a distance between the second lens unit and the third lens unit is decreased, and
    the aperture stop moves such that a distance of the aperture stop from the second lens unit is decreased, and
    the second lens unit comprises in order from the object side, a first negative lens $L_{2n1}$, a positive lens $L_{2p}$, and a second negative lens $L_{2n2}$, and
    the total number of lenses in the second lens unit is three, and
    satisfies the following conditional expressions $$-0.28<f_2/f_t<-0.07 \quad (1)$$

$$-0.38<f_{2n2}/f_t<-0.14 \quad (2)$$

where,
$f_2$ denotes a focal length of the second lens unit,
$f_{2n2}$ denotes a focal length of the second negative lens $L_{2n2}$ in the second lens unit, and
$f_t$ denotes a focal length of the entire zoom lens system, at the telephoto end,
wherein the zoom lens satisfies the following conditional expression when focused on an object at a longest distance $$1.1<(\beta_{2T}\times\beta_{RW})/(\beta_{2W}\times\beta_{RT})<3.6 \quad (4)$$

where,
$\beta_{2W}$ and $\beta_{2T}$ denote paraxial lateral magnification of the second lens unit at the wide angle end and the telephoto end respectively, and
$\beta_{RW}$ and $\beta_{RT}$ denote paraxial lateral magnification of the rear lens group at the wide angle end and the telephoto end respectively.

14. A zoom lens system comprising in order from an object side thereof:
    a first lens unit having a positive refracting power;
    a second lens unit having a negative refracting power;
    a rear lens group having a positive refracting power which includes a third lens unit having a positive refracting power; and
    an aperture stop which is disposed between the second lens unit and the third lens unit, wherein
    at a time of zooming from a wide angle end to a telephoto end, when focused on an object at a longest distance, each of the first lens unit, the second lens unit, and the third lens unit moves such that a distance between the first lens unit and the second lens unit is increased and a distance between the second lens unit and the third lens unit is decreased, and
    the aperture stop moves such that a distance of the aperture stop from the second lens unit is decreased, and
    the second lens unit comprises in order from the object side, a first negative lens $L_{2n1}$, a positive lens $L_{2p}$, and a second negative lens $L_{2n2}$, wherein the positive lens $L_{2p}$ is a biconvex lens, and
    the total number of lenses in the second lens unit is three, and
    satisfies the following conditional expressions $$-0.28<f_2/f_t<-0.07 \quad (1)$$

$$-0.38<f_{2n2}/f_t<-0.14 \quad (2)$$

where,
$f_2$ denotes a focal length of the second lens unit,
$f_{2n2}$ denotes a focal length of the second negative lens $L_{2n2}$ in the second lens unit, and
$f_t$ denotes a focal length of the entire zoom lens system, at the telephoto end,
wherein a material of the first negative lens $L_{2n1}$ in the second lens unit satisfies the following conditional expressions $$1.78<n_{d2n1}<2.20 \quad (5)$$

$$35<\nu_{d2n1}<50 \quad (6)$$

where,
$n_{d2n1}$ denotes a refractive index for a d-line, of the first negative lens $L_{2n1}$ in the second lens unit, and
$\nu_{d2n1}$ denotes an Abbe's number for the first negative lens $L_{2n1}$ in the second lens unit, and
wherein a material of the positive lens in the second lens unit satisfies the following conditional expressions $$1.84<n_{d2p}<2.20 \quad (9)$$

$$13<\nu_{d2p}<30 \quad (10)$$

where,
$n_{d2p}$ denotes a refractive index for a d-line of the positive lens $L_2$, in the second lens unit, and
$\nu_{d2p}$ denotes an Abbe's number for the positive lens $L_{2p}$ the second lens unit.

15. A zoom lens system comprising in order from an object side thereof:
    a first lens unit having a positive refracting power;
    a second lens unit having a negative refracting power;
    a rear lens group having a positive refracting power which includes a third lens unit having a positive refracting power; and
    an aperture stop which is disposed between the second lens unit and the third lens unit, wherein
    at a time of zooming from a wide angle end to a telephoto end, when focused on an object at a longest distance, each of the first lens unit, the second lens unit, and the third lens unit moves such that a distance between the first lens unit and the second lens unit is increased and a distance between the second lens unit and the third lens unit is decreased, and
    the aperture stop moves such that a distance of the aperture stop from the second lens unit is decreased, and
    the second lens unit comprises in order from the object side, a first negative lens $L_{2n1}$, a positive lens $L_{2p}$, and a second negative lens $L_{2n2}$, wherein the positive lens $L_{2p}$ is a biconvex lens, and the total number of lenses in the second lens unit is three, and satisfies the following conditional expressions $$-0.28 < f_2/f_t < -0.07 \quad (1)$$

$$-0.38 < f_{2n2}/f_t < -0.14 \quad (2)$$

where, $f_2$ denotes a focal length of the second lens unit, $f_{2n2}$ denotes a focal length of the second negative lens $L_{2n2}$ in the second lens unit, and $f_t$ denotes a focal length of the entire zoom lens system, at the telephoto end, wherein a material of the second negative lens $L_{2n2}$ in the second lens unit satisfies the following conditional expressions $$1.78 < n_{d2n2} < 2.00 \quad (7)$$

$$35 < \nu_{d2n2} < 50 \quad (8)$$

where, $n_{d2n2}$ denotes a refractive index for a d-line, of the second negative lens $L_{2n2}$ in the second lens unit, and $\nu_{d2n2}$ denotes an Abbe's number for the second negative lens $L_{2n2}$ in the second lens unit, and wherein a material of the positive lens in the second lens unit satisfies the following conditional expressions $$1.84 < n_{d2p} < 2.20 \quad (9)$$

$$13 < \nu_{d2p} < 30 \quad (10)$$

where, $n_{d2p}$ denotes a refractive index for a d-line, of the positive lens $L_{2p}$ the second lens unit, and $\nu_{d2p}$ denotes an Abbe's number for the positive lens $L_{2p}$ in the second lens unit, add: wherein the positive lens $L_{2p}$ is a biconvex lens.

16. A zoom lens system comprising in order from an object side thereof:

a first lens unit having a positive refracting power;

a second lens unit having a negative refracting power;

a rear lens group having a positive refracting power which includes a third lens unit having a positive refracting power; and an aperture stop which is disposed between the second lens unit and the third lens unit, wherein at a time of zooming from a wide angle end to a telephoto end, when focused on an object at a longest distance, each of the first lens unit, the second lens unit, and the third lens unit moves such that a distance between the first lens unit and the second lens unit is increased and a distance between the second lens unit and the third lens unit is decreased, and the aperture stop moves such that a distance of the aperture stop from the second lens unit is decreased, and the second lens unit comprises in order from the object side, a first negative lens $L_{2n1}$, a positive lens $L_{2p}$, and a second negative lens $L_{2n2}$, and the total number of lenses in the second lens unit is three, and satisfies the following conditional expressions $$-0.28 < f_2/f_t < -0.07 \quad (1)$$

$$-0.38 < f_{2n2}/f_t < -0.14 \quad (2)$$

where, $f_2$ denotes a focal length of the second lens unit, $f_{2n2}$ denotes a focal length of the second negative lens $L_{2n2}$ in the second lens unit, and $f_t$ denotes a focal length of the entire zoom lens system, at the telephoto end, wherein:

at least a surface on the object side of the first negative lens $L_{2n1}$ in the second lens unit is an aspherical surface, and satisfies the following conditional expressions $$0.001 < asp_{2n1f}/f_w < 0.07 \quad (11)$$

$$0.005 < (asp_{2n1f} + |asp_{2n1r}|)/f_w < 0.15 \quad (12)$$

where, $asp_{2n1f}$ denotes an aspherical deviation at a lens surface toward the object of the first negative lens $L_{2n1}$ in the second lens unit, $asp_{2n1r}$ denotes an aspherical deviation at a lens surface toward the image of the first negative lens $L_{2n1}$ in the second lens unit, and $f_w$ denotes a focal length at the wide angle end, of the entire zoom lens system, and the aspherical deviation is a distance from a reference spherical surface up to a lens surface when measured in a direction parallel to the optical axis, at a position of a maximum height of light rays incident at the wide angle end on the lens surface, when a spherical surface having a vertex same as a vertex of the lens, and for which a paraxial radius of curvature is let to be a radius of curvature, is let to be the reference spherical surface, and a direction toward the image is let to be a positive reference numeral.

17. A zoom lens system comprising in order from an object side thereof:

a first lens unit having a positive refracting power;

a second lens unit having a negative refracting power;

a rear lens group having a positive refracting power which includes a third lens unit having a positive refracting power; and an aperture stop which is disposed between the second lens unit and the third lens unit, wherein at a time of zooming from a wide angle end to a telephoto end, when focused on an object at a longest distance, each of the first lens unit, the second lens unit, and the third lens unit moves such that a distance between the first lens unit and the second lens unit is increased and a distance between the second lens unit and the third lens unit is decreased, and the aperture stop moves such that a distance of the aperture stop from the second lens unit is decreased, and the second lens unit comprises in order from the object side, a first negative lens $L_{2n1}$, a positive lens $L_{2p}$, and a second negative lens $L_{2n2}$, and the total number of lenses in the second lens unit is three, and satisfies the following conditional expressions $$-0.28 < f_2/f_t < -0.07 \quad (1)$$

$$-0.38 < f_{2n2}/f_t < -0.14 \quad (2)$$

where, $f_2$ denotes a focal length of the second lens unit, $f_{2n2}$ denotes a focal length of the second negative lens $L_{2n2}$ in the second lens unit, and $f_t$ denotes a focal length of the entire zoom lens system, at the telephoto end, wherein:
the first lens unit includes a positive lens $L_{1p}$ and a negative lens $L_{1n}$, and
the total number of lenses in the first lens unit is two.

18. The zoom lens system according to claim 17, wherein each of the negative lens $L_{1n}$ and the positive lens $L_{1p}$ in the first lens unit is a single lens.

19. The zoom lens system according to claim 18, wherein a distance between the negative lens $L_{1n}$ and the positive lens $L_{1p}$ in the first lens unit satisfies the following conditional expression $$0.0 \leq d_{1np}/d_1 < 0.2 \tag{13}$$

where,
$d_{1np}$ denotes a distance on the optical axis between the negative lens and the positive lens in the first lens unit, and
$d_1$ denotes a distance on the optical axis from a surface of incidence up to a surface of exit of the first lens unit.

20. The zoom lens system according to claim 17, wherein the negative lens $L_{1n}$ and the positive lens $L_{1p}$ in the first lens unit are cemented.

21. The zoom lens system according to claim 17, wherein a material of the negative lens $L_{1n}$ and a material of the positive lens $L_{1p}$ satisfy the following conditional expressions $$1.47 < n_{d1p} < 1.90 \tag{14}$$

$$40 < \nu_{d1p} < 85 \tag{15}$$

$$1.75 < n_{d1n} < 2.06 \tag{16}$$

$$12 < \nu_{d1n} < 31 \tag{17}$$

where,
$n_{d1p}$ denotes a refractive index for a d-line, of the positive lens $L_{1p}$,
$\nu_{d1p}$ denotes an Abbe's number for the positive lens $L_{1p}$,
$n_{d1n}$ denotes a refractive index for a d-line, of the negative lens $L_{1n}$, and
$\nu_{d1n}$ denotes an Abbe's number for the negative lens $L_{1n}$.

22. The zoom lens system according to claim 17, wherein the first lens unit includes in order from the object side thereof, the negative lens $L_{1n}$ and the positive lens $L_{1p}$.

23. A zoom lens system comprising in order from an object side thereof:
a first lens unit having a positive refracting power;
a second lens unit having a negative refracting power;
a rear lens group having a positive refracting power which includes a third lens unit having a positive refracting power; and
an aperture stop which is disposed between the second lens unit and the third lens unit, wherein
at a time of zooming from a wide angle end to a telephoto end, when focused on an object at a longest distance, each of the first lens unit, the second lens unit, and the third lens unit moves such that a distance between the first lens unit and the second lens unit is increased and a distance between the second lens unit and the third lens unit is decreased, and
the aperture stop moves such that a distance of the aperture stop from the second lens unit is decreased, and
the second lens unit comprises in order from the object side, a first negative lens $L_{2n1}$, a positive lens $L_{2p}$, and a second negative lens $L_{2n2}$, and
the total number of lenses in the second lens unit is three, and
satisfies the following conditional expressions $$-0.28 < f_2/f_t < -0.07 \tag{1}$$

$$-0.38 < f_{2n2}/f_t < -0.14 \tag{2}$$

where,
$f_2$ denotes a focal length of the second lens unit,
$f_{2n2}$ denotes a focal length of the second negative lens $L_{2n2}$ in the second lens unit, and
$f_t$ denotes a focal length of the entire zoom lens system, at the telephoto end,
wherein the zoom lens system comprises in order from the object side thereof:
the first lens unit;
the second lens unit;
the third lens unit;
a fourth lens unit having a negative refracting power; and
a fifth lens unit having a positive refracting power, wherein the zoom lens system is a five-unit zoom lens system.

24. The zoom lens system according to claim 23, wherein the zoom lens system satisfies the following conditional expression $$0.2 < f_{RG}/f_t < 0.9 \tag{20}$$

where,
$f_{RG}$ denotes a focal length of the lens unit which is positioned closest to the image, in the zoom lens system.

25. A zoom lens system comprising in order from an object side thereof:
a first lens unit having a positive refracting power;
a second lens unit having a negative refracting power;
a rear lens group having a positive refracting power which includes a third lens unit having a positive refracting power; and
an aperture stop which is disposed between the second lens unit and the third lens unit, wherein
at a time of zooming from a wide angle end to a telephoto end, when focused on an object at a longest distance, each of the first lens unit, the second lens unit, and the third lens unit moves such that a distance between the first lens unit and the second lens unit is increased and a distance between the second lens unit and the third lens unit is decreased, and
the aperture stop moves such that a distance of the aperture stop from the second lens unit is decreased, and
the second lens unit comprises in order from the object side, a first negative lens $L_{2n1}$, a positive lens $L_{2p}$, and a second negative lens $L_{2n2}$, wherein the positive lens $L_{2p}$ is a biconvex lens, and
the total number of lenses in the second lens unit is three, and
satisfies the following conditional expressions $$-0.28 < f_2/f_t < -0.07 \tag{1}$$

$$-0.38 < f_{2n2}/f_t < -0.14 \tag{2}$$

where,
$f_2$ denotes a focal length of the second lens unit,
$f_{2n2}$ denotes a focal length of the second negative lens $L_{2n2}$ in the second lens unit, and
$f_t$ denotes a focal length of the entire zoom lens system, at the telephoto end, and
wherein the second negative lens $L_{2n2}$ in the second lens unit is a biconcave lens which satisfies the following conditional expression $$-0.80 < SF_{2n2} < 0.50 \tag{3}$$

where, $SF_{2n2}$ is defined as $SF_{2n2}=(R_{2n2f}+R_{2n2r})/(R_{2n2f}-R_{2n2r})$, when $R_{2n2f}$ is a paraxial radius of curvature of a surface on the object side, of the second negative lens $L_{2n2}$ in the second lens unit, and $R_{2n2r}$ is a paraxial radius of curvature of a surface on an image side, of the second negative lens $L_{2n2}$ in the second lens unit.

26. A zoom lens system comprising in order from an object side thereof:

a first lens unit having a positive refracting power;

a second lens unit having a negative refracting power;

a rear lens group having a positive refracting power which includes a third lens unit having a positive refracting power; and an aperture stop which is disposed between the second lens unit and the third lens unit, wherein at a time of zooming from a wide angle end to a telephoto end, when focused on an object at a longest distance, each of the first lens unit, the second lens unit, and the third lens unit moves such that a distance between the first lens unit and the second lens unit is increased and a distance between the second lens unit and the third lens unit is decreased, and the aperture stop moves such that a distance of the aperture stop from the second lens unit is decreased, and the second lens unit comprises in order from the object side, a first negative lens $L_{2n1}$, a positive lens $L_{2p}$, and a second negative lens $L_{2n2}$, wherein the positive lens $L_{2p}$ is a biconvex lens, and the total number of lenses in the second lens unit is three, and satisfies the following conditional expressions $$-0.28<f_2/f_t<-0.07 \qquad (1)$$

$$-0.38<f_{2n2}/f_t<-0.14 \qquad (2)$$

where, $f_2$ denotes a focal length of the second lens unit, $f_{2n2}$ denotes a focal length of the second negative lens $L_{2n2}$ in the second lens unit, and $f_t$ denotes a focal length of the entire zoom lens system, at the telephoto end, wherein a material of the first negative lens $L_{2n1}$ in the second lens unit satisfies the following conditional expressions $$1.78<n_{d2n1}<2.20 \qquad (5)$$

$$35<v_{d2n1}<50 \qquad (6)$$

where, $n_{d2n1}$ denotes a refractive index for a d-line, of the first negative lens $L_{2n1}$ in the second lens unit, and $v_{d2n}$ denotes an Abbe's number for the first negative lens $L_{2n1}$ in the second lens unit, and wherein the second negative lens $L_{2n2}$ in the second lens unit is a biconcave lens which satisfies the following conditional expression $$-0.80<SF_{2n2}<0.50 \qquad (3)$$

where, $SF_{2n2}$ is defined as $SF_{2n2}=(R_{2n2f}+R_{2n2r})/(R_{2n2f}-R_{2n2r})$, when $R_{2n2f}$ is a paraxial radius of curvature of a surface on the object side, of the second negative lens $L_{2n2}$ in the second lens unit, and $R_{2n2r}$ is a paraxial radius of curvature of a surface on an image side, of the second negative lens $L_{2n2}$ in the second lens unit.

27. A zoom lens system comprising in order from an object side thereof:

a first lens unit having a positive refracting power;

a second lens unit having a negative refracting power;

a rear lens group having a positive refracting power which includes a third lens unit having a positive refracting power; and an aperture stop which is disposed between the second lens unit and the third lens unit, wherein at a time of zooming from a wide angle end to a telephoto end, when focused on an object at a longest distance, each of the first lens unit, the second lens unit, and the third lens unit moves such that a distance between the first lens unit and the second lens unit is increased and a distance between the second lens unit and the third lens unit is decreased, and the aperture stop moves such that a distance of the aperture stop from the second lens unit is decreased, and the second lens unit comprises in order from the object side, a first negative lens $L_{2n1}$, a positive lens $L_{2p}$, and a second negative lens $L_{2n2}$, wherein the positive lens $L_{2p}$ is a biconvex lens, and the total number of lenses in the second lens unit is three, and satisfies the following conditional expressions $$-0.28<f_2/f_t<-0.07 \qquad (1)$$

$$-0.38<f_{2n2}/f_t<-0.14 \qquad (2)$$

where, $f_2$ denotes a focal length of the second lens unit, $f_{2n2}$ denotes a focal length of the second negative lens $L_{2n2}$ in the second lens unit, and $f_t$ denotes a focal length of the entire zoom lens system, at the telephoto end, wherein a material of the second negative lens $L_{2n2}$ in the second lens unit satisfies the following conditional expressions $$1.78<n_{d2n2}<2.00 \qquad (7)$$

$$35<v_{d2n2}<50 \qquad (8)$$

where, $n_{d2n2}$ denotes a refractive index for a d-line, of the second negative lens $L_{2n2}$ in the second lens unit, and $v_{d2n2}$ denotes an Abbe's number for the second negative lens $L_{2n2}$ in the second lens unit, and wherein the second negative lens $L_{2n2}$ in the second lens unit is a biconcave lens which satisfies the following conditional expression $$-0.80<SF_{2n2}<0.50 \qquad (3)$$

where, $SF_{2n2}$ is defined as $SF_{2n2}=(R_{2n2f}+R_{2n2r})/(R_{2n2f}-R_{2n2r})$, when $R_{2n2f}$ is a paraxial radius of curvature of a surface on the object side, of the second negative lens $L_{2n2}$ in the second lens unit, and $R_{2n2r}$ is a paraxial radius of curvature of a surface on an image side, of the second negative lens $L_{2n2}$ in the second lens unit.

28. A zoom lens system comprising in order from an object side thereof:

a first lens unit having a positive refracting power;

a second lens unit having a negative refracting power;

a rear lens group having a positive refracting power which includes a third lens unit having a positive refracting power; and an aperture stop which is disposed between the second lens unit and the third lens unit, wherein at a time of zooming from a wide angle end to a telephoto end, when focused on an object at a longest distance, each of the first lens unit, the second lens unit, and the third lens unit moves such that a distance between the first lens unit and the second lens unit is increased and a distance between the second lens unit and the third lens unit is decreased, and the aperture stop moves such that a distance of the aperture stop from the second lens unit is decreased, and the second lens unit comprises in order from the object side, a first negative lens $L_{2n1}$, a positive lens $L_{2p}$, and a second negative lens $L_{2n2}$, wherein the positive lens $L_{2p}$ is a biconvex lens, and the total number of lenses in the second lens unit is three, and satisfies the following conditional expressions $$-0.28 < f_2/f_t < -0.07 \quad (1)$$

$$-0.38 < f_{2n2}/f_t < -0.14 \quad (2)$$

where, $f_2$ denotes a focal length of the second lens unit, $f_{2n2}$ denotes a focal length of the second negative lens $L_{2n2}$ in the second lens unit, and $f_t$ denotes a focal length of the entire zoom lens system, at the telephoto end, and the zoom lens system comprising in order from the object side thereof:

the first lens unit;

the second lens unit;

the third lens unit;

a fourth lens unit having a negative refracting power; and a fifth lens unit having a positive refracting power, wherein the zoom lens system is a five-unit zoom lens system.

29. A zoom lens system comprising in order from an object side thereof:

a first lens unit having a positive refracting power;

a second lens unit having a negative refracting power;

a rear lens group having a positive refracting power which includes a third lens unit having a positive refracting power; and an aperture stop which is disposed between the second lens unit and the third lens unit, wherein at a time of zooming from a wide angle end to a telephoto end, when focused on an object at a longest distance, each of the first lens unit, the second lens unit, and the third lens unit moves such that a distance between the first lens unit and the second lens unit is increased and a distance between the second lens unit and the third lens unit is decreased, and the aperture stop moves such that a distance of the aperture stop from the second lens unit is decreased, and the second lens unit comprises in order from the object side, a first negative lens $L_{2n1}$, a positive lens $L_{2p}$, and a second negative lens $L_{2n2}$, and the total number of lenses in the second lens unit is three, and satisfies the following conditional expressions $$-0.28 < f_2/f_t < -0.07 \quad (1)$$

$$-0.38 < f_{2n2}/f_t < -0.14 \quad (2)$$

where, $f_2$ denotes a focal length of the second lens unit, $f_{2n2}$ denotes a focal length of the second negative lens $L_{2n2}$ in the second lens unit, and $f_t$ denotes a focal length of the entire zoom lens system, at the telephoto end, wherein a material of the first negative lens $L_{2n1}$ in the second lens unit satisfies the following conditional expressions $$1.78 < n_{d2n1} < 2.20 \quad (5)$$

$$35 < \nu_{d2n1} < 50 \quad (6)$$

where, $n_{d2n1}$ denotes a refractive index for a d-line, of the first negative lens $L_{2n1}$ in the second lens unit, and $\nu_{d2n1}$ denotes an Abbe's number for the first negative lens $L_{2n1}$ in the second lens unit, and the zoom lens system comprising in order from the object side thereof:

the first lens unit;

the second lens unit;

the third lens unit;

a fourth lens unit having a negative refracting power; and a fifth lens unit having a positive refracting power, wherein the zoom lens system is a five-unit zoom lens system.

30. A zoom lens system comprising in order from an object side thereof:

a first lens unit having a positive refracting power;

a second lens unit having a negative refracting power;

a rear lens group having a positive refracting power which includes a third lens unit having a positive refracting power; and an aperture stop which is disposed between the second lens unit and the third lens unit, wherein at a time of zooming from a wide angle end to a telephoto end, when focused on an object at a longest distance, each of the first lens unit, the second lens unit, and the third lens unit moves such that a distance between the first lens unit and the second lens unit is increased and a distance between the second lens unit and the third lens unit is decreased, and the aperture stop moves such that a distance of the aperture stop from the second lens unit is decreased, and the second lens unit comprises in order from the object side, a first negative lens $L_{2n}$, a positive lens $L_{2p}$, and a second negative lens $L_{2n2}$, and the total number of lenses in the second lens unit is three, and satisfies the following conditional expressions $$-0.28 < f_2/f_t < -0.07 \quad (1)$$

$$-0.38 < f_{2n2}/f_t < -0.14 \quad (2)$$

where, $f_2$ denotes a focal length of the second lens unit, $f_{2n2}$ denotes a focal length of the second negative lens $L_{2n2}$ in the second lens unit, and $f_t$ denotes a focal length of the entire zoom lens system, at the telephoto end, wherein a material of the second negative lens $L_{2n2}$ in the second lens unit satisfies the following conditional expressions $$1.78 < n_{d2n2} < 2.00 \quad (7)$$

$$35 < \nu_{d2n2} < 50 \quad (8)$$

where, $n_{d2n2}$ denotes a refractive index for a d-line, of the second negative lens $L_{2n2}$ in the second lens unit, and $v_{d2n2}$ denotes an Abbe's number for the second negative lens $L_{2n2}$ in the second lens unit, and the zoom lens system comprising in order from the object side thereof:

the first lens unit;
the second lens unit;
the third lens unit;
a fourth lens unit having a negative refracting power; and
a fifth lens unit having a positive refracting power, wherein the zoom lens system is a five-unit zoom lens system.

\* \* \* \* \*